(12) United States Patent
Luo et al.

(10) Patent No.: US 6,990,503 B1
(45) Date of Patent: Jan. 24, 2006

(54) RESCHEDULING TRANSACTIONS IN A DATABASE SYSTEM

(75) Inventors: Gang Luo, Madison, WI (US); Curt J. Ellmann, Madison, WI (US); Jeffrey F. Naughton, Madison, WI (US); Michael W. Watzke, Madison, WI (US)

(73) Assignee: NCR Corporation, Dayton, OH (US)

( * ) Notice: Subject to any disclaimer, the term of this patent is extended or adjusted under 35 U.S.C. 154(b) by 597 days.

(21) Appl. No.: 10/121,190

(22) Filed: Apr. 12, 2002

(51) Int. Cl.
*G06F 17/30* (2006.01)

(52) U.S. Cl. .................................... 707/200
(58) Field of Classification Search .............. 707/1–10, 707/200–205; 710/113; 711/154; 705/26
See application file for complete search history.

(56) References Cited

U.S. PATENT DOCUMENTS

| | | | | |
|---|---|---|---|---|
| 5,832,508 A | * | 11/1998 | Sherman et al. | ............. 707/200 |
| 6,243,778 B1 | * | 6/2001 | Fung et al. | .................. 710/113 |
| 6,339,772 B1 | * | 1/2002 | Klein et al. | ..................... 707/4 |
| 6,397,227 B1 | * | 5/2002 | Klein et al. | ................. 707/200 |
| 6,453,313 B1 | * | 9/2002 | Klein et al. | ..................... 707/3 |
| 6,604,102 B2 | * | 8/2003 | Klein et al. | ..................... 707/4 |
| 2002/0038313 A1 | * | 3/2002 | Klein et al. | ................. 707/200 |

OTHER PUBLICATIONS

R.Ronngren et al., Lazy queue:an efficient implementation of the pending-event set, 1991, Proc. Of 24th Ann. Symp. on Sim.,IEEE Computer Society Press, pp. 194-204.*

Ravi Rajwar et al., Transactional lock-free execution of lock-based programs, 2002, Proc. Of the 10th Intern. Conf on Architectural Support for programming, Multiprocessor synchronization and speculation, ACM Press, NY, pp. 5-17.*

Gang Luo et al., U.S. Appl. No. 10/121,191, entitled "Transaction Grouping and Reschedualing in a Database System," filed Apr. 12, 2002, pp. 1-80, Figs. 1-33.

Gang Luo et al., U.S. Appl. No. 10/117,503, entitled "Locking Mechanism Employing a Name Lock for Materialized Views," filed Apr. 4, 2004, pp. 1-53, Figs. 1-18.

Rick Grehan, "How to Climb a B-tree: B-tree, a popular tree-indexing structure, is perfect for db4o database system, and can save you a lot of disk access time," printed from http://www.fawcette.com, 25 pages (dated as early as Jan. 18, 2003).

Kevin Jones, "TPFDF B+Tree Indexing Support," printed from http://www-3.ibm.com, pp. 1-3 (dated as early as Jan. 8, 2003).

SAP Library-User Manual: SAP DB, "B*Tree," printed from http://pipin.tmd.ns.ac.yu, pp. 1-2 (dated as early as Jan. 8, 2003).

Gang Luo et al., "Locking Protocols for Materialized Aggergate Join Views," pp. 1-11 (Jun. 2003).

B.R. Badrinath et al, "Semantics-Based Concurrency Control: Beyond Commutativity," TODS pp. 163-199 (1992).

J. Gray et al., "Granularity of Locks and Degrees of Consistency in a Shared Data Base," IFIP Working Conference on Modeling in Data Base Management Systems, pp. 365-394 (1976).

(Continued)

*Primary Examiner*—Diane D. Mizrahi
(74) *Attorney, Agent, or Firm*—Trop, Pruner & Hu, P.C.; Harden E. Stevens, III

(57) ABSTRACT

A database system includes a transaction rescheduling mechanism that reorders pending transactions based on whether one or more of the pending transactions conflict with any transactions that have been scheduled for execution. In one arrangement, the received pending transactions are stored in a first queue. The transactions that are scheduled for execution are stored in a second queue. The transactions are moved from the first queue to the second queue based on the reordering by the transaction rescheduling mechanism.

37 Claims, 35 Drawing Sheets

OTHER PUBLICATIONS

J. Grey et al., "Transaction Processing: Concepts and Techniques," Morgan Kaufmann Publishers, pp. 403-406, 409-411, 413, 414, 419, 428, 429, 456-458, 464-481, 848-851, 868-872 (1993).

A. Kawaguchi et al., "Concurrency Control Theory for Deferred Materialized Views," ICDT pp. 306-320 (1997).

H.F. Korth, "Locking Primitives in a Database System," JACM pp. 55-79 (1983).

W. Labio et al., "Performance Issues in Incremental Warehouse Maintenance," VLDB pp. 461-472 (2000).

P.E. O'Neil, "The Escrow Transactional Method," TODS pp. 405-430 (1986).

M. Poess et al. "New TPC Benchmarks for Decision Support and Web Commerce," SIGMOD pp. 64-71 (2000).

R.F. Resende et al., "Semantic Locking in Object-Oriented Database Systems," OOPSLA, pp. 388-402 (1994).

A. Reuter, "Concurrency on High-traffic Data Elements," PODS, pp. 83-92 (1982).

M. Kornacker et al, "Concurrency and Recovery in Generalized Search Trees," SIGMOD pp. 62-72 (1997).*

D.B. Lomet, "Key Range Locking Strategies for Improved Concurrency," VLDB pp. 655-644 (1993).*

C. Mohan, "A Key-Value Locking Method for Concurrency Control of Multiaction Transactions Operating on B-Tree Indexes," VLDB, pp. 392-405 (1990).*

C. Mohan, "Commit LSN: A Novel and Simple Method for Reducing Locking and Latching in Transaction Processing Systems," VLDB pp. 406-418 (1990).*

* cited by examiner

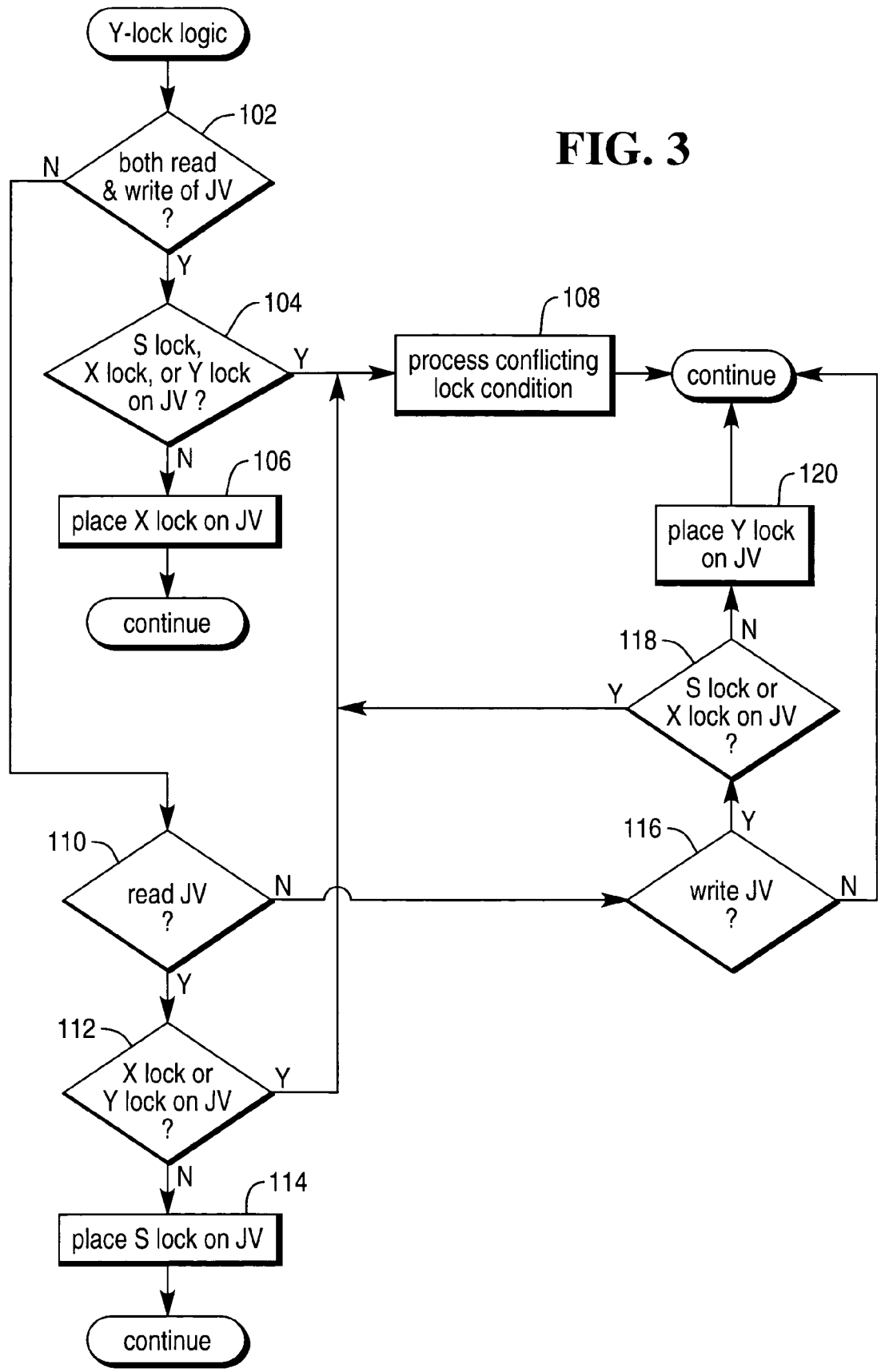

FIG. 15A
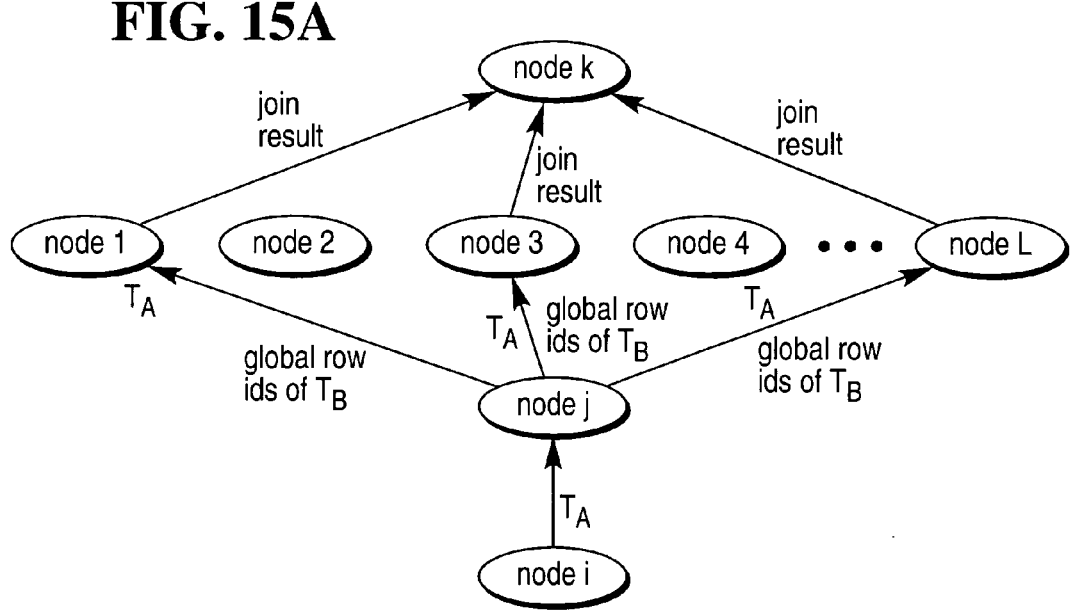
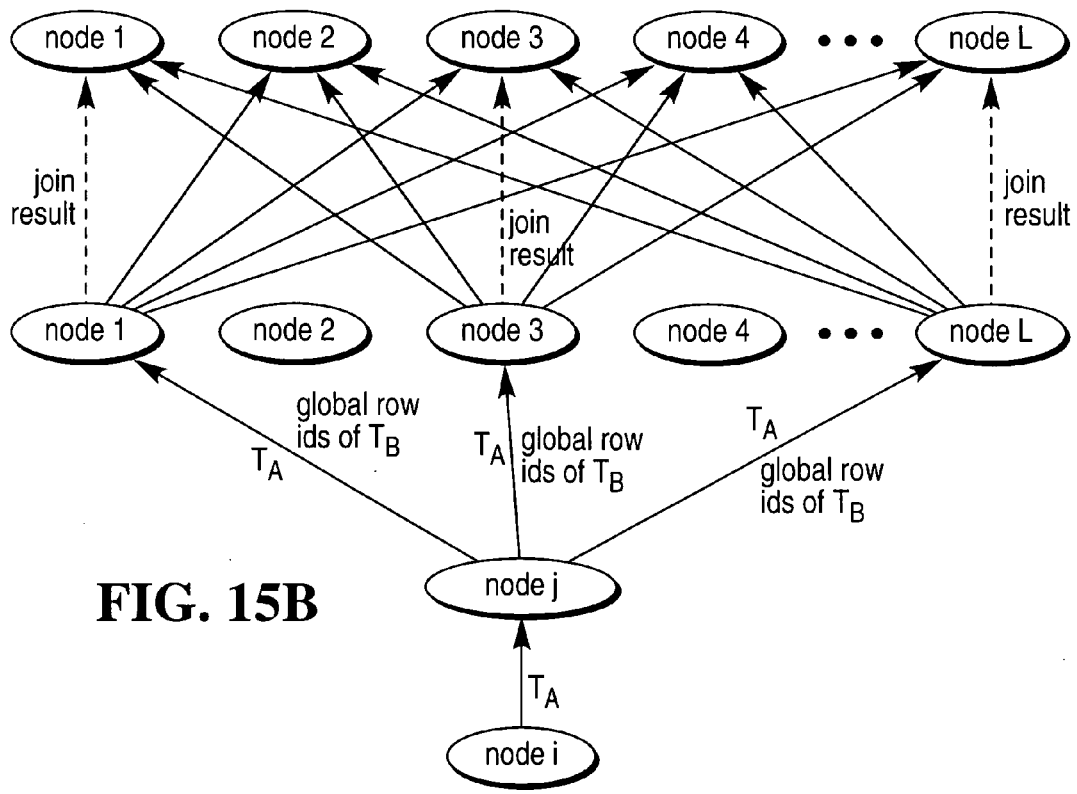
FIG. 15B

RESCHEDULING TRANSACTIONS IN A DATABASE SYSTEM

CROSS REFERENCE TO RELATED APPLICATION

This is related to U.S. Application entitled "Transaction Grouping and Rescheduling in a Database System," Ser. No. 10/121,191, filed concurrently herewith by Gang Luo, Curt J. Ellmann, Jeffrey F. Naughton, and Michael W. Watzke.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are used. A table (also referred to as a relation) is made up of multiple rows (also referred to as tuples). Each row (or tuple) includes multiple columns (or attributes).

Various other data structures are also typically associated with relations in a relational database system. For example, a view is a derived relation formed by performing a function on one or more base relations. Rather than storing the view, the function is typically recomputed each time the view is referenced. This type of view is referred to as an "ordinary view."

Unlike an ordinary view, a materialized view is a pre-computed, stored query result that can be used for some queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations. One type of view is the join view, which stores join results of multiple base relations.

A materialized view is updated when the underlying base relations are modified. As the base relations are changed through insertion of new tuples, deletion of tuples, or updates to existing tuples, the corresponding rows in the materialized view are changed to avoid becoming stale. This is known as materialized view maintenance.

Relational database systems can be used for data warehouse applications. A data warehouse collects information from several source databases. The collected information is integrated into a single database to be queried by the data warehouse clients.

Traditionally, data warehouses have been archival stores used for analysis of historical data. More recently, however, there has been a growing trend to use a data warehouse operationally (referred to as a "operational data warehouse" or "real-time data warehouse"), which involves making relatively real-time decisions about data stored in the data warehouse.

Traditional techniques of maintaining views are usually inadequate (in terms of processing speed) for operational data warehouses due to the real-time update requirements. Furthermore, materialized view maintenance in an operational data warehouse requires transactional consistency. If transactional consistency is enforced by traditional concurrency control mechanisms (including locking mechanisms), the ability of the database system to perform concurrent transactions may be reduced. This hurts performance in a database system, especially in a parallel database system having multiple processing modules.

A further issue involved in a database system is the occurrence of deadlock among different transactions. For transactional consistency, each transaction in a database typically places some type of lock on relations and views that are involved in the transaction. In some scenarios, the conflicting locks for multiple transactions are placed in the relations in such an order that none of the multiple transactions can proceed further—a deadlock condition. A deadlock among transactions reduces the ability of transactions to successfully complete in a database system, and as a result, system performance suffers.

SUMMARY

In general, a mechanism for rescheduling or reordering transactions is provided to reduce the likelihood of lock conflicts and/or deadlocks between transactions in a database system. For example, a method of scheduling transactions in a database system comprises receiving pending transactions, storing transactions in a queue for execution, and identifying one of the received pending transactions that does not conflict with any of the transactions in the queue. The identified transaction is moved into the queue.

Other or alternative features will become apparent from the following description, from the drawings, and from the claims.

BRIEF DESCRIPTION OF THE DRAWINGS

FIG. 3 is a flow diagram of logic for a Y-lock locking mechanism according to one embodiment for join view maintenance.

FIGS. 15A–15B illustrate join view maintenance with auxiliary indices.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Introduction

In accordance with some embodiments of the invention, a transaction rescheduling mechanism is used to reduce the number of occurrences of lock conflicts and/or deadlocks between or among transactions in a relational database system. In many database applications, materialized views (such as join views) are provided to improve database query processing, such as join processing. A common form of materialized view is the join view, which is a view that stores and maintains the result of a join of multiple base relations (also referred to as "base tables"). Although reference is made to "materialized views" in some described embodiments, the more general term "view" is intended to cover both ordinary views and materialized views. An ordinary view is a view that is not persistently stored in database storage, but rather is recomputed for each newly received query that involves the view.

The introduction of materialized views into a database system brings with it an increase in the number of lock conflicts that may arise due to write transactions. The conflicts are due to the dependencies introduced among base relations by each materialized view. When a base relation is updated, the corresponding materialized view must also be updated, and that update requires a read of the other base relations used by the materialized view.

The following provides an example query for creating a join view (JV) on two base relations (A, B):

CREATE JOIN VIEW JV AS
SELECT *
FROM A, B
WHERE A.c=B.d
PARTITIONED ON A.e;

The join view JV includes tuples (also referred to as "rows") of base relations A and B where the attributes (also referred to as "columns") A.c and B.d are equal. The join view JV is partitioned on the attribute A.e. In other examples, a join view can be stored for a join of more than two base relations. In the following description, the terms "table" and "relation" are used interchangeably. Also, a table or relation has rows (or tuples) and columns (or attributes). The terms "rows" and "tuple" are used interchangeably, and the terms "column" and "attribute" are used interchangeably.

Figure 1:
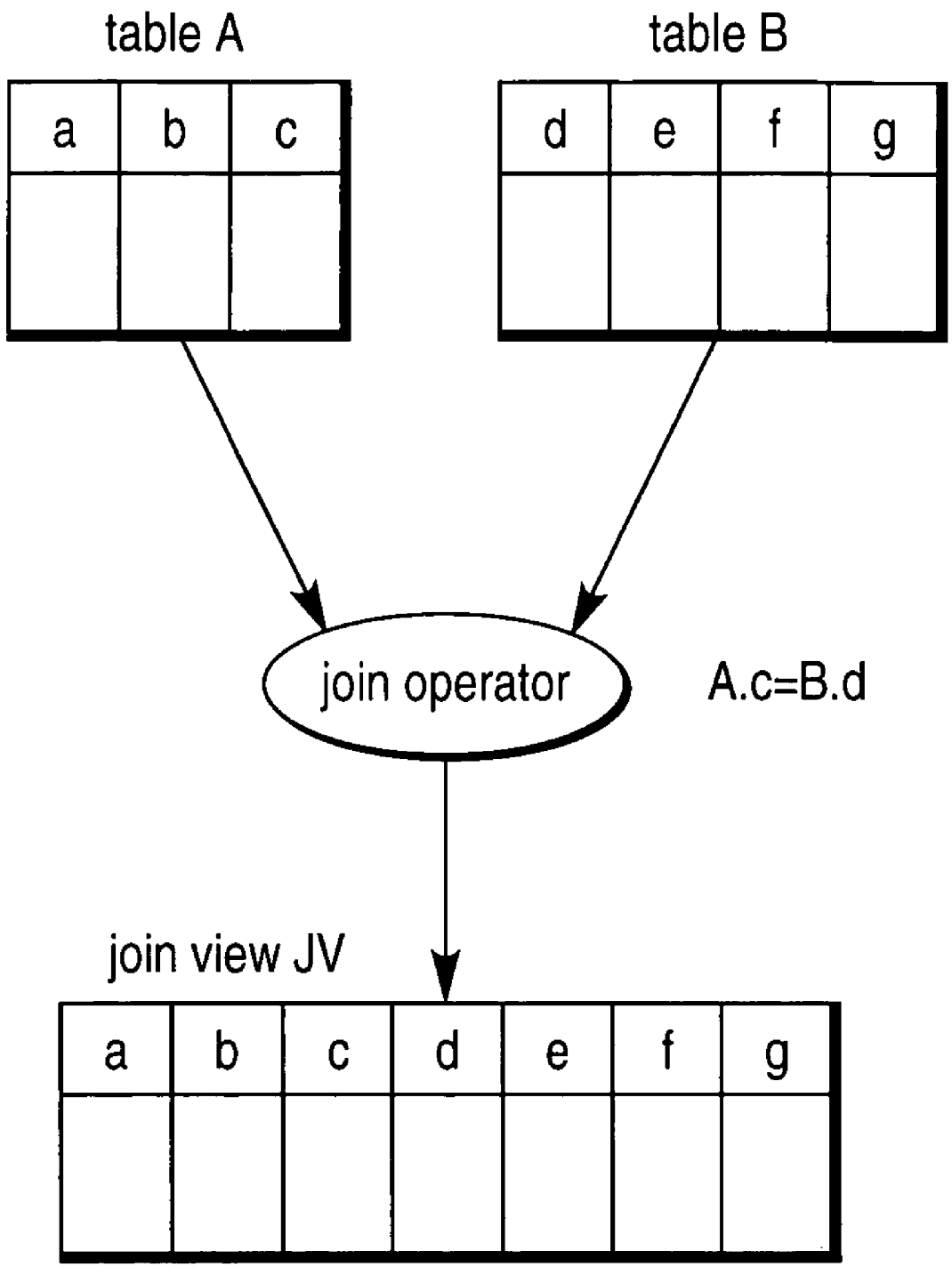
FIG. 1 illustrates an example join view based on multiple base relations.

The join relations A and B and the join view JV created as a result of the query is shown in FIG. 1. Relation A has attributes a, b, c, and relation B has attributes d, e, f, g. The "SELECT *" clause selects all attributes of relations A and B for insertion into the join view JV (which contains attributes a, b, c, d, e, f, g). Note that less than all attributes of relations A and B can be projected into the join view JV, in which case less than all of the attributes a, b, c, d, e, f, g, are stored in the join view JV.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of the table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If a transaction T attempts to update base relation R, the transaction has two choices: (1) T can place a table-level X lock on base relation R; or (2) T can place an IX lock on R and an X value lock on some value locking attribute of R. Similarly, if transaction T attempts to read base relation R, transaction T also has two choices: (1) T can place a table-level S lock on R; or (2) T can place an IS lock on R and an S value lock on some value locking attribute of R.

If materialized views are also stored in the database system, a locking mechanism is also provided for the materialized view. In one embodiment, a "Y-lock" locking mechanism is provided for the materialized view. In another embodiment, a "no-lock" locking mechanism is provided for the materialized view. In yet another embodiment, a "name-lock" locking mechanism is provided for the materialized view.

These locking mechanisms are designed to reduce the likelihood of lock conflicts between transactions that operate on a materialized view. Although such locking mechanisms on materialized views decrease the likelihood of lock conflicts due to the presence of materialized views, further reduction of lock conflicts is still desired by using a transaction rescheduling mechanism according to some embodiments. The transaction rescheduling mechanism according to some embodiments reorders pending transactions so that locks conflicts due to the presence of materialized views can be reduced. Additionally, query grouping can also be optionally used to group queries for the purpose of eliminating duplicate locks so that the number of locks placed on base relations and views are reduced.

In the following description, Section II describes an example database system architecture, and Sections III–VIII describe various locking mechanisms. Sections IX–X describe transaction rescheduling mechanisms according to several embodiments.

II. Example Database System Arrangement

Figure 2:
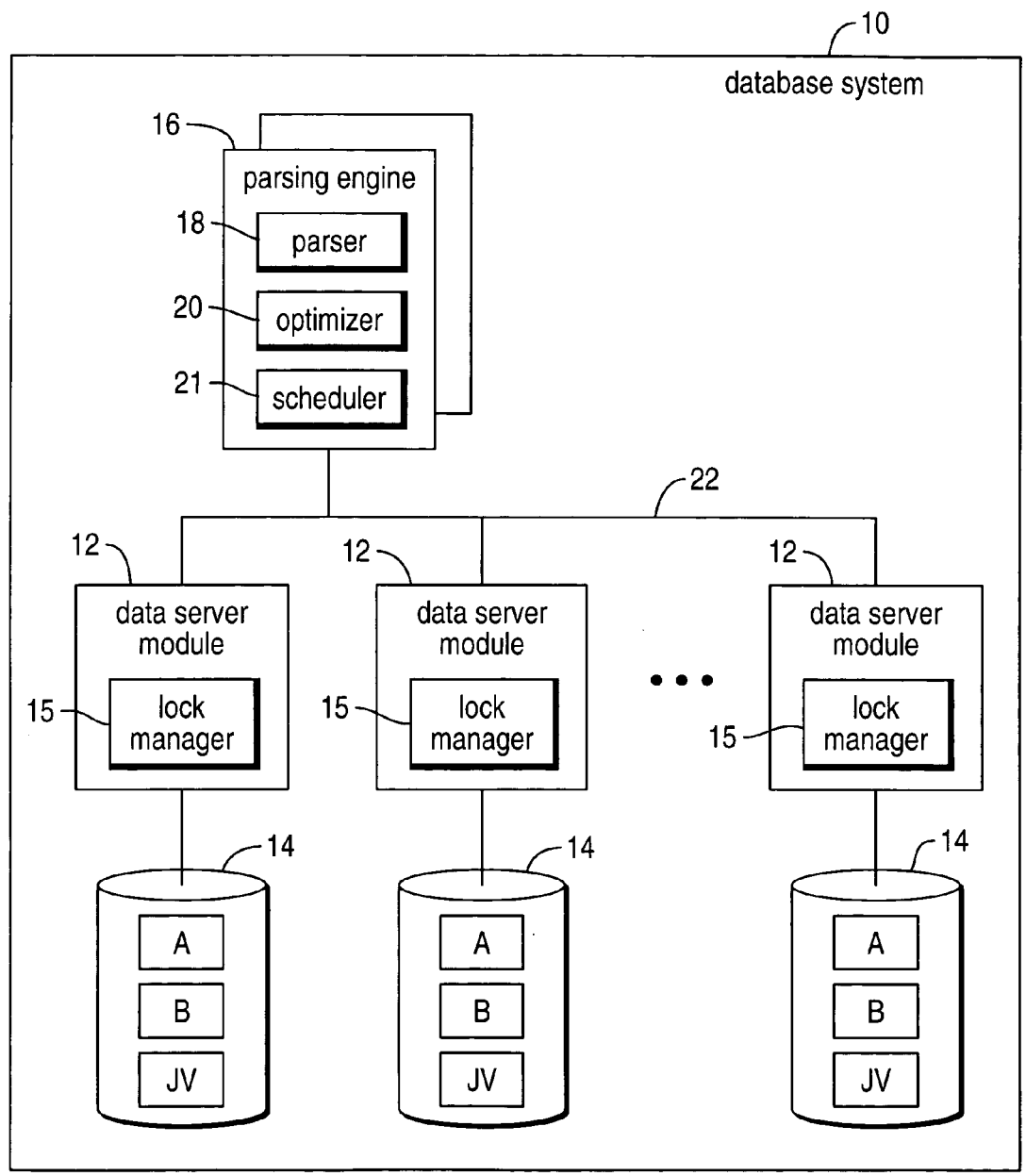
FIG. 2 is a block diagram of an example arrangement of a database system.

FIG. 2 shows an example arrangement of a database system 10 that stores base relations (e.g., A, B) and join views (e.g., JV). The database system 10 is a parallel database system having a plurality of data server modules 12. Each data server module 12 is responsible for managing the access to or modification of data stored in a respective storage module 14. Examples of the responsibilities of each data server module (also referred to as "an access module") include locking databases, tables, or portions of tables; creating, modifying, or deleting definitions of tables; inserting, deleting, or modifying rows within tables; and retrieving information from definitions and tables. The data server modules, after executing an action, also return responses to a requesting client. In one example implementation, the data server modules 12 are based on access module processors (AMPs) in TERADATA® database systems from NCR Corporation.

According to one embodiment, each data server module 12 includes a lock manager 15 to provide a locking mechanism according to some embodiments of the invention. Thus, the lock manager 15 is responsible for placing locks (e.g. table-level locks or value locks) on base relations and join views. As shown, the locking mechanism is distributed across plural data server modules 12. Alternatively, a centralized lock manager is employed.

In one embodiment, the requesting client that sends commands to the data server modules 12 include one or more parsing engines 16. The parsing engine(s) 16 receive requests from users or applications, which are in the form of queries according to a standard database query language (such as a Structured Query Language or SQL, as provided by the American National Standards Institute or ANSI). In other embodiments, other types of database query languages can be used.

Each parsing engine 16 includes a parser 18 and an optimizer 20. The parser 18 checks a received request for proper syntax and semantically evaluates the request. The optimizer 20 develops an execution plan for the received request. In some embodiments, the optimizer 20 uses a cost-based mechanism to select a least expensive (in terms of system resources utilized) execution plan for the query.

The execution plan includes a series of "steps" that are communicated by a scheduler 21 in a determined sequence to one or more of the data server modules 12 over a communications network 22. If the execution plan can be executed by one data server module 12, then the parsing engine 16 sends the one or more steps of the execution plan to the one data server module 12. However, if plural data server modules 12 are involved in the execution plan, the parsing engine 16 sends the step(s) to the plural data server modules 12. The sequence in which steps of an execution plan are executed is controlled by the scheduler 21.

In the example shown in FIG. 2, base relations A and B are stored in plural storage modules 14 associated with corresponding data server modules 12. Each base relation A or B is partitioned into plural partitions based on one or more selected attributes (referred to as the primary index) of the base relation. Each partition stored on a respective storage module 14 includes a subset of all the rows of the base relation. A join view (JV), such as a join view based on a join of tables A and B, is also partitioned across the plurality of storage modules 14. In the example join view CREATE statement above, the join view is partitioned on attribute A.e of base relation A. Thus, a first partition of the join view JV is stored on a first storage module 14 based on some value(s) of A.e; a second partition of JV is stored on a second storage module 14 base on some other value(s) of A.e; and so forth.

Although the storage modules 14 are shown as separate modules, they can be part of the same storage subsystem. Alternatively, the storage modules 14 can be separate storage devices. In another embodiment, instead of plural data server modules 12, the database system 10 can include only one data server module 12. The locking mechanism according to the various embodiments can be applied to a single-data server module database system rather than the multiple-data server module database system shown in FIG. 2.

III. Y-Lock Locking Mechanism

In accordance with one embodiment of the invention, the locking mechanism provided for the join view is a "Y-lock" locking mechanism. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Three types of table-level locks are allowed on a join view (JV): Y locks, S locks, and X locks. The conditions under which such table-level locks are allowed are shown by the logic of FIG. 3. The logic shown in FIG. 3 is performed by a data server module 12 in the database system 10 of FIG. 2. If more than one data server module 12 is involved in a particular transaction, then each data server module 12 performs the acts of FIG. 3 concurrently.

Upon receiving steps associated with a transaction, the data server module 12 first determines (at 102) if the transaction specifies both a read and write of the join view JV. As used here, writing a view is also referred to as updating or modifying the view. If the transaction specifies both a read and write of JV, then the data server module 12 determines (at 104) if an S lock, X lock, or Y lock is currently active on the join view JV. If none of an S lock, X lock, or Y lock is active on the join view JV, the data server module 12 places (at 106) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 104) that any of the S lock, X lock, or Y lock is active on JV, the data server module 12 performs (at 108) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 102), the data server module 12 checks (at 110) if the transaction involves a read (but not a write) of the join view. If so, the data server module 12 checks (at 112) if there is either a Y lock or an X lock on JV. If neither a Y lock nor X lock is currently active on JV, the data server module 12 places (at 114) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 108) the conflicting lock condition.

If the transaction does not involve a read of the join view JV, the data server module checks (at 116) if the transaction involves a write (but not a read) of the join view JV. If so, the data server module 12 checks (at 118) if there is either an S lock or an X lock on JV. If not, then the data server module 12 places (at 120) a Y lock on the join view JV.

However, if either an S lock or an X lock is presently active on JV, the data server module 12 processes (at 108) the conflicting lock condition.

The discussion above refers to placing a table-level Y lock on a join view. The Y-lock locking mechanism for join views is extendable to also allow value locks on join views. Consider a join view JV defined on base relations $R_1$, $R_2$, . . . , and $R_n$. For a fixed i ($1 \leq i \leq n$), suppose that $R_i.a_i$ is an attribute of base relation $R_i$ that also appears in JV. This is the case for the example join view JV of FIG. 1. Then X and S value locking on $R_i.a_i$ for JV is allowed. For example, consider a transaction T that only updates base relation $R_i$. If the update to base relation $R_i$ specifies the value(s) of $R_i.a_i$, then transaction T can also place an IY lock on JV and one or several X value locks (not Y value locks) on $R_i.a_i$ for JV. If transaction T reads JV by specifying the $R_i.a_i$ value(s), then transaction T can put an IS lock on JV and one or several S value locks on $R_i.a_i$ for JV. If transaction T both reads and updates JV by specifying the $R_i.a_i$ value(s), then transaction T can put an IX lock on JV and one or several S value locks and X value locks on $R_i.a_i$ for JV.

The IY lock is similar to the traditional IX lock except that it is compatible with a Y lock or another IY lock. As with the IX lock, the table-level IY lock is placed on the join view JV in conjunction with an X value lock of JV to indicate to subsequent transactions that table-level X or S locks on JV are blocked (however, a table-level Y or IY lock on JV is still possible in the presence of the IY lock with X value lock). Also, a subsequent IS lock with an S value lock on JV is allowed in the presence of an IY lock with X value lock on JV. Note, however, that an X value lock on JV is incompatible with an S value lock placed on the same attribute value of JV.

For a transaction that performs both a (table-level) read and (value) write of the join view JV, both an S lock and X value lock are needed on the join view JV. In this case, a table-level SIY lock (which is equivalent to an S lock and an IY lock) is placed on JV. The SIY lock is similar to the traditional SIX lock. One can think that IX=IS+IY. An SIX lock is equivalent to an S lock and an IX lock (for an X value lock). The Sly lock is only compatible with the IS lock.

Note that SIX=S+IX=S+(IS+IY)=(S+IS)+IY=S+IY=SIY. Thus, the SIX lock is the same as the SIY lock.

If transaction T both updates JV (without specifying the $R.a_i$ value(s)), which is a table-write, and reads JV (specifying the $R_i.a_i$ value(s)), which is a value-read, then transaction T requires both a Y lock and S value lock(s) on JV. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 1.

TABLE 1

|     | Y   | S   | X   | IS  | IY  | IX  | SIY | YIS |
| --- | --- | --- | --- | --- | --- | --- | --- | --- |
| Y   | yes | no  | no  | no  | yes | no  | no  | no  |
| S   | no  | yes | no  | yes | no  | no  | no  | no  |
| X   | no  | no  | no  | no  | no  | no  | no  | no  |
| IS  | no  | yes | no  | yes | yes | yes | yes | no  |
| LY  | yes | no  | no  | yes | yes | yes | no  | yes |
| IX  | no  | no  | no  | yes | yes | yes | no  | no  |
| SIY | no  | no  | no  | yes | no  | no  | no  | no  |
| YIS | no  | no  | no  | no  | yes | no  | no  | no  |

According to Table 1, a Y lock on JV is compatible with another Y lock or an IY lock on JV. However, the Y lock is incompatible with a table-level S lock, X lock, IS lock, IX lock, SIY lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SIY lock (S+IY lock) is compatible with an IS lock, but not with any other locks. A YIS lock (Y+IS lock) is compatible with an IY lock, but not with any other locks.

To show that the Y-lock locking mechanism keeps the isolation property (serializability) of transactions, the following assertions are proven for a join view JV defined on base relations $R_1, R_2, \ldots$, and $R_n$:

Assertion 1: Transaction T's writes to join view JV are neither read (first part of Assertion 1) nor written (second part of Assertion 1) by other transactions until transaction T completes (aborts or commits).

Assertion 2: Transaction T does not overwrite dirty data of other transactions (data that is being modified by other transactions) in join view JV.

Assertion 3: Transaction T does not read dirty data of other transactions in join view JV.

Assertion 4: Other transactions do not write any data in join view JV that is read by transaction T before transaction T completes.

The four assertions are first proven for the simple case where $JV = \sigma(R_1 \bowtie \ldots \bowtie R_i \ldots \bowtie \ldots \bowtie R_n)$, where $\sigma$ denotes a selection operator. The assertions are also proven (further below) for the general case where $JV = \pi(\sigma(R_1 \bowtie \ldots \bowtie R_i \bowtie \ldots \bowtie R_n))$, where $\pi$ is a projection operator. Selection refers to selecting rows of base relations to place into JV based on the rows satisfying the join condition. Projection refers to projecting only those attributes that are in the select list of the join query into the join view JV. Less than all attributes of each base relation can be projected into the join view TV.

It is assumed that join view JV allows duplicate tuples. If no duplicate tuples are allowed in JV, assume that each tuple in JV has a dupent (or some other named parameter) attribute recording the number of copies of that tuple. The following assumptions are made (the other more complex cases can be proven in a similar way): (1) any transaction T updates at most one base relation of JV; and (2) if transaction T tries to update base relation $R_i (1 \leq i \leq n)$, it places a Y lock on JV and an S lock on each $R_j (1 \leq j \leq n, j \neq i)$. For example, if a join view JV is defined on base relations A, B, and C, an update of A causes an X lock or IX lock to be placed on A, and a Y lock to be placed on JV. In addition, an S lock is placed on each of the other base relations B and C.

If transaction T writes join view JV, T places a table-level Y lock on JV until T completes. If transaction T both reads and writes join view JV, T places a table-level X lock on JV until T completes. Thus transaction T's writes to join view JV are not read by any other transaction T' until transaction T completes, since T' requires a table-level S lock on JV (which would conflict with the Y lock or X lock on JV for transaction T). This proves the first part of Assertion 1.

Additionally, if transaction T writes join view JV, there are two possible cases:

Case 1: Transaction T both reads and updates join view JV. In this case, transaction T puts a table-level X lock on JV until it completes. This X lock will block other transactions from writing JV (by blocking other Y or X lock requests).

Case 2: Transaction T updates the base relation $R_i$ $(1 \leq i \leq n)$. Transaction T puts an S lock on each $R_j$ $(1 \leq j \leq n, j \neq i)$ until T completes. If another transaction T' tries to write join view JV before transaction T completes, transaction T' can only update the same base relation $R_i$. This is because if transaction T' updates another base relation $R_j$ $(1 \leq j \leq n, j \neq i)$ of join view JV, the requirement of an IX or X lock on $R_j$ for transaction T' will be blocked by the existing S lock on $R_j$ that is placed by transaction T.

Suppose that transactions T and T' update $\Delta R_i$ and $\Delta R_i'$ of base relation $R_i$, respectively. $\Delta R_i$ refers to the changed portion of $R_i$ made by transaction T, and $\Delta R_i'$ refers to the changed portion of $R_i$ made by transaction T'. There are three possible scenarios:

Scenario 1: If transaction T puts a table-level X lock on base relation $R_i$, transaction T' will get blocked when it tries to get either a table-level X lock or a table-level IX lock on $R_i$.

Scenario 2: If transaction T puts a table-level IX lock on base relation $R_i$, transaction T' will get blocked if it tries to get a table-level X lock on $R_i$.

Scenario 3: Suppose that transaction T puts a table-level IX lock and one or several X value locks on base relation $R_i$. Also, transaction T' tries to put a table-level IX lock and one or several X value locks on base relation $R_i$. There are two cases:

(a) $\Delta R_i \cap \Delta R_i' \neq \emptyset$ ($\Delta R_i$ intersects with, or overlaps, $\Delta R_i'$). The requirement of X value locks on $R_i$ for transaction T' will be blocked by the existing X value locks on $R_i$ that is put by transaction T, since T and T' are changing the same portion of $R_i$ (the portion that overlaps).

(b) $\Delta R_i \cap \Delta R_i' = \emptyset$ ($\Delta R_i$ does not intersect with $\Delta R_i'$). Then $\sigma (R_1 \bowtie \ldots \bowtie \Delta R_i \bowtie \ldots \bowtie R_n) \cap \sigma(R_1 \bowtie \ldots \bowtie \Delta R_i' \bowtie \ldots \bowtie R_n) = \emptyset$. In other words, the intersection of the updates to JV by transactions T and T' is empty.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on JV. If some other transaction T' is writing any data in join view JV, T' will place a table-level Y lock (or X lock) on JV until T' completes. The required table-level S lock on JV for transaction T will be blocked by the table-level Y or X lock on JV for transaction T'. Thus transaction T does not read dirty data from transaction T' in join view JV (this proves Assertion 3). The case that transaction T tries to both read and update the join view JV can be proved similarly, since the required X lock will be blocked by the Y or X lock for transaction T'.

If transaction T reads join view JV, T will place a table-level S lock on JV until T completes. If transaction T both reads and writes join view JV, T will place a table-level X lock on JV until T completes. Thus no other transaction T' can write any data in JV until transaction T completes, since T' requires a table-level Y lock (or X lock) on JV. This proves Assertion 4.

Figure 4A:
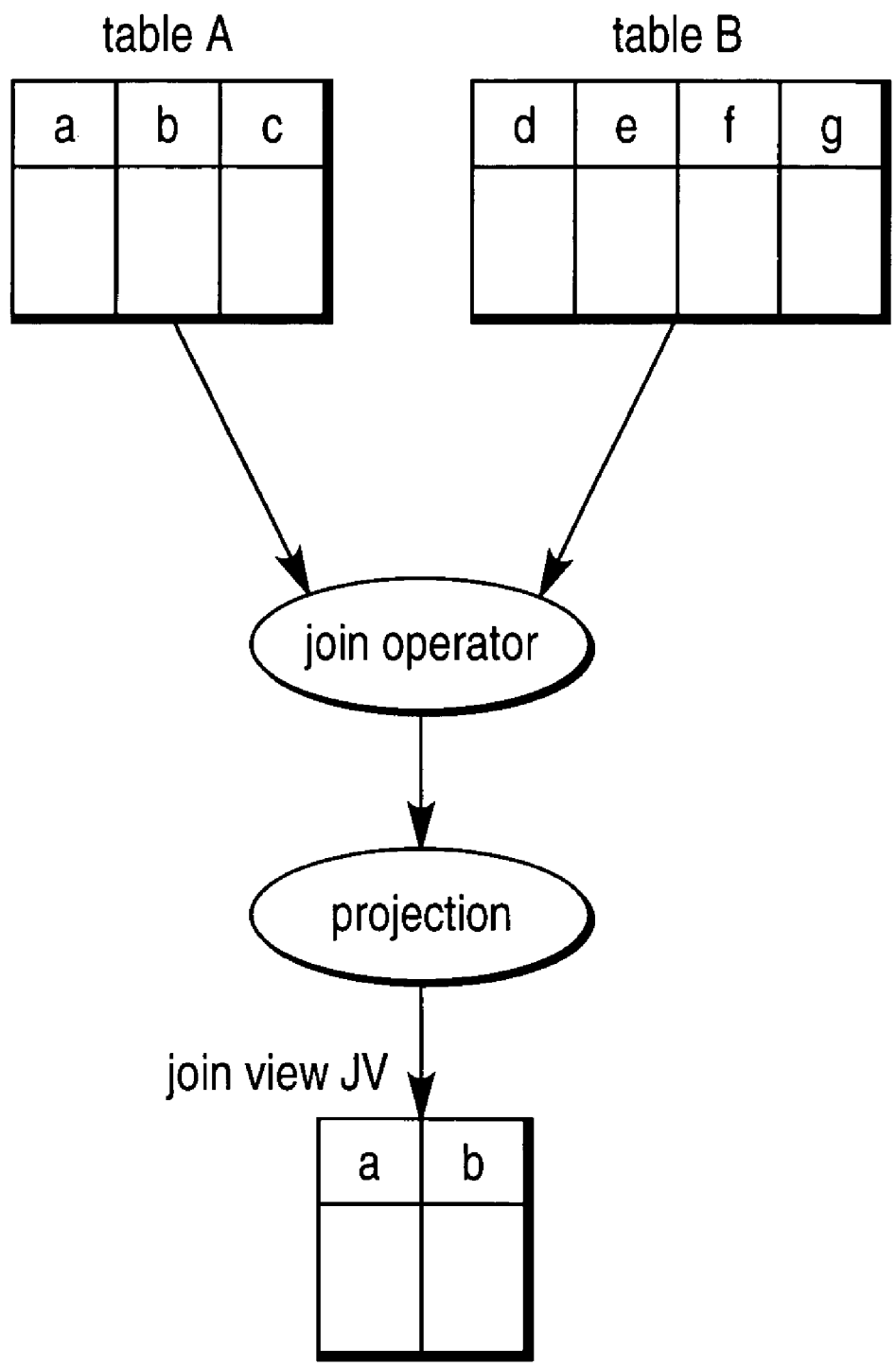
FIGS. 4A–4C illustrate example join views based on multiple base relations with projection or aggregation applied.

The proof for the general case where $JV=\pi(\sigma(R_1\bowtie \ldots \bowtie R_i\bowtie \ldots \bowtie R_n))$ is discussed here. When projection is applied, less than all the attributes of the base relations $R_i$ ($1\leq i\leq n$) will be in a join view JV based on the base relations $R_1, R_2, \ldots, R_n$. This is illustrated in FIG. 4A. In the example, the join view JV contains only attributes A.a and A.b. The other attribute A.c of relation A and attributes B.d, B.e, B.f, B.g of relation B are not in JV. In this general case, the proofs of the four assertions are the same except for the case where $\Delta R_i \cap \Delta R_i' = \emptyset$ in Assertion 1. In this case, a virtual join view $JV'=\sigma(R_1\bowtie \ldots \bowtie R_i\bowtie \ldots \bowtie R_n)$ is defined conceptually (that is, JV' is an imaginary table that does not exist in the database system). The virtual join view is a join view without the projection applied. Therefore, JV' contains all attributes of the base relations. Each tuple in the actual join view JV comes from (and is a subset of) one tuple in JV'. Conceptually, if the tuples in JV are expanded to include all the attributes of JV', then the tuples in JV are different from each other. After computing the change $\Delta=\sigma(R_i\bowtie \ldots \bowtie \Delta R_i\bowtie \ldots \bowtie R_n)$, for each tuple $TA_1$ in $\Delta$, there are three possible cases:

Case 1: Tuple $TA_1$ is inserted into $\Delta$. This means that $\pi(TA_1)$ needs to be inserted into JV. We insert $\pi(TA_1)$ into JV. Conceptually, the expanded tuple of $\pi(TA_1)$ is $TA_1$.

Case 2: Tuple $TA_1$ is updated into $TA_2$ in $\Delta$. This means that tuple $\pi(TA_1)$ needs to be updated into $\pi(TA_2)$ in JV. A tuple $TA_3$ in JV that is equal to $\pi(TA_1)$ can be identified. Note that there may be several tuples in UV that are equal to $\pi(TA_1)$. However, conceptually, it can be thought that the expanded tuple of the identified tuple $TA_3$ is equal to $TA_1$. Then tuple $TA_3$ in JV is updated from $\pi(TA_1)$ to $\pi(TA_2)$. Conceptually, it can be thought that the expanded tuple of the updated $TA_3$ is $TA_2$.

Case 3: Tuple $TA_1$ is deleted from $\Delta$. This is similar to case 2.

For example, suppose each tuple without projection originally has three attributes (a, b, c). After projection, the tuple only contains two attributes (a, b). Suppose there are tuples T1=(1, 2, 3), T2=(1, 2, 4), and T3=(1, 5, 6). After projection, the tuples become T1'=(1, 2), T2'=(1, 2), T3'=(1, 5). Thus, the expanded tuple of T1' is $T_1$, the expanded tuple of T2' is T2, and the expanded tuple of T3' is T3. Suppose the tuple T2=(1, 2, 4) is updated to (1, 8, 5). Then, after projection, one of the tuples (1, 2) is changed to (1, 8). However, T1' and T2' look the same. Suppose T1' is changed from (1, 2) to (1, 8). Note T2' originally comes from T2, so T2' should be changed instead of T1'. However, a distinction between T1' and T2' in JV cannot be made as they look the same. The tuples before the projection become T1=(1, 2, 3), T2=(1, 8, 5), and T3=(1, 5, 6). The tuples after projection become T1'=(1, 8), T2'=(1, 2), T3'=(1, 5).

However, conceptually, it can be thought that the expanded tuple of T1' is T2, the expanded tuple of T2' is T1, and the expanded tuple of T3' is T3. That is, conceptually it can be thought that the expanded tuple of the identified tuple, $T_1'$, is equal to tuple T2, even if T1' originally comes from tuple T1. Note tuples in the relation have no order. If the order of tuples in the relation is switched, the same relation can be obtained. Thus, if the order of T1' and T2' is switched, the tuples after projection become T1'=(1, 2), T2'=(1, 8), T3'=(1, 5). Then it can be thought that the expanded tuple of T1' is $T_1$, the expanded tuple of T2' is T2, and the expanded tuple of T3' is T3. The key point is that tuples in the JV with the same value have no difference and thus can be treated in any way.

Thus, conceptually, $$\pi(\sigma(R_1\bowtie \ldots \bowtie \Delta R_i \bowtie \ldots \bowtie R_n)) \cap \pi(\sigma(R_1\bowtie \ldots \bowtie \Delta R_i'\bowtie \ldots \bowtie R_n))=\emptyset$$

That is, the intersection of the updates to JV by transactions T and T' is empty. Consequently, transaction T's writes to join view JV are not written by any other transaction T' until transaction T completes (this proves part 2 of Assertion 1 for the general case).

Figure 4B:
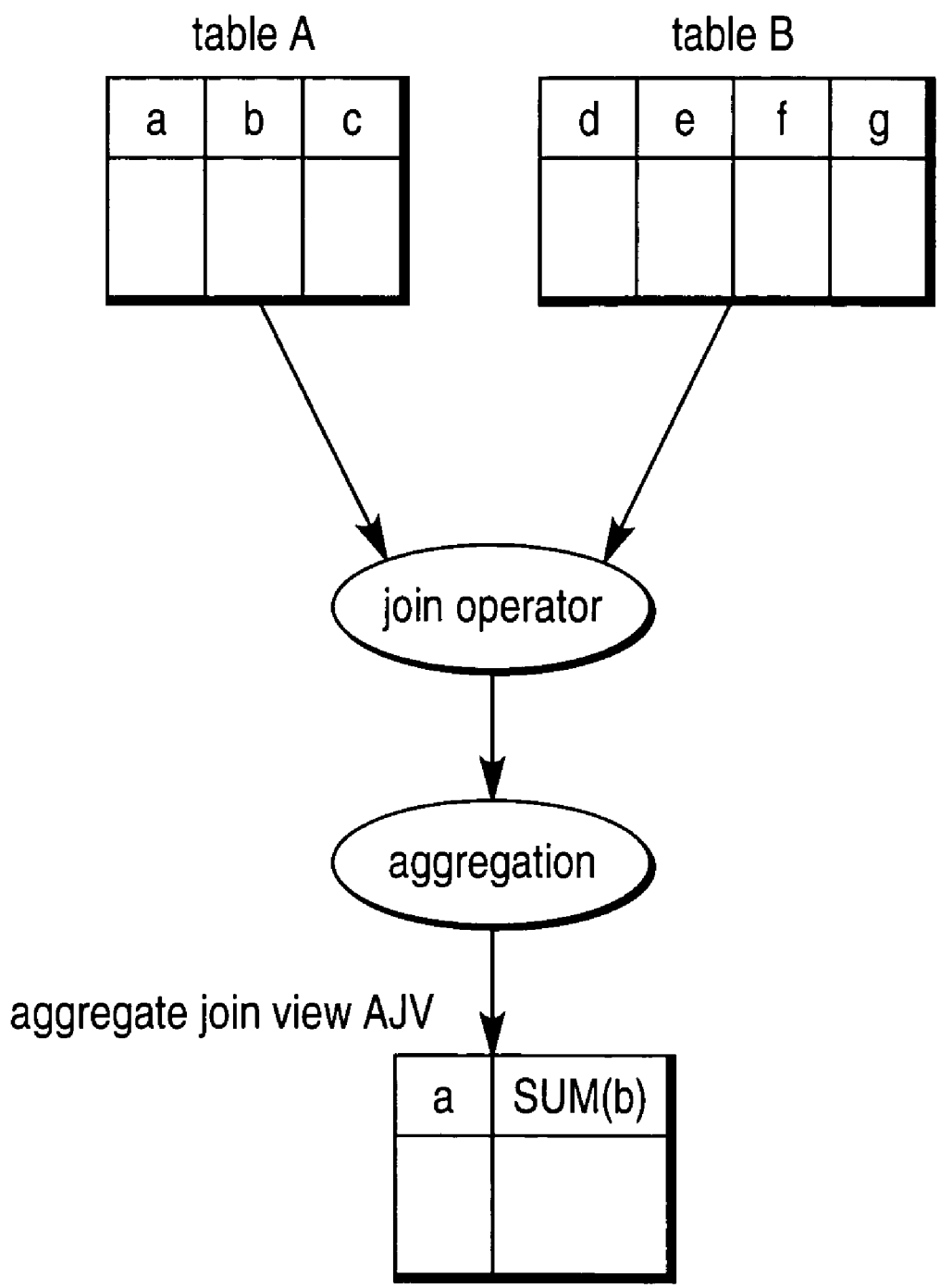

The Y-lock locking mechanism for join views also applies to aggregate join views. An example aggregate join view AJV is created as follows:

CREATE JOIN VIEW AJV AS
SELECT A.a, SUM (A.b)
FROM A, B
WHERE A.c=B.d
GROUP BY A.a;

As shown in FIG. 4B, the aggregate join view AJV contains an attribute A.a and a sum of the attribute A.b. SUM is one type of aggregate function, with other aggregate functions including COUNT, AVG, and so forth.

Consider an aggregate join view $v=\gamma(\pi(\sigma(R_1\bowtie \ldots \bowtie R_i \bowtie \ldots \bowtie R_n)))$, where $\gamma$ is the aggregation operator. A virtual (imaginary) join view $JV=\pi(\sigma(R_1\bowtie \ldots \bowtie R_i\bowtie \ldots \bowtie R_n))$ is defined so that $AJV=\gamma(JV)$. In other words, the aggregate join view AJV is equal to the virtual join view after aggregation.

Figure 4C:
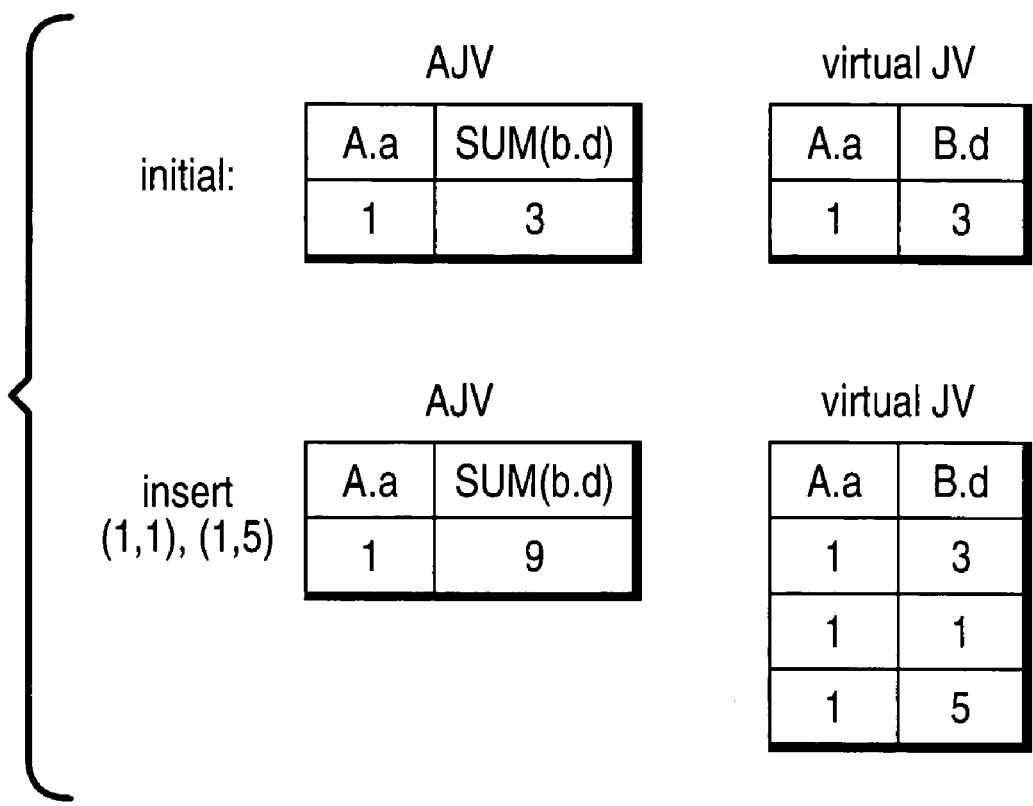

An example of this is illustrated in FIG. 4C. Assume that the schema of AJV is (A.a, SUM(B.d))—in other words, AJV has two attributes: A.a and the sum of B.d. Assume that initially AJV has one tuple (1, 3). Subsequently, as a result of a new transaction(s), join result tuples (1, 1) and (1, 5), which are results due to a join of base relations A and B, are to be inserted into AJV. The join result tuples are not inserted into new rows of AJV, but rather, the existing row in AJV is updated by summing B.d values of the join result tuples to the existing tuple of AJV. Thus, AJV is updated by updating SUM(B.d), which is 3+1+5=9. Thus, after the update, AJV has the tuple (1, 9).

For purposes of proving the assertions above, the virtual or imaginary JV remains consistent with AJV. The schema of the virtual join view JV is (a, d). Aggregation is not performed on the virtual join view JV so that the join result tuples are added into new rows of the virtual join view JV. However, note that aggregation of the virtual join view JV will cause it to result in AJV.

Thus, whenever AJV is updated by $\Delta$, conceptually, the corresponding tuples that produce $\Delta$ are updated in the virtual join view JV. By the above reasoning, if the virtual join view JV is considered instead of the aggregate join view AJV, then any parallel execution of the transactions are equivalent to some serial execution of these transactions. AJV is always set equal to $\gamma(JV)$. Thus if the virtual join view JV is replaced by AJV, any parallel execution of the transactions are still equivalent to some serial execution of the transactions. This provides the four assertions above.

Figure 5A:
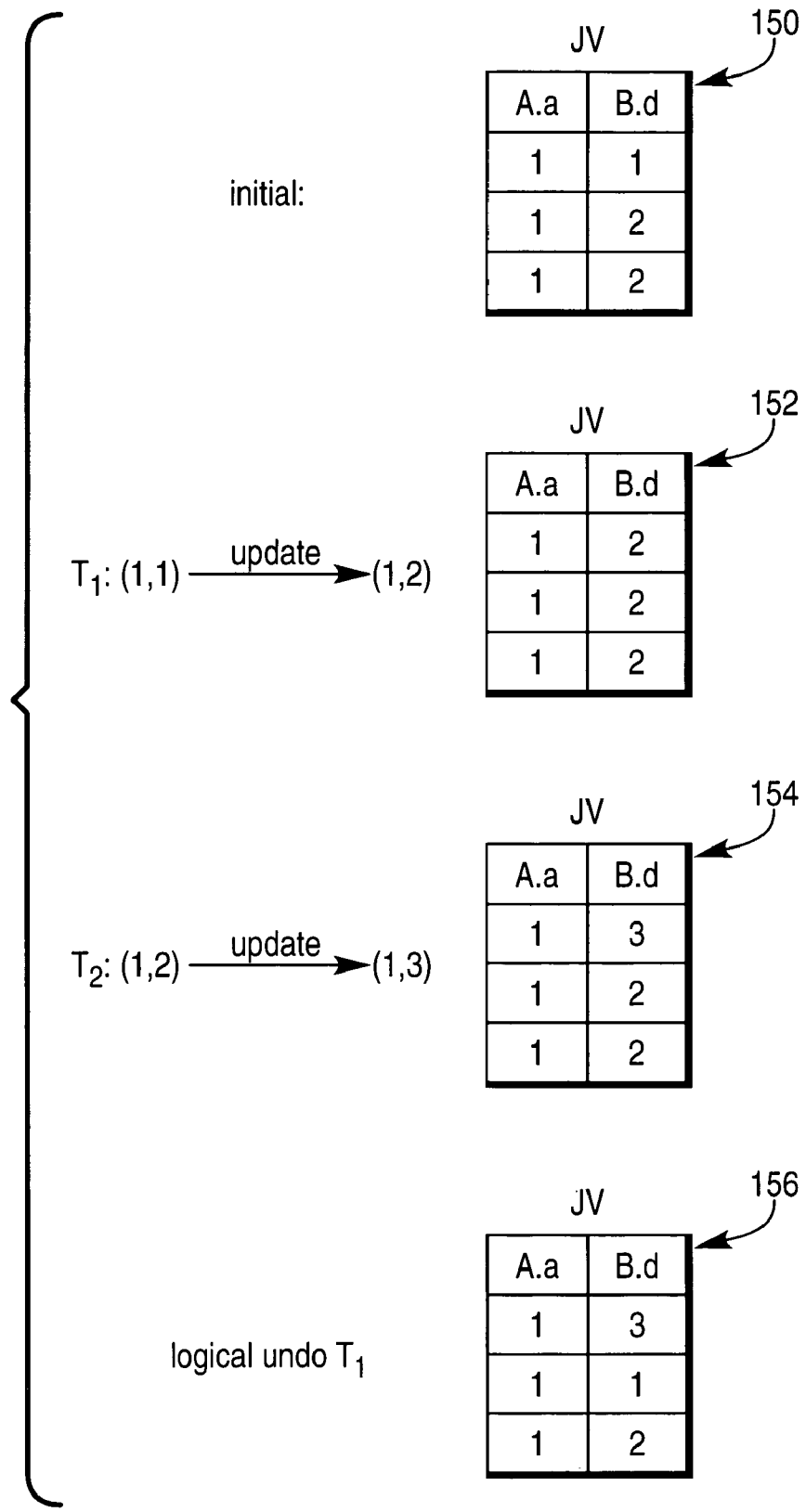
FIGS. 5A–5B illustrate examples of a logical undo mechanism.

As noted above, a benefit of the Y-lock locking mechanism is that multiple transactions can place Y locks concurrently on the same join view JV to enhance database performance. However, in the context of projection join views and aggregate join views, a physical undo of an update of a join view due to a first transaction ($T_1$) that aborts may not be possible. An example is illustrated in FIG. 5A. Assume that projection JV initially contains three tuples (1, 1), (1, 2), and (1, 2), shown as 150 in FIG. 5A. In this example, the projection JV allows duplicate tuples. The scheme of JV is (A.a, B.d). Due to projection, less than all of the attributes of base relations A and B are in the projection JV.

The first transaction $T_1$ updates the tuple (1, 1) in JV to (1, 2). The modified projection JV is shown as 152, where (1, 1) has been changed to (1, 2). In the example, another transaction $T_2$ is also active. $T_2$ updates tuple (1, 2) in JV to (1, 3). The modified projection JV is shown as 154.

After the $T_2$ update, the first transaction $T_1$ aborts. In that case, the tuple (1, 2) that was changed from (1, 1) needs to be un-updated back to (1, 1). However, that tuple has already been changed to (1, 3) by transaction $T_2$, so a physical undo of that tuple is not feasible.

In accordance with some embodiments, a logical undo is performed. In the logical undo, the database system looks for another tuple in the join view JV that has the attribute values (1, 2). That other tuple is changed to the value (1, 1) for a logical undo of transaction $T_1$, shown as 156 in FIG. 5A.

Figure 5B:
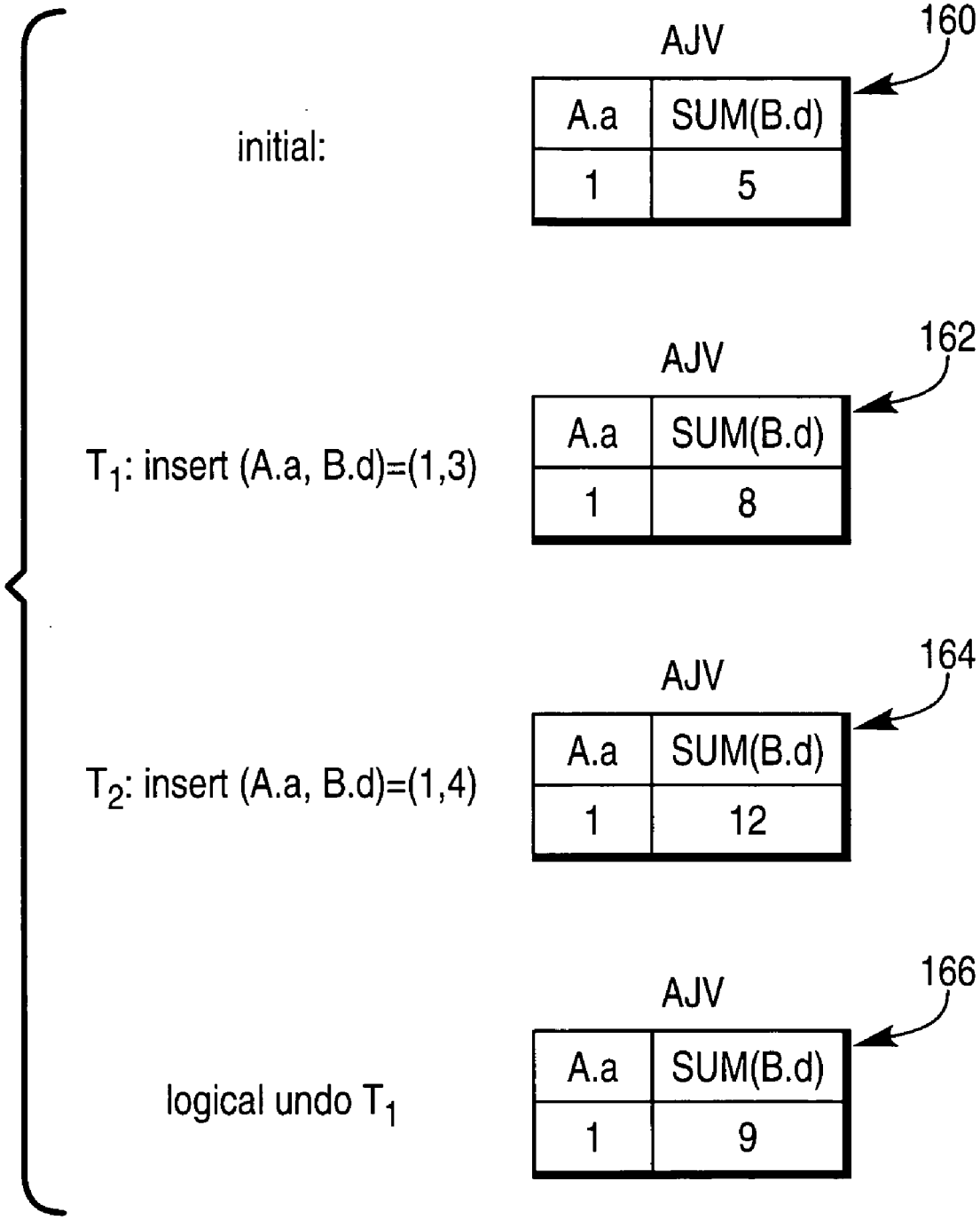

A logical undo is also used for aggregate join views. As shown in FIG. 5B, assume AJV has the scheme (A.a, SUM(B.d)) and initially has the tuple (1, 5), shown as 160. Transaction $T_1$ causes a join result tuple (1, 3), with scheme (A.a, B.d), to be inserted into AJV. This causes the AJV entry to be updated to (1, 8), shown as 162. Before $T_1$ completes, $T_2$ causes a join result tuple (1, 4) to be inserted into AJV, which causes the tuple in AJV to be updated to (1, 12), shown as 164.

If $T_1$ aborts, a physical undo is not possible, since the entry (1, 8) no longer exists in AJV. Therefore, a logical undo is performed to change the tuple (1, 12) in AJV to (1, 9), shown as 166. This removes the contribution of the (1, 3) tuple for transaction $T_1$ from the AJV.

By reducing the occurrences in which transactions block each other due to locks placed on a materialized view, such as a join view, database system performance is enhanced. This is especially beneficial in a parallel database system having plural data server modules, such as that shown in FIG. 2, where the ability to perform steps of multiple transactions on separate data server modules increases database throughout. For example, a portion of one transaction that updates the join view can be performed in a first data server module concurrently with a portion of another transaction that updates the join view on a second data server module.

IV. No-Lock Locking Mechanism

In accordance with another embodiment, instead of a Y-lock locking mechanism, a "no-lock" locking mechanism is employed for the join view JV. One purpose of placing a Y lock on a join view JV during an update of the join view in a first transaction is to prevent other transactions from reading JV, as write conflicts on the join view JV have already been handled by placing proper locks on the base relations of JV. However, in another embodiment, according to the "no-lock" locking mechanism, a Y lock (or any other type of lock) on the join view JV can be omitted while still protecting the join view JV as well as maintaining transaction serializability. A benefit of not placing any lock on the join view reduces the overhead associated with maintaining join views in response to update of base relations. Many transactions in the database system 10 are small updates that involve single-tuple or few-tuple updates to base relations of a join view. If locks (such as Y locks) are required for all such small updates, then the required locks may cause a bottleneck, since the lock manager may become tied up with many lock requests.

Figure 6:
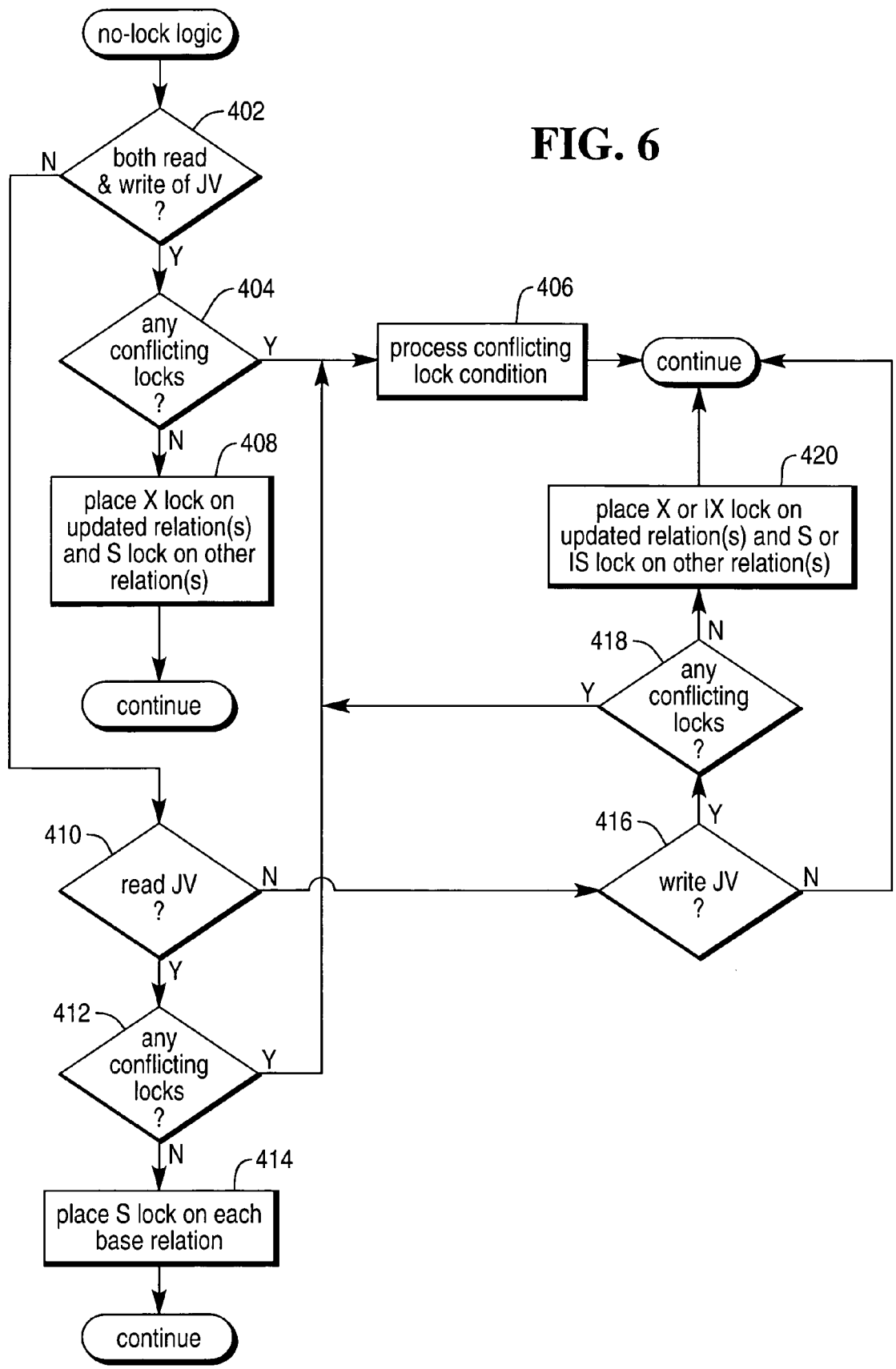
FIG. 6 is a flow diagram of logic for a no-lock locking mechanism according to another embodiment for join view maintenance.

In some embodiments, a join view cannot be directly updated or modified. In other words, a join view JV is updated or modified by updating the base relations of the join view JV. FIG. 6 illustrates the logic according to one embodiment of the no-lock locking mechanism.

In the discussion below, it is assumed that a join view JV is defined on base relations $R_1, R_2, \ldots,$ and $R_n$. As shown in FIG. 6, a data server module 12 determines (at 402) if a transaction requires both a read and write of the join view JV. A write of JV occurs through write(s) of one or more base relation(s) $R_{t_1}, R_{t_2}, \ldots, R_{t_h}$ ($\{t_1, t_2, \ldots, t_h\}(1,2,\ldots,n\})$) on which JV is defined. If the data server module 12 determines (at 402) that the transaction involves both a read and write of JV, the data server module 12 next checks (at 404) if any conflicting locks are placed on the base relations $R_1, R_2, \ldots,$ and $R_n$. If so, then the data server module 12 performs (at 406) conflicting lock processing, which in one example involves waiting for the conflicting lock(s) to be released.

If no conflicting locks on the base relations are detected, then the data server module 12 places a table-level X lock (at 408) on each base relation $R_{t_u}$ ($1 \leq u \leq h$) that is being updated. Note that the required table-level X lock on each relation $R_{t_u}$ would conflict with an X lock, S lock, IX lock, or IS lock. The data server module 12 also places a table-level S lock on each other base relation $R_j$ ($j \in \{1, 2, \ldots, n\} - \{t_1, t_2, \ldots, t_h\}$). Note that the table-level S lock on each $R_j$ required for the received transaction would conflict with an X lock or IX lock that has been placed on $R_j$. Thus, assuming no conflicting locks are present, an X lock is placed on each base relation that is updated, while an S lock is placed on the base relation(s) not being updated.

The table-level X lock on each base relation that is being updated can be replaced with a less restrictive SIX lock (S+IX) if the following condition is satisfied: the update of $R_{t_u}$ ($1 \leq u \leq h$) specifies value locking attribute values of $R_{t_u}$.

If the data server module 12 determines (at 402) that the transaction does not involve both a read and write of the join view JV, then the data server module 12 determines (at 410) if the transaction involves a read (but not a write) of JV. If so, then the data server module 12 checks (at 412) for any conflicting locks placed on the base relations $R_1, R_2, \ldots, R_n$. If a conflict is present, lock conflict processing is performed (at 406). If no conflicting lock exist, then the data server module 12 places (at 414) a table-level S lock on each base relation $R_i$ ($1 \leq i \leq n$) of JV. Note that the required table-level S lock on each base relation would conflict with an X lock or IX lock placed on any of the base relations.

The requirement (by the no-lock locking mechanism) of an S lock on each base relation of JV for a transaction that reads the JV differs from that of the Y-lock locking mechanism. In the Y-lock context, to read JV, only a Y lock is needed on JV, with no S locks needed on the base relations. Therefore, for reads of JV, the Y-lock locking mechanism requires less locks than the no-lock locking mechanism.

If, however, the data server module 12 determines (at 416) that the transaction involves a write (but not a read) of the join view JV through updating one or several base relations $R_{t_1}, R_{t_2}, \ldots, R_{t_h}$ ($\{t_1, t_2, \ldots, t_h\}(1, 2, \ldots, n\})$) of JV, then the data server module 12 checks (at 418) for conflicting locks on any of the base relations. If no conflicting locks are present, then the data server module 12 places (at 420) an X lock or IX lock on each base relation $R_{t_u}$ ($1 \leq u \leq h$) being updated. An X lock is placed if a table-write of $R_{t_u}$ is needed. An IX lock is placed if a value-write of $R_{t_u}$ is performed. In addition, the data server module 12 places an S lock or IS lock on each other base relation $R_j$ (j∈{1,2, . . . , n}−{$t_1$, $t_2$, . . . , $t_h$}) based on whether a table-read or value-read of $R_j$ is performed.

A value-write or value-read is a write or read requested by a query with a WHERE clause condition that specifies a specific value or values for the value locking attribute of the base relation. An example query that specifies a value-write is as follows:

UPDATE A
SET A.f=A.f+1
WHERE A.e=2;

where A.e is the value locking attribute of base relation A.

On the other hand, a table-write or table-read is a write or read requested by a query with a WHERE clause condition that does not specify a specific value or values for the value locking attribute of the base relation. An example query that specifies a table-read is as follows:

SELECT *
FROM A
WHERE A.f=2;

where A.f is not the value locking attribute of base relation A.

If h≧2, which means that more than one base relation $R_{t_u}$ is being updated, then an IX lock placed on each $R_{t_u}$ may need to be changed to an SIX lock (S+IX). Placing the extra S lock on each $R_{t_u}$ is needed because when one base relation (e.g., $R_{t_1}$) is being updated, then all other base relations on which JV is based are read for join view maintenance. Similarly, when $R_{t_2}$ is being updated, then all the other base relations (including $R_{t_1}$) are read for join view maintenance.

The no-lock locking mechanism requires less locks than the Y-lock locking mechanism for transactions that cause the join view JV to be updated. In the Y-lock context, for updates of JV, a Y lock is placed on JV along with an X lock (or IX lock) on each updated base relation and an S lock on each non-updated base relation. On the other hand, in the no-lock context, for updates of JV, no lock is placed on JV, with an X lock (or IX lock or SIX lock) placed on each updated base relation and an S lock placed on each non-updated base relation.

The no-lock locking mechanism for join views can be extended to allow value locks on join views. Consider a join view JV defined on base relations $R_i$, $R_2$, . . . , and $R_n$. For a fixed i (1≦i≦n), suppose that $R_i.a_i$ is the value locking attribute of base relation $R_i$ that also appears in JV. Then value locking on $R_i.a_i$ for JV is allowed. However, note that no lock is placed on JV according to the no-lock locking mechanism.

If transaction T reads JV by specifying $R_i.a_i$ value(s), then transaction T places an IS lock on $R_i$, one or several S value locks on $R_i.a_i$ for $R_i$ (not JV), and an S lock on each other base relation $R_j$ (j≠i, 1≦j≦n) of JV. If transaction T both updates base relation $R_i$ by specifying the $R_i.a_i$ value(s) and reads JV, an SIX lock is placed on $R_i$, one or several X value locks are placed on $R_i.a_i$ for $R_i$, and an S lock is placed on each other base relation $R_j$ (j≠i, 1≦j≦n) of JV.

To show that the no-lock locking mechanism maintains the isolation properly (serializability) of transactions, the same four assertions as for the Y-lock locking mechanism are proven. It is assumed that join view JV allows duplicate tuples. If no duplicate tuples are allowed in JV, assume that each tuple in JV has a dupcnt attribute (or some other named parameter) recording the number of copies of the tuple. The following assumptions are made (the other more complex cases can be proved in a similar way): (1) any transaction T updates at most one base relation of JV; and (2) if transaction T tries to update base relation $R_i$ (1≦i≦n), it places an S lock on each $R_j$ (1≦j≦n, j≠i).

If transaction T writes join view JV, T places a table-level 1× or X lock on the base relation being updated until T completes. Thus transaction T's writes to join view JV are not read by any other transaction T' until transaction T completes, since T' requires a table-level S lock (or X lock if T' tries to both read and update JV) on each base relation of JV. This proves the first part of Assertion 1.

In addition, if transaction T writes join view JV, there are two possible cases:

Case 1: Transaction T both reads and updates join view JV. Transaction T places a table-level X lock on the base relation being updated and an S lock on each other base relation of JV until T completes. These X and S locks will block other transactions from writing JV (by blocking other IX or X lock requests on the base relations of JV).

Case 2: Transaction T updates the base relation $R_i$ (1≦i≦n). This is similar to the proof in the Y-lock context.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on each base relation of the join view JV. If some other transaction T' writes any data in join view JV, T' will place a table-level IX or X lock on the base relation being updated until T' completes. Thus transaction T does not read dirty data from transaction T' in join view JV (this proves Assertion 3). The case that transaction T tries to both read and update the join view JV is similarly proved.

If transaction T reads join view JV, T places a table-level S lock on each base relation of the join view JV until T completes. Thus no other transaction T' can write any data in JV until transaction T completes, since T' requires a table-level 1× or X lock on the base relation being updated (this proves Assertion 4). The case that transaction T tries to both read and update the join view JV is similarly proved.

Similar to the Y-lock locking mechanism, the no-lock locking mechanism can also be used for aggregate join views.

Since multiple transactions may also be able to update a join view JV concurrently using the no-lock locking mechanism, a logical undo mechanism similar to that discussed for the Y-lock mechanism is used in case a transaction aborts.

V. Name-Lock Locking Mechanism

Figure 7:
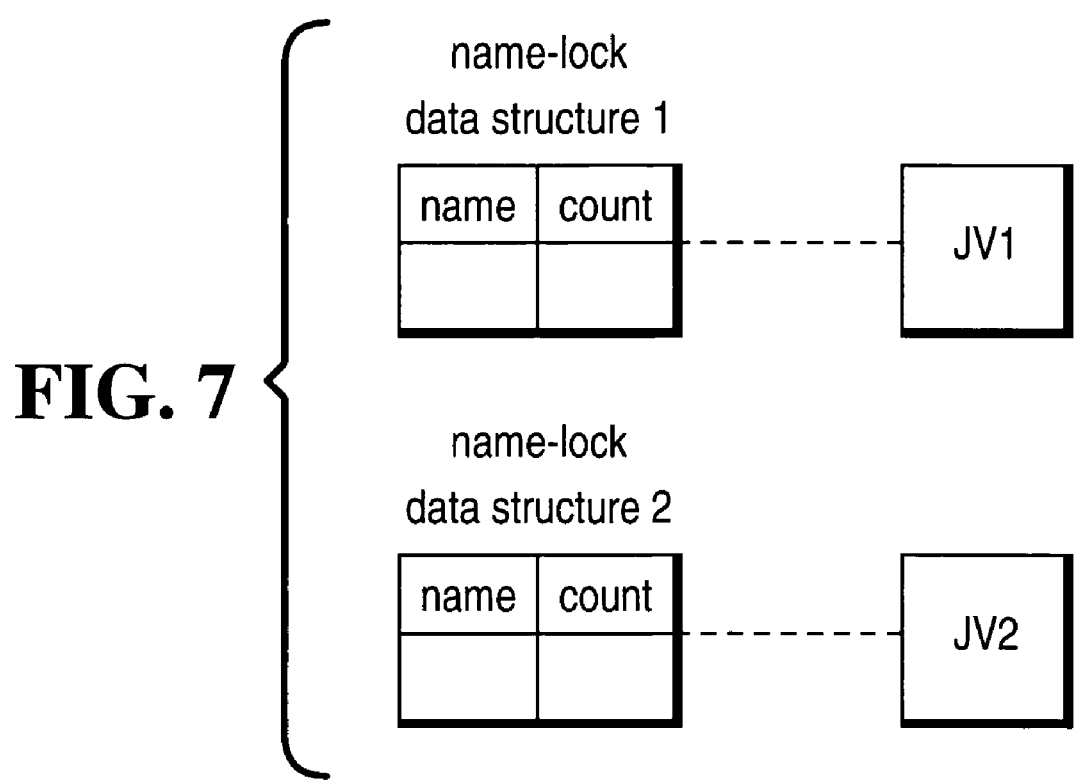
FIG. 7 illustrates a name-lock data structure used for a name-lock locking mechanism according to another embodiment.

According to another embodiment, instead of the Y-lock or no-lock locking mechanism discussed above, an alternative locking mechanism is a name-lock locking mechanism. As shown in FIG. 7, each join view is associated with a corresponding name-lock data structure. Thus, join view JV1 is associated with a first name-lock data structure, while join view JV2 is associated with a second name-lock data structure.

According to one embodiment, each name-lock data structure is of the following format: (NAME, COUNT). NAME refers to a base relation name, while COUNT refers to the number of transactions updating join view JV through updating base relation NAME. For join view JV defined on base relations $R_1$, $R_2$, . . . , and $R_n$, the value of NAME can be one of $R_1$, $R_2$, . . . , and $R_n$. Furthermore, NAME can have a special value (referred to as "Q") that is not any base relation name, but indicates that a transaction is attempting to update multiple base relations of JV or that a transaction requires both a read and update of the join view JV. Note that the designation of "Q" is provided as an example only, as other designations can be used in other embodiments.

Figure 8A:
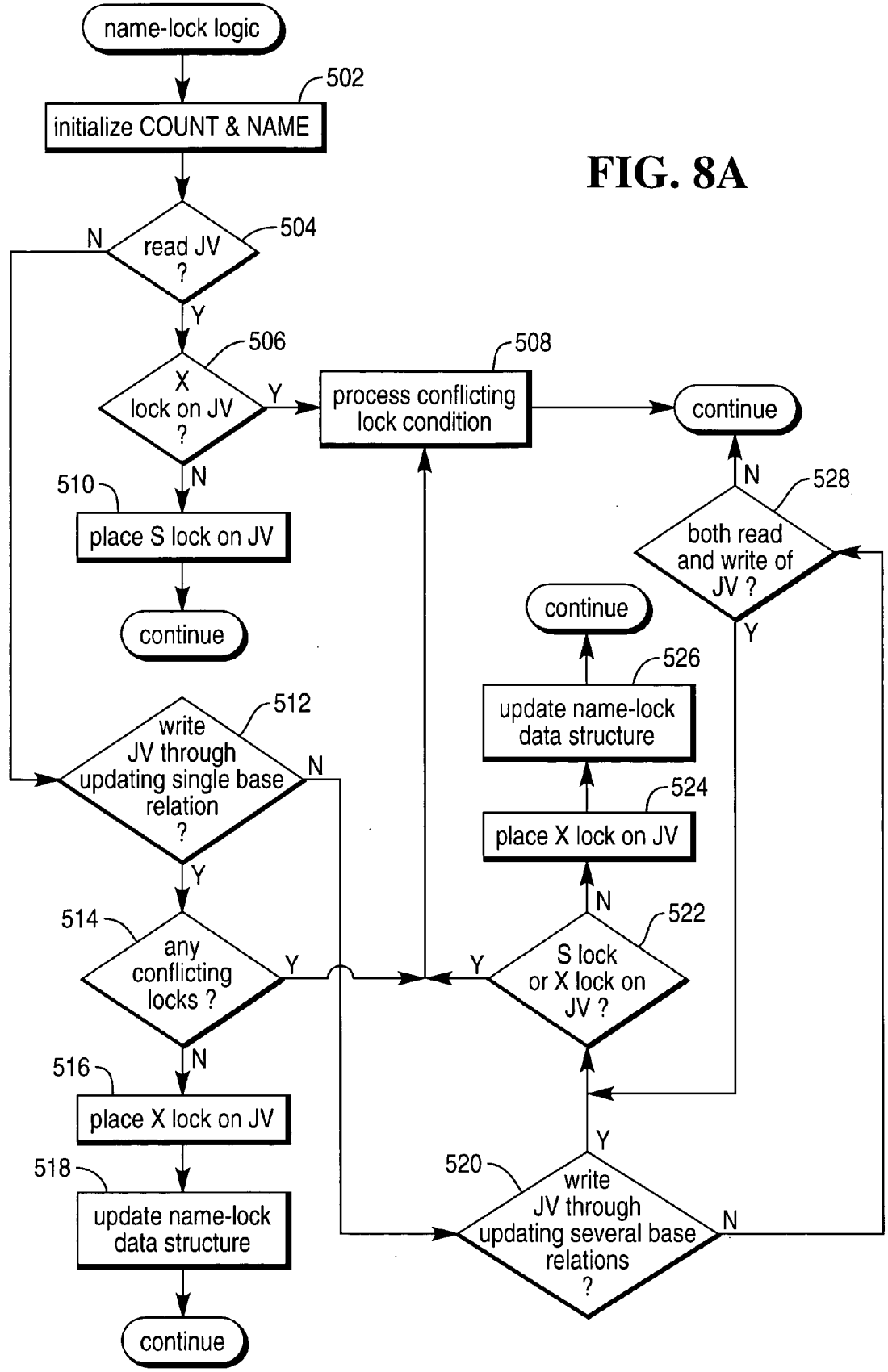
FIGS. 8A–8B are a flow diagram of logic for the name-lock mechanism for join view maintenance.
Figure 8B:
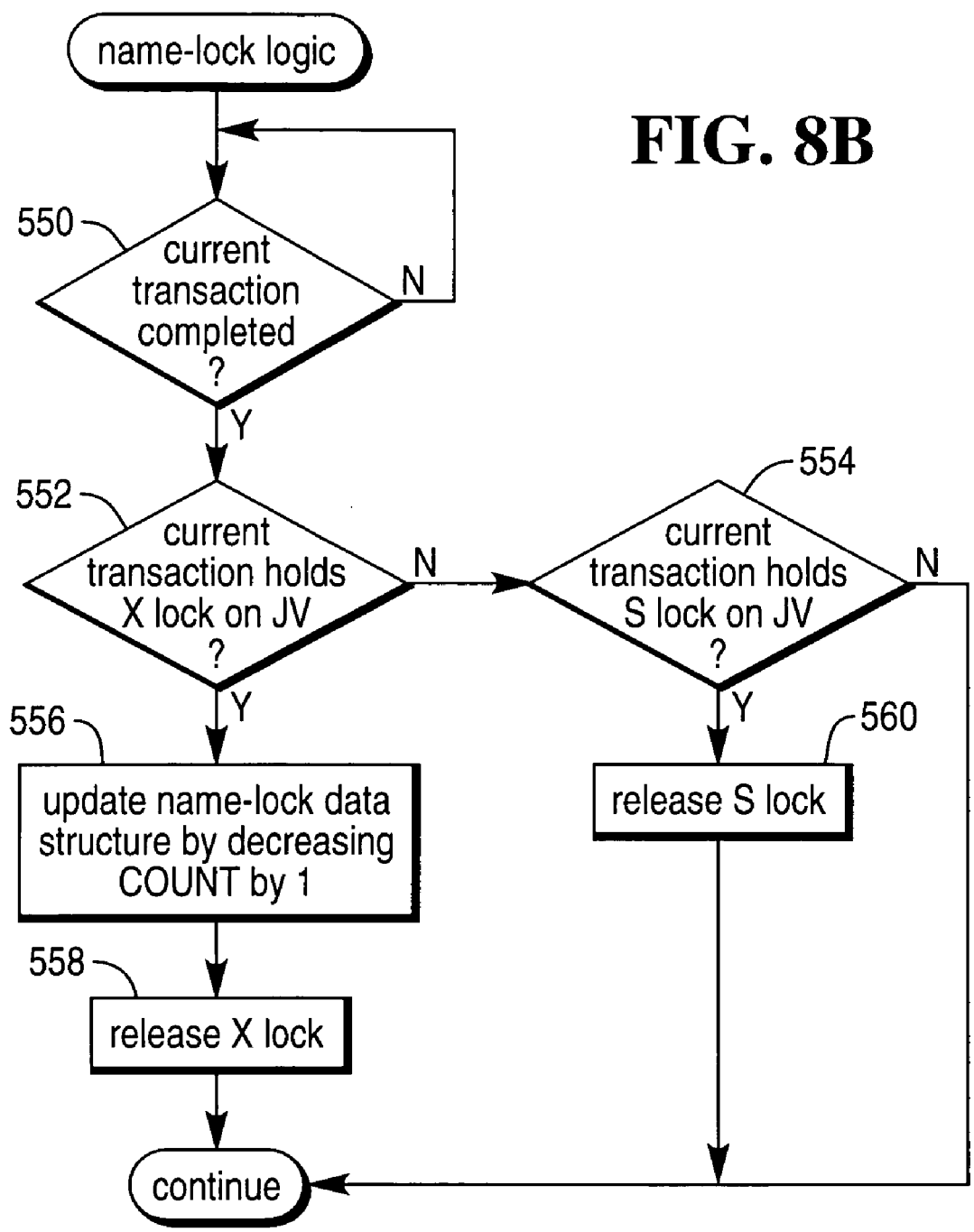

Use of the name-lock data structure is described in connection with the name-lock locking logic shown in FIGS. 8A and 8B. The value of COUNT is initialized (at 502) to zero and the value of NAME is initialized to any base relation $R_i$ ($1 \leq i \leq n$) or Q. In other words, the value of NAME is a "don't care" because the value of COUNT is equal to zero. Upon receipt of a transaction (e.g., receiving commands or steps associated with the transaction), the data server module determines (at 504) if the transaction requires a read of (but not a write to) the join view JV. If so, the data server module determines (at 506) if an X lock is already on JV. If an X lock is already on JV, then conflicting locks are processed (at 508) by the data server module. If an X lock is not already on JV, as determine at 506 by checking that the value of COUNT is equal to zero, then the data server module places (at 510) a table-level S lock on the join view JV.

If the transaction does not involve a read of the join view JV, as determined at 504, the data server module determines (at 512) if the transaction involves a write to (but not a read of) the join view JV through the update of a single base relation $R_i$ of JV. If JV is being updated through the update of a single base relation $R_i$, the data server module checks (at 514) if there is an S or X lock present on JV. The write of base relation $R_i$ in the received transaction requires an X lock on $R_i$. Thus, if an S lock already exists, then the X lock request is blocked. Similarly, if an X lock for another transaction is already placed on $R_j$, then the required X lock for the received transaction will be blocked except for the case where the X lock for the other transaction is placed on the same base relation $R_i$. The data server module checks the name-lock data structure (NAME, COUNT) to determined if an X lock is present. COUNT equals zero means that there is no other X lock granted on JV. COUNT greater than zero indicates that there is another X lock granted on JV. However, the X lock for the received transaction can be granted if the prior X lock is on the same base relation $R_i$ (that is, NAME=$R_i$). If the X lock is possible, which means that there is no S lock on $R_i$ and that either (i) COUNT=0, or (2) COUNT>0 but NAME=$R_i$, then the data server module places (at 516) the X lock on JV. The name-lock data structure is then updated (at 518) by the data server module. The update is as follows: (a) if COUNT=0, then NAME is changed to $R_i$ and COUNT is incremented by 1; or (b) if COUNT is greater than zero and NAME is equal to $R_i$, then COUNT is incremented by 1.

The acts performed at 512, 514, 516, and 518 are for a write to the join view JV through an update of a single base relation $R_i$. However, if the write to JV is a result of updating multiple base relations $R_i$ of JV, as determined (at 520), then the data server module checks (at 522) if no S lock is present on JV and no X lock is present on JV (that is, COUNT=0). In other words, an X lock for the received transaction (which involves a write to JV through the update of multiple base relations of JV) is allowed only if there is no prior S lock or X lock on JV. If this condition is true, then the data server module places (at 524) an X lock on JV.

In addition, the name-lock data structure is updated (at 526) by changing the value of NAME to Q and incrementing COUNT by 1. As a result of this X lock (with NAME=Q), all other transactions that try to read or update JV are blocked. This is contrasted to the situation where a write to JV results from an update of a single base relation $R_i$ of JV, in that the X lock (with NAME=$R_i$) does not block a subsequent transaction that tries to update JV if the subsequent transaction also involves a write to JV that results from an update of the same base relation $R_i$.

Another type of transaction, which is not any one of the transactions above, involves both a read and write of the join view JV. If the data server module detects (at 528) this type of transaction, then the acts at 522, 524, and 526 are performed to determine if an X lock, with NAME set to Q, can be placed on the join view JV.

When a transaction finishes execution (aborted or committed), the data server module checks (at 552) if this transaction has placed an X lock on the join view JV or not. If so, then the data server module updates (at 556) the name-lock data structure by decrementing COUNT by 1. Then the data server module releases the X lock (at 558) on the join view JV held by this transaction. Otherwise, the data server module checks (at 554) if this transaction has placed an S lock on the join view JV or not. If so, the data server module releases the S lock (at 560) on the join view held by this transaction.

With the name-lock locking mechanism, there are five possible scenarios in the database system at any time. In a first scenario, there is no transaction trying to read or update the join view JV. In a second scenario, several transaction are reading the join view JV concurrently. These transactions place table-level S locks on the join view JV, blocking other transactions from updating the base relations of JV.

In the third scenario, there are several transactions updating the same base relation $R_i$ ($1 \leq i \leq n$). These transactions all place table-level X locks on the join view JV with the parameter NAME=$R_i$. Provided the transactions updating $R_1$ do not block each other without join views, they will not block each other in the presence of join views. However, such transactions will block other transactions from either reading the join view JV or updating other base relations $R_j$ ($j \neq i$, $1 \leq j \leq n$).

In a fourth scenario, one transaction is updating several base relations of JV simultaneously. This transaction places a table-level X lock on the join view JV, with the parameter NAME set to Q. This will block other transactions from either reading the join view JV or updating base relations $R_1$ ($1 \leq i \leq n$) of the join view. In a fifth scenario, one transaction is both reading the join view JV and updating one or several base relations of JV simultaneously. This scenario is similar to the fourth scenario.

As with the Y-lock and no-lock locking mechanisms, the name-lock locking mechanism can be extended to allow value locking on join views. Given a join view JV defined on base relations $R_i, R_2, \ldots, R_n$, and given $R_i.a_i$ is the value locking attribute of base relation $R_1$ that also appears in JV, then X or S value locking on $R_i.a_i$ for JV is allowed. For example, consider a transaction that only updates $R_i$. If the update of $R_i$ can be performed by value locking, then transaction T can also place an IX lock on JV and one or several X value locks on $R_i.a_i$ for JV (instead of a table-level X lock on JV with NAME=$R_i$).

To show that the name-lock locking mechanism maintains the isolation property (serializability) of transactions, for a join view JV defined on base relations $R_1, R_2, \ldots$, and $R_n$, the same four assertions (Assertions 1–4) as for the Y-lock locking mechanism above are shown.

The four assertions are first proven for the simple case where JV=$\sigma(R_1 \bowtie \ldots \bowtie R_i \bowtie \ldots \bowtie R_n)$. It is assumed that join view JV allows duplicate tuples. If no duplicate tuples are allowed in JV, assume that each tuple in JV has a dupcnt attribute (or some other named parameter) recording the number of copies of that tuple.

If transaction T writes join view JV, T places a table-level X lock on JV until it completes. Thus transaction T's writes to join view JV are not read by any other transaction T' until transaction T completes, since T' requires a table-level S lock on JV. This proves the first part of Assertion 1.

If transaction T writes join view JV, there are three possible cases:

Case 1: Transaction T updates several base relations of join view JV simultaneously. Transaction T places a table-level X lock on JV whose NAME=Q until T completes. The "NAME=Q" X lock will block other transactions from writing JV.

Case 2: Transaction T both reads and updates join view JV. This is similar to case 1.

Case 3: Transaction T updates one base relation $R_i$ ($1 \leq i \leq n$). Transaction T places a table-level X lock on JV whose NAME=$R_1$ until T completes. If another transaction T' tries to write join view JV before transaction T completes, transaction T' can only update the same base relation $R_i$. This is because if transaction T' updates several base relations of join view JV, the requirement of a "NAME=Q" X lock on JV for transaction T' will be blocked by the existing "NAME=$R_i$" X lock on JV that is put by transaction T. Similarly, if transaction T' updates another base relation $R_j$ ($1 \leq j \leq n$, $j \neq i$) of join view JV, the requirement of a "NAME=$R_j$" X lock on JV for transaction T' will be blocked by the existing "NAME=$R_i$" X lock on JV that is placed by transaction T.

Suppose that transactions T and T' update $\Delta R_i$ and $\Delta R_i'$ of base relation $R_i$, respectively. There are three possible scenarios:

Scenario 1: If transaction T places a table-level X lock on base relation $R_i$, transaction T' will get blocked when it tries to get either a table-level X lock or a table-level IX lock on $R_i$.

Scenario 2: If transaction T places a table-level IX lock on base relation $R_i$, transaction T' will get blocked if it tries to get a table-level X lock on $R_i$.

Scenario 3: Suppose that transaction T places a table-level IX lock and one or several X value locks on base relation $R_i$. Also, transaction T' tries to place a table-level IX lock and one or several X value locks on base relation $R_i$. There are two cases:

(a) $\Delta R_i \cap \Delta R_i' \neq \emptyset$. The requirement of X value locks on $R_i$ for transaction T' will be blocked by the existing X value locks on $R_1$ that is placed by transaction T.

(b) $\Delta R_i \cap \Delta R_i' = \emptyset$. Then $\sigma(R_1 \bowtie \ldots \bowtie \Delta R_i \bowtie \ldots \bowtie R_n) \cap \sigma(R_1 \bowtie \ldots \bowtie \Delta R_i' \bowtie \ldots \bowtie R_n) = \emptyset$. That is, the intersection of the updates to JV by transactions T and T' is empty.

Thus transaction T's writes to join view JV are not written by any other transaction T' until transaction T completes (proof of second part of Assertion 1).

Based on a similar reasoning to the proof of Assertion 1, transaction T does not overwrite dirty data of other transactions in join view JV (proof of Assertion 2).

Suppose that transaction T reads join view JV by requiring a table-level S lock on JV. If some other transaction T' writes any data in join view JV, T' places a table-level X lock on JV until T' completes. Thus transaction T does not read dirty data from transaction T' in join view JV, since the required S lock on JV conflicts with the X lock on JV by transaction T' (proof of Assertion 3).

If transaction T reads join view JV, T places a table-level S lock on JV until T completes. Thus no other transaction T' can write any data in JV until transaction T completes, since T' requires a table-level X lock on JV. This proves Assertion 4.

In the general case where $JV = \pi(\sigma(R_1 \bowtie \ldots \bowtie R_i \bowtie \ldots \bowtie R_n))$, the proofs of the four assertions are the same except for the case where $\Delta R_i \cap \Delta R_i' = \neq \emptyset$ in Assertion 1. For this general case, the proof is the same as the above for the Y-lock locking mechanism.

The name-lock locking mechanism for join view also applies to aggregate join view. The proof is the same as for the Y-lock locking mechanism, described above.

A first special case for which the name-lock locking mechanism can be modified to enhance parallel execution of transactions is described. Consider a join view JV A$\bowtie$B. Suppose that the join condition of A$\bowtie$B is A.c=B.d, where A.c and B.d are the value locking attributes of base relations A and B, respectively. Consider the following two transactions $T_1$ and $T_2$. Transaction $T_1$ inserts tuple $T_{A1}$ into base relation A and tuple $T_{B1}$ into base relation B. Transaction $T_2$ inserts tuple $T_{A2}$ into base relation A and tuple $T_{B2}$ into base relation B. Assume that $T_{A1}.c$, $T_{B1}.d$, $T_{A2}.c$, and $T_{B2}.d$ are different from each other. Then transactions $T_1$ and $T_2$ can be executed in parallel by changing the name-lock locking mechanism as follows:

(1) For transaction $T_1$, an IX lock and an IS lock are placed on both A and B, an X value lock is placed on A for $T_{A1}.c$, an S value lock is placed on B for $T_{A1}.c$, an X value lock is placed on B for $T_{B1}.d$, and an S value lock is placed on A for $T_{B1}.d$. No table-level X or S lock is placed on either A or B.

(2) For transaction $T_2$, an IX lock and an IS lock are placed on both A and B, an X value lock is placed on A for $T_{A2}.c$, an S value lock is placed on B for $T_{A2}.c$, an X value lock is placed on B for $T_{B2}.d$, and an S value lock is placed on A for $T_{B2}.d$. No table-level X or S lock is placed on either A or B.

(3) For transaction $T_1$, a table-level X lock is placed on JV whose NAME=A (instead of NAME=Q).

(4) For transaction $T_2$, a table-level X lock is placed on JV whose NAME=A (instead of NAME=Q).

Thus, even though each of transactions T1 and T2 is updating multiple base relations of the join view JV, the requirement of an X lock with NAME=Q can be avoided if the join condition A$\bowtie$B is A.c=B.d and A.c and B.d are the value locking attributes of A and B, respectively. Instead of NAME=Q, the X lock placed on JV is performed with NAME=$R_i$ (the name of the base relation being updated).

In this way, when transactions $T_1$ and $T_2$ do not conflict with each other without the join view JV, they also do not conflict with each other in the presence of the join view JV. The general principle for this first special case is as follows: consider a join view JV defined on base relations $R_1, R_2, \ldots$, and $R_n$. Suppose that the join condition among base relations $R_{t_1}, R_{t_2}, \ldots,$ and $R_{t_h}$ ($\{t_1, t_2, \ldots, t_h\} \{1,2, \ldots, n\}$) is $R_{t_1}.a_2 = R_{t_2}.a_2 = \ldots = R_{t_h}.a_h$ ($h \geq 2$), where $R_{t_i}.a_i$ ($1 \leq i \leq h$) is the value locking attribute of base relation $R_{t_i}$. A fixed $R_{t_u}$ ($1 \leq u \leq h$) is picked in advance. Consider a transaction T updating base relations $R_{S_1}, R_{S_2}, \ldots,$ and $R_{S_v}$ ($v \geq 1$) simultaneously. If $\{S_1, S_2, \ldots, S_v\}\{t_1, t_2, \ldots, t_h\}$ and the update to any base relation $R_{S_i}$ ($1 \leq i \leq v$) can be done by value locking on $R_{s_i}$, then only an X lock needs to be placed on the join view JV whose NAME=$R_{t_u}$ (instead of NAME=Q if $v \geq 2$).

Figure 9:
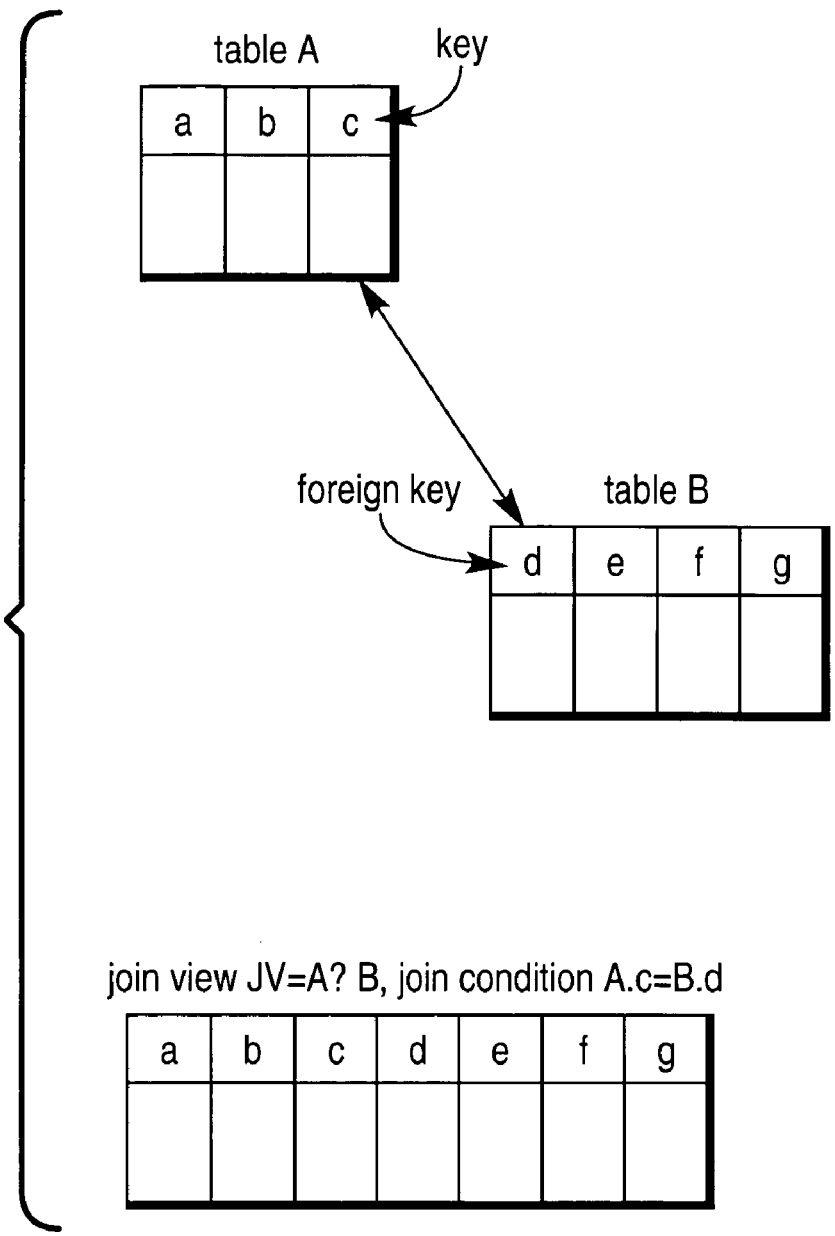
FIG. 9 illustrates join view maintenance in the presence of a key-foreign key constraint.

A second special case for which the name-lock locking mechanism can be modified to enhance performance involves the key-foreign key constraint. An example to illustrate the second special case is as follows: consider a join view JV=A⊳⊲B, as shown in FIG. 9. Suppose that the join condition of A⊳⊲B is A.c=B.d, where A.c is a key of A and B.d is a foreign key of B that references A.c. Also suppose that A.c and B.e are the value locking attributes of base relations A and B, respectively. If transaction T inserts a tuple $T_A$ into base relation A, transaction T does not need to put any lock on B or JV for join view maintenance, as there can be no matching tuple in B that can be joined with $T_A$.

A foreign key identifies table relationships. For example, table A can be a customer table, with A.c being the customer identifier and the other attributes of A describing various aspects of each customer. There is one row per customer in table A. Table B is a customer order table that contains orders of each customer, with B.d being the customer identifier. Inserting a new row into A means that a new customer (associated with a new customer identifier A.c) is being added to A. Therefore, since A.c is new, there can be no row in the customer orders table (table B) that contains order information for the new customer.

Transaction T only needs to put an IX lock on A and an X value lock on A for $T_A$.C for the newly inserted $T_A$. On the other hand, if transaction T inserts a tuple $T_B$ into base relation B, transaction T needs to put an IS lock on A and an S value lock on A for $T_B$.d to do join view maintenance. Transaction T also needs to put an IX lock on B, an X value lock on B for $T_B$.e, and a table-level X lock on JV whose NAME=B.

The general principle is as follows: consider a join view JV defined on base relations $R_1, R_2, \ldots$, and $R_n$. Suppose that the join condition between base relations $R_i$ ($1 \leq i \leq n$) and $R_j$ ($j \neq i$, $1 \leq j \leq n$) is $R_i.a_i=R_j.a_j$, where $R_i.a_i$ is a key of $R_i$ and $R_j.a_j$ is a foreign key of $R_j$ that references $R_i.a_i$. Also suppose that $R_i.a_i$ is the value locking attribute of base relations $R_i$, and $R_j.b_j$ is the value locking attribute of base relations $R_j$. Then if transaction T inserts a tuple $T_i$ into base relation $R_i$, transaction T requires the following locks: an IX lock on $R_i$ and an X value lock on $R_i$ for $T_i.a_i$. If transaction T inserts a tuple $T_j$ into base relation $R_j$, transaction T requires the following locks: an IS lock on $R_i$, an S value lock on $R_i$ for $T_j.a_j$, an IX lock on $R_j$, an X value lock on $R_j$ for $T_j.b_j$, and a table-level X lock on JV whose NAME=$R_j$.

A logical undo mechanism is similarly used for the name-lock locking mechanism.

VI. Auxiliary Relations

Figure 10:
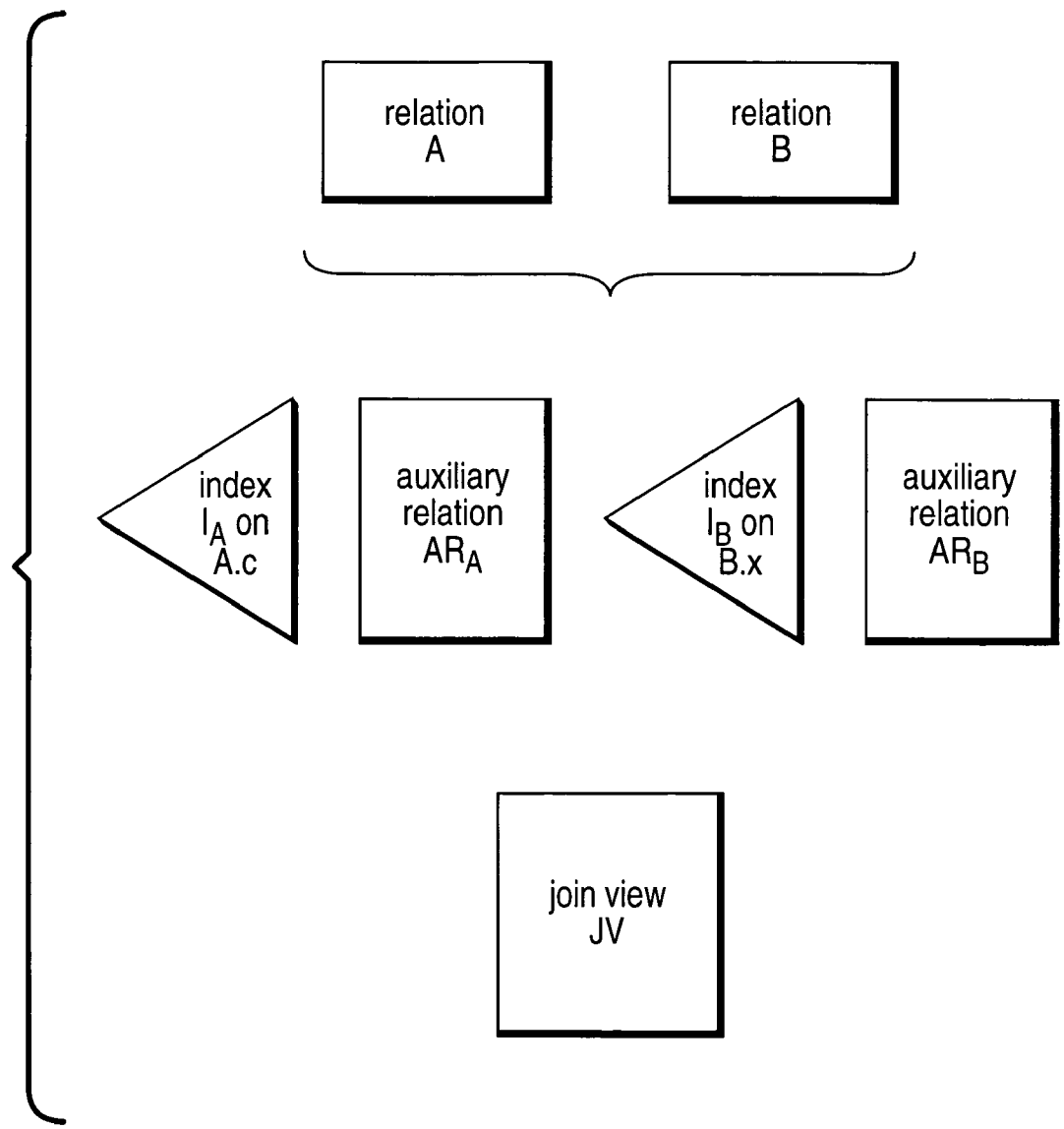
FIG. 10 illustrates auxiliary relations used for join view maintenance.

Several locking mechanisms have been described above to improve transaction concurrency in the database system by reducing the occurrences in which locks placed on a join view, and/or base relations on which the join view is based, will cause transactions to block each other from execution. According to one embodiment, auxiliary relations are also optionally used to maintain join views. The use of auxiliary relations makes join view maintenance more efficient, especially in the parallel database system shown in FIG. 2. As depicted in FIG. 10, in one example, auxiliary relations $AR_A$ and $AR_B$ are derived from base relations A and B. Additionally, a join view JV is generated from relations A and B, as shown. Assume the join view JV contains tuples selected by the join condition A.c=B.x. Also, the join view JV is partitioned on A.e. Auxiliary relation $AR_A$ is a copy of relation A that is partitioned on the join attribute A.c. Likewise, auxiliary relation $AR_B$ is a copy of relation B that is partitioned on the join attribute B.x. Where relation A (B) is already partitioned on attribute A.c (B.x), no auxiliary relation $AR_A$($AR_B$) is generated, as it is not needed.

Additionally, in one embodiment, a clustered index is maintained on each auxiliary relation. Index $I_A$ is maintained on attribute A.c for auxiliary relation $AR_A$. Likewise, index $I_B$ is maintained on attribute B.x for auxiliary relation $AR_B$. In FIG. 10, the index is depicted as a triangle adjacent to the auxiliary relation upon which the index is maintained.

The auxiliary relations $AR_A$ and $AR_B$ are constructed based on a reorganization of the tuples $T_A$ and $T_B$ of base relations A and B, respectively, in which the join attributes (A.c and B.x) influence the construction. Auxiliary relations $AR_A$ and $AR_B$ thus include all the tuples of relations A and B, respectively, with the tuples simply being rearranged.

In one embodiment, the data structures of FIG. 10 are maintained in the parallel database management system 10 of FIG. 2, which has L data server modules (L being greater than one). In such a parallel database system, tuples of relations A and B are distributed across multiple data server modules.

Auxiliary relations $AR_A$ and $AR_B$, as well as the join view JV, are also distributed across the data server modules of the parallel database system. The partitioning strategy for each of auxiliary relations $AR_A$ and $AR_B$ determines the node upon which the tuples $T_{ARA}$ and $T_{ARB}$ of the auxiliary relations are stored.

In an example join view definition, tuple $T_A$ of relation A is to be joined with one or more tuples $T_B$ of relation B in which attribute c of $T_A$ equals attribute x of one or more tuples $T_B$. In one embodiment, the join operation is performed using, not relations A and B, but the auxiliary relations $AR_A$ and $AR_B$. Then, the join result tuples are stored in the join view JV.

As noted above, a materialized join view must be maintained as base relations of the join view are modified. This means that, as each existing tuple is updated or deleted or as each new tuple is inserted into either relation A or B, the materialized view is updated so as not to become stale. The efficiency of maintenance of the materialized view depends on how the data is organized. Auxiliary relations are used to perform materialized join view maintenance, in accordance with some embodiments, to enhance efficiency. FIGS. 11A, 1B, 12A, and 12B show how materialized view maintenance may be performed without the use of auxiliary relations.

Take, for example, a join view JV, constructed from relations A and B. If base relations A and B are partitioned on the join attributes A.c and B.x, respectively, performing the join operation is relatively efficient, since tuples $T_A$ whose "c" attributes are equal to the "x" attribute of tuples $T_B$ are stored on the same node. In the ensuing discussion, the term "node" is used broadly to refer to a data server module 12, or to a data server module plus other components. As described further below, a node can also include a parser, optimizer, scheduler, re-scheduler, and query combiner.

In a database system with multiple nodes, assume node i includes tuples $T_A$ in which attribute "c" is between 1 and 5. Also, node i includes tuples $T_B$ in which attribute "x" is between 1 and 5. Other tuples $T_A$ and $T_B$ of relations A and B are stored at nodes other than node i in the parallel DBMS. The join of (A.c=B.x) of tuples $T_A$ and TB is relatively efficient in this arrangement, since the tuples $T_A$ and $T_B$ are stored on the same node i.

Where the join view JV is also partitioned according to either attribute "c" of relation A or attribute "x" of relation B, the join result tuples also remain at node i. However, where the join view JV is not partitioned on these attributes, however, the join result tuples may need to be sent to the other node(s).

Figure 11A:
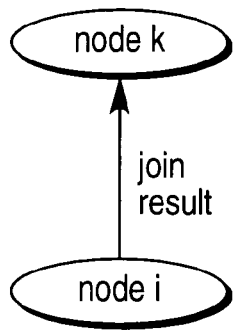
FIGS. 11A–11B and 12A–12B illustrate join view maintenance without auxiliary relations.

More generally, assume the join view JV is partitioned on an attribute of relation A. Incoming tuple $T_A$ is joined with the appropriate tuple or tuples of relation B at node i. The join result tuples (if any) are sent to some node k based on the attribute value of $T_A$, as shown in FIG. 11A. The join result tuples are inserted into the join view JV there. Node k may be the same as node i.

Figure 11B:
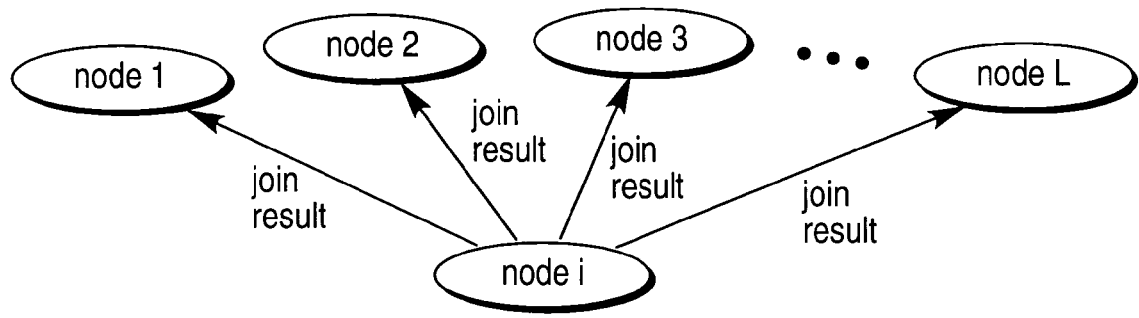

If, instead, the join view JV is not partitioned on an attribute of relation A, the distribution of join result tuples is depicted in FIG. 11B. Since the join view JV is not partitioned on an attribute of base relation A, the join result tuples are distributed to multiple nodes to be inserted into the join view JV there.

The situation is worse when the base relations A and B are not partitioned on the join attributes. Instead of going to a node (such as node i) in which "like" tuples will be present, multiple nodes of the parallel database system may have to be accessed to find tuples $T_A$ or $T_B$ that meet the join criteria.

Figure 12A:
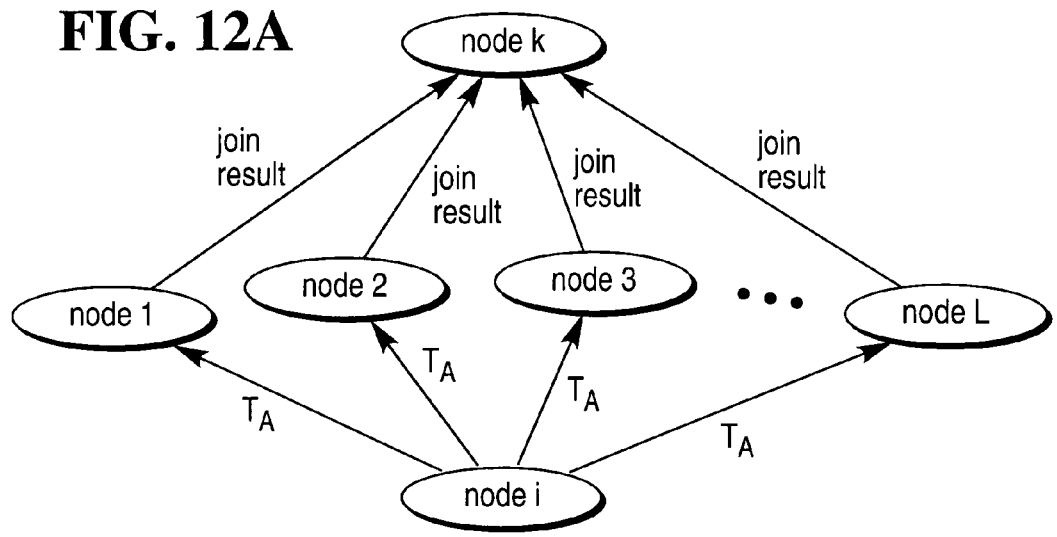
Figure 12B:
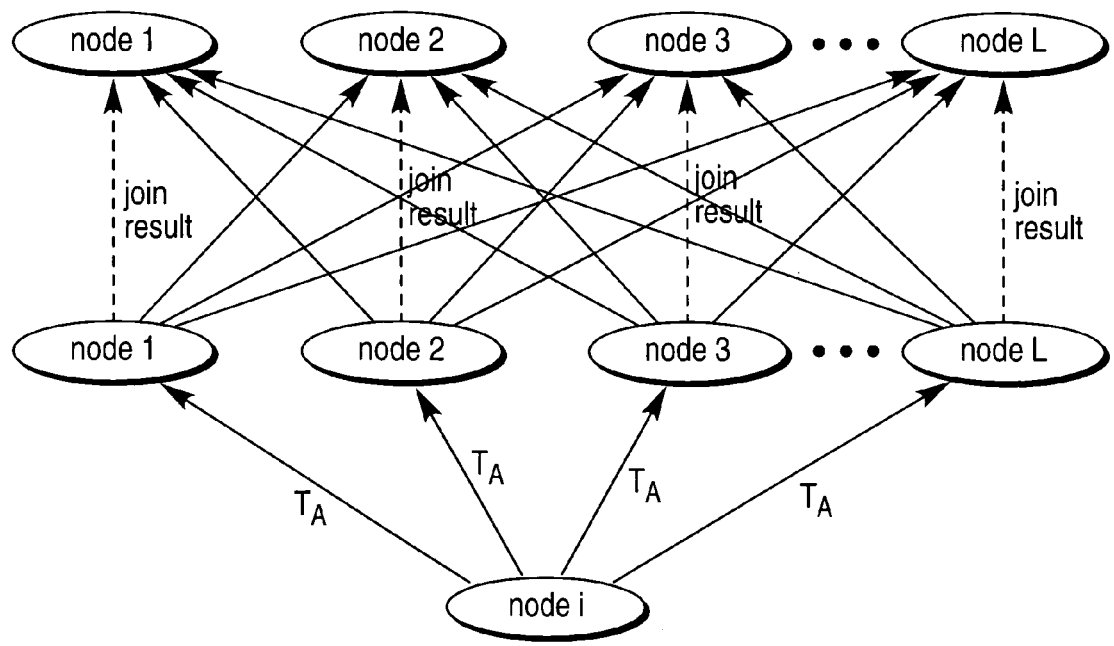

In FIGS. 12A and 12B, maintenance of the join view JV is illustrated where the base relations A and B are partitioned on attributes that are not the join attributes, i.e., not A.c and B.x, respectively. In such a situation, not only are the join result tuples possibly distributed to multiple nodes, but the incoming tuple $T_A$ itself is distributed to all the nodes of the parallel database system, to ensure that all possible tuples $T_B$ that meet the join criteria are considered. In FIG. 12A, for example, the join view JV is partitioned on an attribute of A. Tuple $T_A$ is distributed to every node to search for tuples $T_B$ which meet the join criteria (A.c=B.x). The join result tuples (if any) are sent to some node k to be inserted into the join view JV based on the attribute value of $T_A$. Again, node k may be the same as node i.

In FIG. 12B, the join view JV is not partitioned on an attribute of relation A. As in FIG. 12A, the tuple $T_A$ is redistributed to every node to search for the tuples $T_B$ that meet the join condition. The join result tuples, if any, are distributed to multiple nodes to be inserted into the join view JV there. The dashed lines in FIG. 12B indicate that the network communication is conceptual as the message is sent to the same node.

Thus, as can be seen from the example of FIGS. 12A, and 12B, without the use of auxiliary relations, materialized view maintenance may be inefficient and costly (in terms of system resources) where the base relations A and B are partitioned on attributes that are not join attributes, since substantial network communication costs may be incurred. Further, a join operation has to be performed at every node.

According to one embodiment, auxiliary relations are used to overcome the shortcomings of the join view maintenance techniques described above. In general, an auxiliary relation is maintained for each relation involved in the join operation. For the general case, it is assumed that neither base relation is partitioned on the join attribute. If, however, some base relation is partitioned on the join attribute, the auxiliary relation for that base relation is unnecessary, in one embodiment.

Where a join view JV is defined on base relations A and B, two auxiliary relations, $AR_A$ for relation A, and $AR_B$ for relation B, are maintained. Relation $AR_A$ is a copy of relation A that is partitioned on the join attribute A.c. Relation $AR_B$ is a copy of relation B that is partitioned on the join attribute B.x. Additionally, as depicted in FIG. 10, index $I_A$ on attribute c of relation A is maintained for auxiliary relation $AR_A$. Likewise, index $I_B$ on attribute x of relation B is maintained for auxiliary relation $AR_B$.

By maintaining auxiliary relations $AR_A$ and $AR_B$ for relations A and B, respectively, assurance can be made that, at any node i of the parallel database system, tuples $T_A$ coexist with tuples $T_B$ in which the join attributes are of the same value. In other words, where the tuples $T_A$ and $T_B$ of relations A and B are not organized such that tuples meeting the condition A.c=B.x coexist at the same node, such a condition is provided using tuples $T_A$ and $T_B$ of auxiliary relations $AR_A$ and $AR_B$.

Figure 13A:
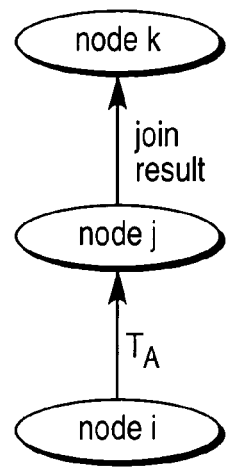
FIGS. 13A–13B illustrate join view maintenance with auxiliary relations.
Figure 13B:
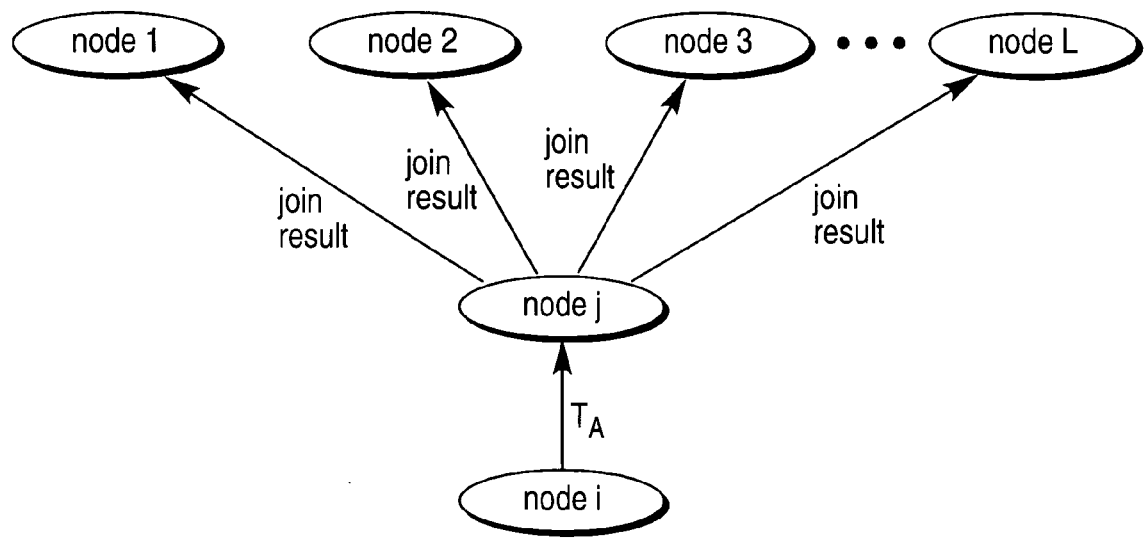

One procedure for maintaining a join view using auxiliary relations is depicted in FIGS. 13A and 13B, according to one embodiment. When a tuple $T_A$ is inserted into relation A at node i, the tuple is also redistributed to a specific node j, based on the join attribute value A.c of the tuple. Node j may be the same as node i. Tuple $T_A$ is inserted into the auxiliary relation $AR_A$ at node j. At node j, $T_A$ is joined with the appropriate tuples $T_B$ in the auxiliary relation $AR_B$, where the auxiliary relation $AR_B$ utilizes the index $I_B$ to quickly obtain the appropriate tuples $T_B$.

In FIG. 13A, the join view JV is partitioned on an attribute of A. Thus, it is possible that the join result tuple is stored on the same node as $T_A$. The join result tuples (if any) are sent to some node k to be inserted into the join view JV based on the attribute value of $T_A$. Node k may be the same as node j.

In FIG. 13B, the join view JV is not partitioned on an attribute of A. Accordingly, the join result tuples (if any) are distributed to multiple nodes to be inserted into the join view JV there. For example, each join result tuple may be sent to a different node in the parallel database system.

Operations in which tuple $T_A$ is deleted from base relation A or updated in base relation A are similarly performed. Also, when a tuple $T_B$ is inserted into, deleted from, or updated in base relation B, similar operations are performed.

By using one or more auxiliary relations, the join view may be maintained more efficiently. In one embodiment, network communication is reduced. For each inserted (updated, deleted) tuple of base relation A, the join work to be done occurs at one node rather than at every node of the parallel database system. Further, for each inserted (updated, deleted) tuple of base relation A, the auxiliary relation $AR_B$ at one node (rather than at all nodes) is locked when performing the join operation. In one embodiment, this improves accessibility to the base relation B while join view maintenance is being performed.

In one embodiment, the storage overhead for each auxiliary relation may be kept relatively small in many cases. For example, if a join view has some selection condition on the base relation A in the where clause, such as:

CREATE JOIN VIEW JV AS
SELECT *
FROM A, B
WHERE A.c=B.x AND A.e=3;

only those tuples of A that satisfy the selection condition (A.e=3) need be maintained in the auxiliary relation $AR_A$.

As another example, a join view does not contain all attributes of the base relation A, such as:

CREATE JOIN VIEW JV AS
SELECT A.e, B.z
FROM A, B
WHERE A.c=B.x;

The auxiliary relation $AR_A$ may maintain fewer than all the attributes of relation A. In the above example, the auxiliary relation $AR_A$ may maintain only the join attribute (A.c) and the attributes appearing in the select clause (A.e). Accordingly, $AR_A$ would include attributes c and e of base relation A.

Another example involves the join condition in the join view that is based on key and referential integrity restraints, such as:

CREATE JOIN VIEW JV AS
SELECT *
FROM A, B
WHERE A.c=B.x;

Where A.c is a key of relation A and B.x is a foreign key of relation B that references to A.c. If a tuple $T_A$ is inserted into relation A, there is no matching tuple in relation B that can be joined with $T_A$. However, if a tuple $T_B$ is inserted into relation B, there must be a tuple of relation A that can be joined with it. The case for deletion is similar. Thus, in one embodiment, if only insertion and deletion in the base relations is considered, only the auxiliary relation $AR_A$ is maintained. There is no need for auxiliary relation $AR_B$.

A further discussion of maintaining a view with auxiliary relations is described in U.S. Ser. No. 09/900,280, filed on Jul. 6, 2001, by Gang Luo, Curt J. Ellmann, and Jeffrey F. Naughton, which is hereby incorporated by reference.

VII. Auxiliary Indices

Figure 14:
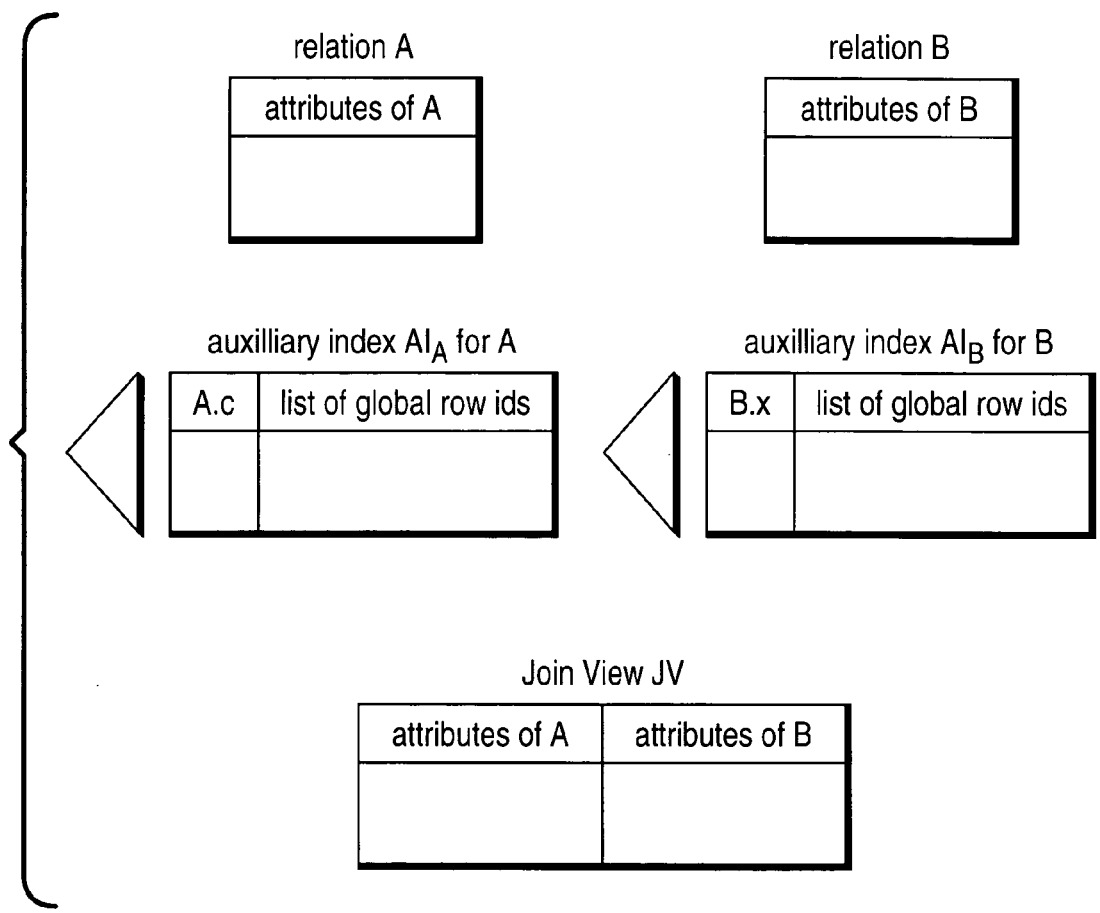
FIG. 14 illustrates auxiliary indices used for join view maintenance.

Instead of auxiliary relations, which require relatively substantial storage overhead in some cases, auxiliary indices can be used instead. For each base relation A and B on which a join view JV is maintained, an auxiliary index $AI_A$ (for relation A) and an auxiliary index $AI_B$ (for relation B) are also maintained, as shown in FIG. 14.

Auxiliary index $AI_A$ is an index on the join attribute A.c. $AI_A$ is partitioned on A.c. Each entry of the auxiliary index is in the form (value of A.c, list of global row identifiers), where the list of global row identifiers contains all the global row identifiers of the tuples of relation A whose attribute A.c is of that value. Each global row identifier is of the form (node identifier, local row identifier at the node). A local row identifier uniquely identifies a row of a relation at a node. A global row identifier uniquely identifies a row of a relation among all the nodes.

The auxiliary index $AI_A$ is distributed clustered if the base relation is clustered on the join attribute A.c at each node. On the other hand, the auxiliary index $AI_A$ is non-distributed clustered if the base relation is non-clustered on the join attribute at each node. An auxiliary index $AI_B$ is similarly maintained for relation B, and is of the form (value of B.x, list of global row identifiers).

As shown in FIG. 15A, when a tuple $T_A$ is inserted into relation A at node i, the tuple $T_A$ is also redistributed to a specific node j (node j may be the same as node i) based on the join attribute value of $T_A$. A new entry containing the global row identifier of tuple $T_A$ is inserted into the auxiliary index $AI_A$ at node j. The auxiliary index $AI_B$ at node j is then searched to find the list of global row identifiers for these tuples $T_B$ of relation B that satisfy $T_B.x=T_A.C$. Suppose those tuples $T_B$ reside at K ($K \leq L$) nodes. $T_A$ with the global row identifiers of the node is sent to each of the K nodes. In the example of FIG. 15A, the K nodes include nodes 1, 3, and L. The tuple $T_A$ is joined with tuple $T_B$ of relation B identified by those global row identifiers in the K nodes. If JV is partitioned on an attribute of A, then the join result tuples (if any) are sent to some node k (which may be the same as node j) to be inserted into JV based on the attribute value of $T_A$.

However, if JV is not partitioned on an attribute of A, then the join result tuples are distributed to plural nodes to be inserted into JV, as shown in FIG. 15B. The procedure for handling deletion of rows of A or updates of rows of A are similar to the procedure performed in the case of insertion.

Generally, auxiliary indices have less storage overhead than auxiliary relations. However, join view maintenance with auxiliary indices incur more inter-node communication than for join view maintenance with auxiliary relations, but less inter-node communication than for join view maintenance without either auxiliary indices or auxiliary relations (see FIG. 12B). For each inserted (deleted, updated) tuple of base relation A, the join work needs to be done at (i) only one node with the auxiliary relation mechanism, (ii) several nodes for the auxiliary index mechanism, and (iii) all the nodes without either the auxiliary index or auxiliary relation mechanism.

The auxiliary index mechanism can also be extended to maintain a join view JV defined on more than two base relations. For optimal performance, a hybrid mechanism that includes both the auxiliary relation mechanism and the auxiliary index mechanism can be used.

VII. Locking Mechanisms for Auxiliary Relations and Auxiliary Indexes

When base relations are updated and materialized views are incrementally updated, the proper locks are placed on the base relations; there is no need to place any X or S lock on any auxiliary relation according to one embodiment. However, short-term latches on pages and locks on access paths placed by the database system are needed. In an alternative embodiment, locks can be placed on the auxiliary relation when reading or updating the auxiliary relation.

For example, in one embodiment, an X or S lock on an auxiliary relation $AR_R$ for base relation R is not needed because the auxiliary relation $AR_R$ is only updated when base relation R is updated. Therefore, the X or IX lock placed on R will prevent a subsequent conflicting update on R that causes $AR_R$ to be updated. Similarly, an auxiliary relation $AR_R$ is only read when some join view defined on base relation R is being maintained (with an S or IS lock placed on R). Thus, while a first transaction is ready for join view maintenance, the S lock or IS lock on R blocks any subsequent conflicting update of $AR_R$ through the update of R (which requires an X or IX lock on R).

Similarly, in the auxiliary index context, according to one embodiment, only proper locks are needed on base relations when base relations are updated and materialized views are being incrementally maintained. Locks on the auxiliary index are not needed. In an alternative embodiment, locks can be placed on the auxiliary index when reading or updating the auxiliary index.

Generally, for an auxiliary relation $AR_R$ of base relation R, there are three possible scenarios in the parallel database system:

(1) No transaction is trying to read or updated auxiliary relation $AR_R$.
(2) One or several transactions are updating base relation R, and thus the auxiliary relation $AR_R$ is also being updated. Table-level 1× or X locks are placed on R so no other transaction can read $AR_R$ (because such other read requires an S lock on R).
(3) One or several transaction are reading auxiliary relation $AR_R$ to perform join view maintenance. Table-level S locks are placed on R so no other transaction can update auxiliary relation $AR_R$.

Similar scenarios exist for auxiliary index $AI_R$ kept on base relation R.

A logical undo mechanism is also applied to the lock mechanism for auxiliary relations and auxiliary indices.

Figure 16:
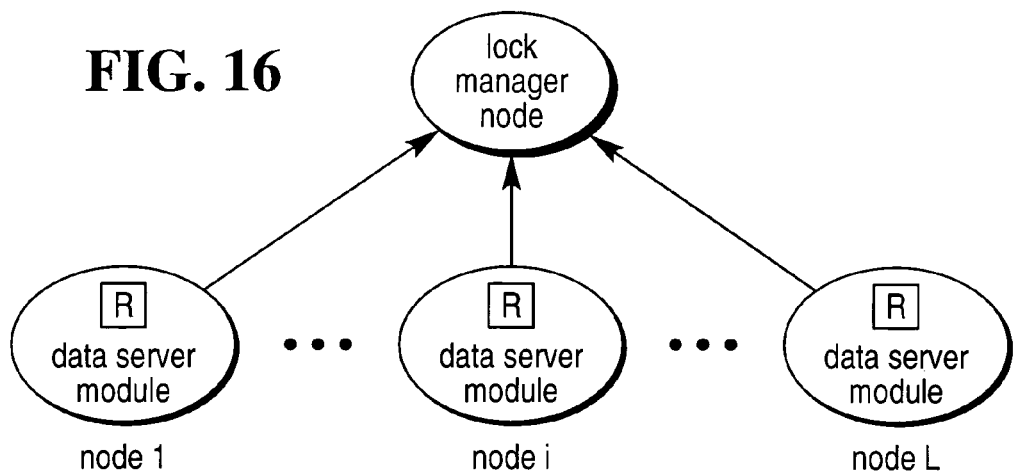
FIG. 16 is a block diagram of a database system with a centralized lock manager mechanism.

Viii. Example Application of No-Lock Locking Mechanism for Join View with Join View Maintenance Performed with Auxiliary Indices FIG. 16 shows a traditional (S, X, IS, IX) locking mechanism in a parallel database system with L data server modules. Each data server module is also referred to as node i ($1 \leq i \leq L$). Also, for each relation, there is a centralized node on which the lock manager resides. As a result, to place a value lock, a data server module has to send a message to the lock manager at the centralized node to place a corresponding IX or IS lock for an entire relation R that is distributed or partitioned across the multiple data server modules. Thus, with the centralized (S, X, IS, IX) locking mechanism of FIG. 16, placing a value lock on the relation R is relatively expensive, as the data server module has to send a message across a communications network to the lock manager at the centralized node. Thus, value locking cannot be performed locally with the centralized locking mechanism. On the other hand, placing the table-level X or S lock is relatively efficient with the centralized locking mechanism, as a message can be sent to the centralized node to place a lock on the entire relation R.

Figure 17:
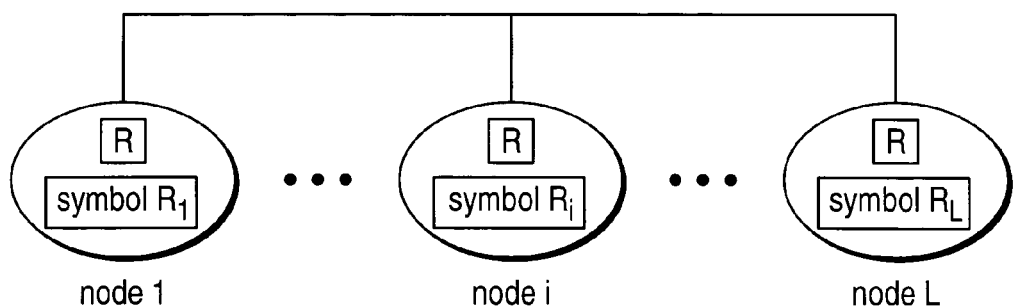
FIG. 17 is a block diagram of a database system with a distributed lock manager mechanism.

FIG. 17 shows a distributed (S, X, IS, IX) locking mechanism, in which value locks for R are partitioned among all L nodes. Thus, at each node i ($1 \leq i \leq L$), there is a symbol $R_1$ for R. If a table-level X or S lock is to be placed on R, then a message is sent to every node i ($1 \leq i \leq L$) to X or S lock the symbol $R_i$. To place a value X or S lock on R, there is no need to go to a centralized node to get the table-level 1x or IS lock on R. Instead, assuming that the value lock resides at node i, an IX or IS lock is first placed on the symbol $R_i$, followed by acquiring the value X or S lock at node i. Thus, for placing value locks, there is no centralized node that can become a bottleneck in the distributed locking mechanism. However, compared to the centralized locking mechanism, acquiring a table-level X or S lock is more expensive in the distributed locking mechanism, as an X or S lock has to be placed on the symbol $R_i$ at each node i ($1 \leq i \leq L$).

Figure 18:
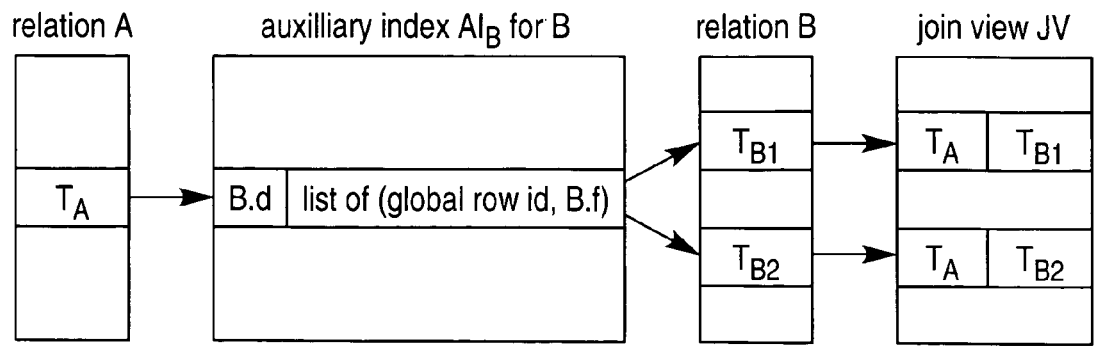
FIG. 18 illustrates join view maintenance using auxiliary indices and the no-lock locking mechanism.

Join view maintenance can be implemented using the distributed locking mechanism in a parallel database system. Consider a join view JV=A⋈B based on the join condition A.c=B.d. Suppose neither A nor B is partitioned on the join attribute, and suppose A.e (B.f) is the value locking attribute of A (B). In this case, two auxiliary indices $AI_A$ and $AI_B$ are created, with $AI_B$ shown in FIG. 18. Auxiliary index $AI_A$, which is partitioned on A.c, is an index on the join attribute A.c. Each entry of the auxiliary index $AI_A$ is of the form (value of A.c, list of two-tuples (global row identifier, value of A.e)). Note that this implementation of each auxiliary index differs slightly from that described above. The list of two-tuples contains all the global row identifiers (with associated A.e values) of the tuples of relation A whose attribute A.c is of that value. The same technique is applied to base relation B. Table-level S, X, IS, and IX locks are allowed on A, B, $AI_A$, and $AI_B$. S or X value locks are allowed on A for A.e, on B for B.f, on $AI_A$ for A.c, and on $AI_B$ for B.d. Note that, in this embodiment, locks are placed on auxiliary indices.

When a tuple $T_A$ is inserted into base relation A, the following operations are performed to maintain the join view JV using the no-lock locking mechanisms for JV. First, an IX lock is placed on A and an X value lock is placed on a $T_A$.e value for A. The tuple $T_A$ is then inserted into the base relation A. Next, an IX lock is placed on $AI_A$ and an X value lock is placed on $T_A$.C for $AI_A$. The data structure ($T_A$.C, (global row identifier of $T_A$, $T_A$.e)) is then inserted into the auxiliary index $AI_A$.

Next, an IS lock is placed on the auxiliary index $AI_B$ and an S value lock is placed on $T_A$.C for the auxiliary index $AI_B$. The data server module next finds the entry in the auxiliary index $AI_B$ according to $T_A$.c. Next, the data server module finds all the two-tuples (global row identifier of $T_B$, value of $T_B$.f) for those tuples $T_B$ of base relation B that match with $T_A$. For each two-tuple (global row identifier of $T_B$, value of $T_B$.f), an IS lock is placed on the base relation B and an S value lock is placed on $T_B$.f for the base relation B.

The join of tuples $T_A$ and $T_B$ is then performed, with the join result tuple inserted into the join view JV.

A benefit of the join view maintenance mechanism described above is that no table-level S or X locks are placed on A, B, or JV for join view maintenance. Only IX or IS locks and X or S value locks on A, B, $AI_A$, and $AI_B$ are needed while they are distributed among all the nodes. Thus, no centralized node will become a bottleneck and many transactions can be executed concurrently in a parallel database system where each transaction updates one or several base relations of a join view.

IX. Transaction Rescheduling

Figure 19:
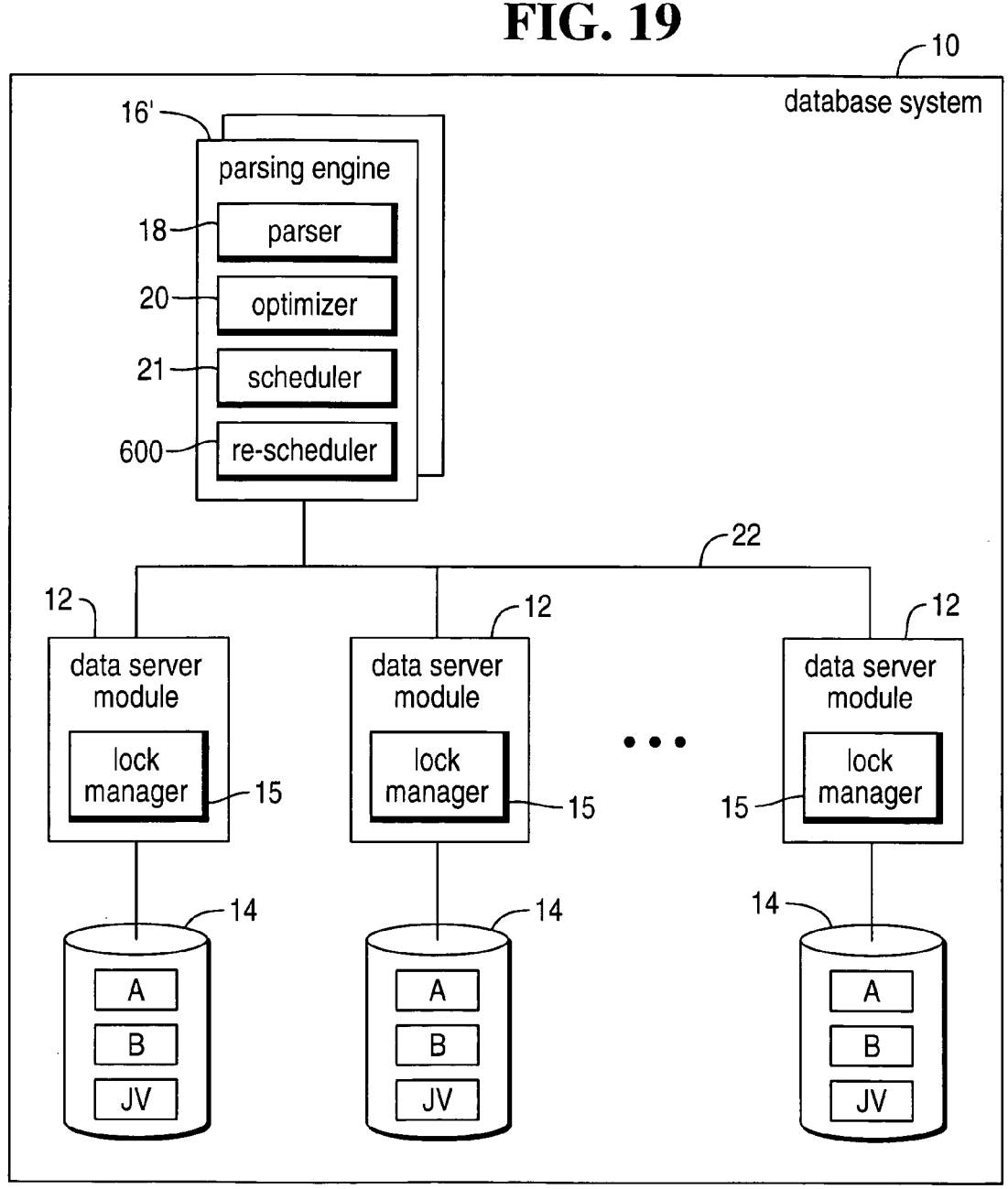
FIG. 19 illustrates an example database system that employs a transaction rescheduling mechanism according to some embodiments.

To reduce the occurrences of deadlocks and/or lock conflicts between transactions, a transaction rescheduling mechanism is provided in the database system. The transaction rescheduling mechanism according to some embodiments is implemented in a re-scheduler (or multiple re-schedulers) 600 in the parsing engine (or multiple parsing engines) 16', as shown in FIG. 19.

As an example of a lock conflict, if a join view JV=A⋈B ⋈ C, and transaction T updates base relation A, then transaction T places table-level S locks on both base relations B and C for join view maintenance. The term "update" refers to inserting data into a relation, deleting data from a relation, or changing data in the relation. As a result of the table-level S locks, no other transaction can update B or C until transaction T is committed or aborted, which creates a conflict situation until the transaction T completes.

In another example, transactions updating different base relations of a join view JV often cause deadlocks due to their lock requests on the base relations of JV. For example, consider the following two transactions $T_1$ and $T_2$. Transaction $T_1$ updates base relation A and thus requires the following locks: an IX lock on A and an X value lock on some attribute value of A, a table-level S lock on B, a table-level S lock on C, and a Y lock on JV (assuming the Y-lock locking mechanism is used). Transaction $T_2$ updates base relation B and thus requires the following locks: an IX lock on B and an X value lock on some attribute value of B, a table-level S lock on A, a table-level S lock on C, and a Y lock on JV. If transactions $T_1$ and $T_2$ request the locks on A and B in the following order, a deadlock will occur:

(1) $T_1$ requires an IX lock on A.
(2) $T_2$ requires an IX lock on B.
(3) $T_1$ requires an S lock on B.
(4) $T_2$ requires an S lock on A.

The Ix lock on A for transaction $T_1$ blocks the S lock on A required by transaction $T_2$, and the Ix lock on B for transaction $T_2$ blocks the S lock on B required by transaction $T_1$. As a result, neither transaction $T_1$ nor transaction $T_2$ can proceed, which is a deadlock phenomenon.

In accordance with some embodiments, the transaction rescheduling mechanism can be used to avoid some of these lock conflicts and deadlocks by reordering transactions. The transaction rescheduling mechanism is discussed first for the situation in which each transaction only reads or updates one base relation or reads one materialized view, and no materialized view is defined on other materialized view(s). The more general situation is discussed further below.

Figure 20:
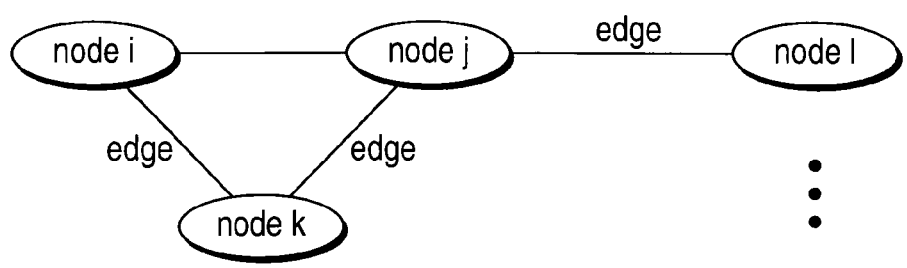
FIGS. 20–21 illustrate example conflict graphs used by the transaction rescheduling mechanism.

Consider a database with base relations $R_1, R_2, \ldots,$ and $R_n$ and join views $JV_1, JV_2, \ldots,$ and $JV_m$. An example conflict graph of this database is defined in connection with FIG. 20. As shown in FIG. 20, a graph with n nodes (or "components") is constructed. Node i of the graph represents base relation $R_i$ ($1 \leq i \leq n$). Each join view $JV_j$ ($1 \leq j \leq m$) is defined on base relations $R_{t_1}, R_{t_2}, \ldots,$ and $R_{t_h}$ ({$t_1, t_2, \ldots, t_h$}{1,2,\ldots, n}). For each pair of base relations $R_{t_u}$ and $R_{t_v}$ ($u \neq v$, $1 \leq u \leq h$, $1 \leq v \leq h$), an edge connects nodes $t_u$ and $t_v$. For example, as shown in FIG. 20, edges are connected between nodes i and k, nodes k and j, and nodes j and l. If there are p (p>0) edges between two nodes, only one edge is maintained between them, where the weight of the edge is p. The weight p can be value 1, 2, 3, etc., depending on how many edges are to be represented between a given pair of nodes in the conflict graph. In this way, as join views are added into or dropped from the database, the conflict graph of the database can be incrementally maintained efficiently. Two base relations conflict with each other if there is an edge between them in the conflict graph. Note that no base relation conflicts with itself.

Effectively, the conflict graph defines a relationship among base relations that indicates conflicts among the base relations due to their association with materialized views.

Figure 21:
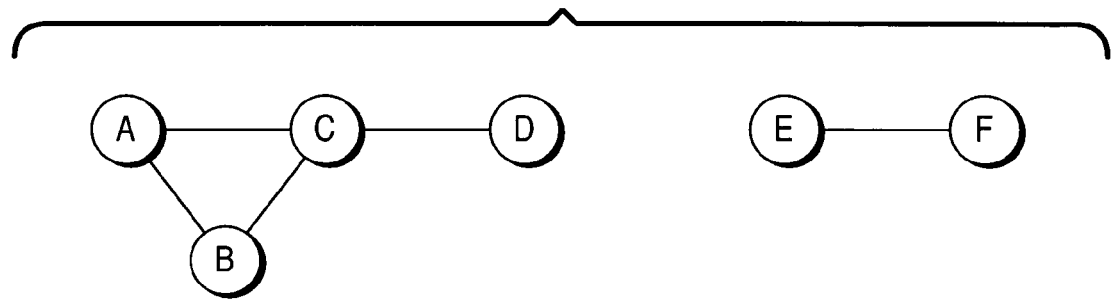

For example, suppose the database contains base relations A, B, C, D, E, and F, and join views $JV_1=A\bowtie B\bowtie C$, $JV_2=C\bowtie D$, and $JV_3=E\bowtie F$, then an example conflict graph is as shown in FIG. 21. In the conflict graph of FIG. 21, edges are drawn between node pairs (A, B), (B, C), (A, C), (C, D), and (E, F). However, no edge is drawn between A and D, between B and D. Also, no edge is drawn between either E or F and any of A, B, C, and D.

Figure 22:
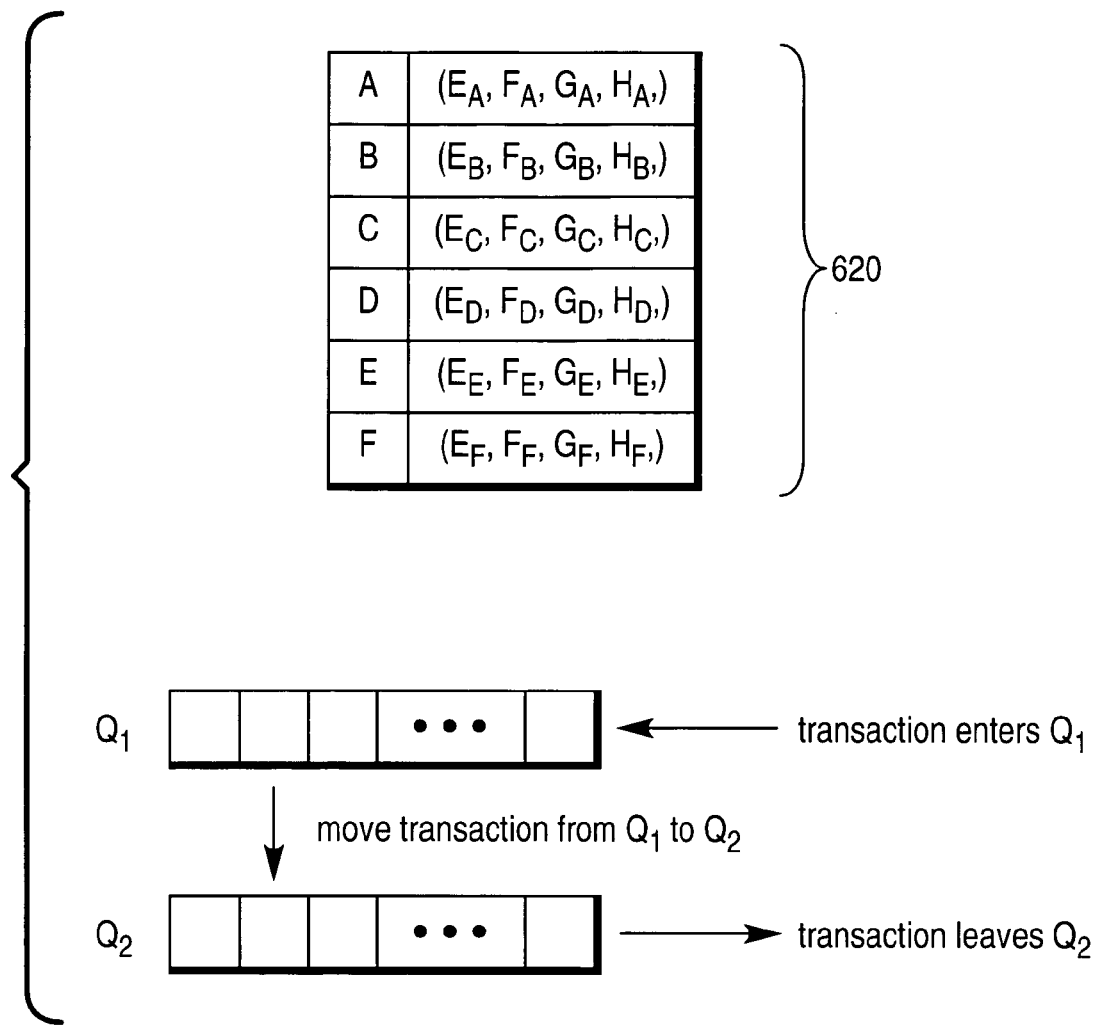
FIG. 22 illustrates a predefined structure and queues used by the transaction rescheduling mechanism.

In accordance with one embodiment, the transaction rescheduling mechanism includes two queues (as shown in FIG. 22): $Q_1$ and $Q_2$. $Q_1$ stores the transactions waiting for execution (the "pending transactions") while $Q_2$ stores the transactions scheduled for execution. Transactions enter $Q_1$ in the order that they are submitted to the database system (through submission of queries). Transactions enter $Q_2$ in an order as reordered by the transaction rescheduling mechanism.

After a query is submitted by a user, the parser 18 and optimizer 20 parses and optimizes the query, then generates the execution plan for the query. Thus, receiving a transaction refers to receiving the execution plan from the optimizer 20. Each execution plan contains several execution steps. A transaction is scheduled for execution once it enters the queue $Q_2$. The scheduler 21 processes the transactions (execution plans) in $Q_2$. If the scheduler 21 has multiple processes or threads, then multiple execution plans can be executed concurrently. The execution steps of each execution plan are sent by the scheduler to respective one or more data server modules for execution.

Thus, a transaction is "pending" while it is being processed by the re-scheduler. A pending transaction is rescheduled and submitted to the scheduler to be scheduled for execution.

Figure 23:
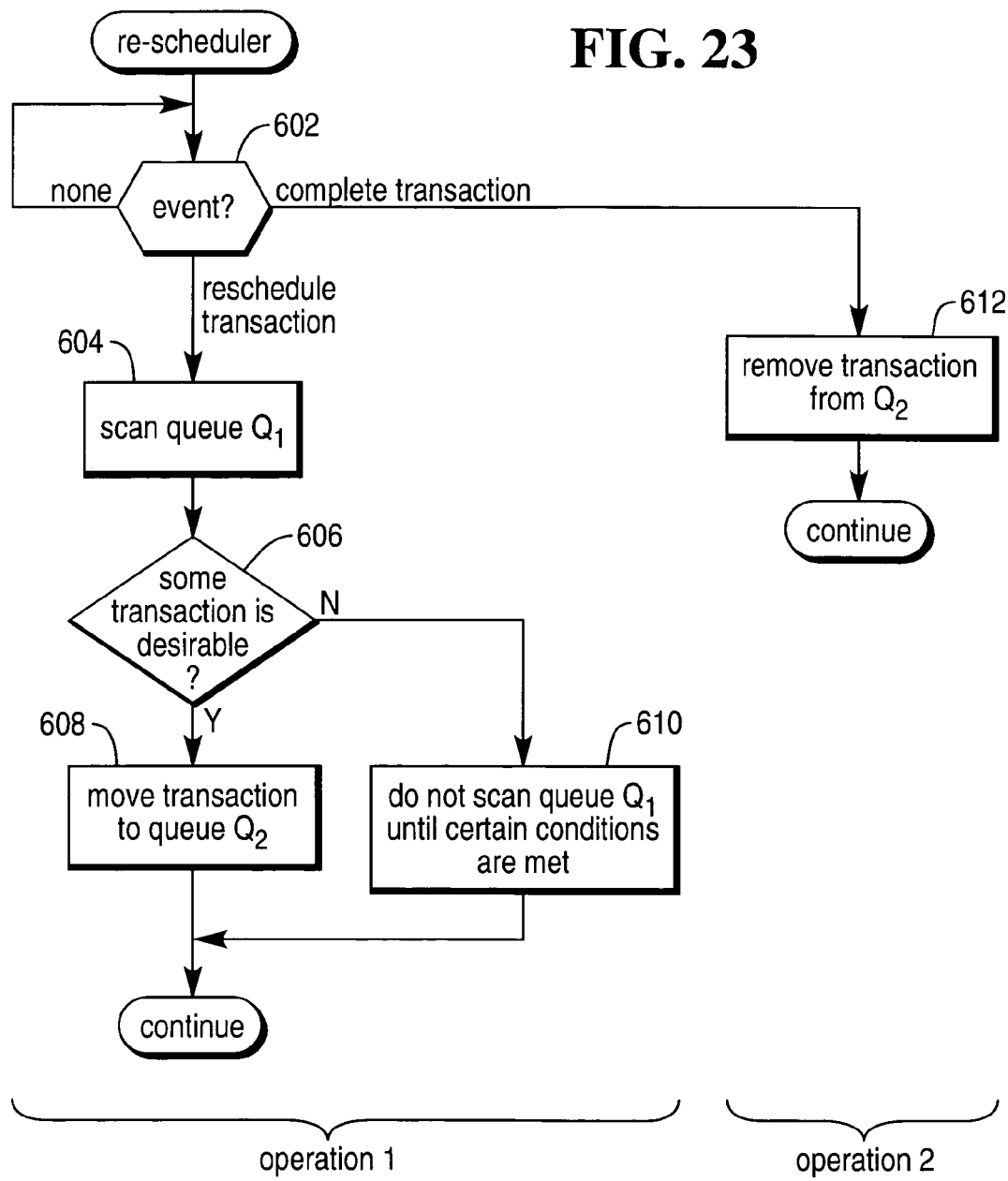
FIG. 23 is a flow diagram of logic performed by the transaction rescheduling mechanism.

The logic for rescheduling transactions, as performed by the re-scheduler 600 in the parsing engine 16', is shown in FIG. 23. Each time it is desired to schedule a transaction for execution (at 602), the re-scheduler 600 scans (at 604) $Q_1$ sequentially until one "desirable" transaction T is found (at 606) or N (a predefined number) transactions have been scanned, whichever is first. The use of N is to avoid scanning $Q_1$ indefinitely, as previously scanned transactions in $Q_1$ may become suitable for execution after their conflicting transactions in $Q_2$ are committed or aborted. Generally, the "desirable" transaction T has the property that it does not require a lock that conflicts with any required locks of transactions in $Q_2$.

In a first case, a transaction T that updates base relation $R_i$ ($1 \leq i \leq n$) is "desirable" if the following is satisfied: for transactions in $Q_2$ that update base relations $R_{S_1}, R_{S_2}, \ldots,$ and $R_{S_w}$, there is no edge between i and any $s_j$ ($1 \leq j \leq w$) in the conflict graph of the database, and no transaction in $Q_2$ reads any join view defined on $R_i$. In addition, the "desirable" transaction T also has one of the following two properties: either (a) the update operation in T can use X value lock on $R_i$ and no transaction in $Q_2$ reads (updates) $R_i$ by table-level S (X) lock, or (b) the update operation in T can only use table-level X lock on $R_i$ and no transaction in $Q_2$ either reads or updates $R_i$.

In a second case, a transaction T that reads base relation $R_i$ ($1 \leq i \leq n$) is "desirable" if the following is satisfied: either (a) the read operation in T can only use table-level S lock on $R_i$ and no transaction in $Q_2$ updates $R_i$, or (b) the read operation in T can use S value lock on $R_i$ and no transaction in $Q_2$ updates $R_i$ by table-level X lock.

In a third case, a transaction T that reads join view $JV_j$ ($1 \leq j \leq m$) is "desirable" if no transaction in $Q_2$ updates any base relation of $JV_j$.

If the re-scheduler 600 finds (at 606) a desirable transaction T, the transaction T is moved by the re-scheduler 600 from $Q_1$ to $Q_2$, where the scheduler 21 schedules the transaction for execution. Otherwise, if a desirable transaction T is not found, the re-scheduler 600 does not scan (at 610) $Q_1$ again until either (a) some transaction leaves $Q_2$ or (b) the number of elements in $Q_1$ is less than N and some new transaction enters $Q_1$. In case (b), the re-scheduler 600 only needs to check whether the new transaction is a desirable transaction or not.

Once a transaction is committed or aborted, the transaction is removed (at 612) by the scheduler 21 from $Q_2$. In FIG. 23, the procedure performed at 604, 606, 608, and 610 from the "reschedule transaction" branch of decision block 602 is referred to as "operation 1," while the procedure performed at 612 from the "complete transaction" branch of decision block 602 is referred to as "operation 2." Both operations 1 and 2 need to be atomic, which can be accomplished by an operating system synchronization mechanism such as a semaphore.

For better performance, the re-scheduler 600 does not always start scanning $Q_1$ from the first element of the queue when a transaction is to be rescheduled. For example, suppose that a first transaction $T_1$ in $Q_1$ conflicts with a second transaction $T_2$ in $Q_1$. After $T_1$ is moved from $Q_1$ to $Q_2$ for execution, $T_2$ becomes the first transaction in $Q_1$. As $T_1$ needs some time for execution, $T_1$ will stay in $Q_2$ for some amount of time. During this time period, $T_2$ cannot be moved from $Q_1$ to $Q_2$ for execution. However, if the re-scheduler always starts scanning $Q_1$ from the first element, $T_2$, the rescheduling operation will be inefficient, as $T_2$ is always not a desirable transaction during this time period (of $T_1$ execution). To address this issue, the re-scheduler 600 maintains the first N elements of $Q_1$ as a "round-robin" queue. Each time the re-scheduler scans $Q_1$, the re-scheduler starts the scan with the element next to the element at which the re-scheduler previously stopped in the "round-robin" queue. If some transaction is moved from $Q_1$ to $Q_2$ and there are more than N elements in $Q_1$, the (N+1)-th element of $Q_1$ will be moved to the end of the "round-robin" queue that is N entries long.

For example, if N=4, the elements in $Q_1$ may be rescheduled as shown in FIGS. 24A–D (the dotted rectangle 702 denotes the "round-robin" queue in $Q_1$).

Figure 24A:
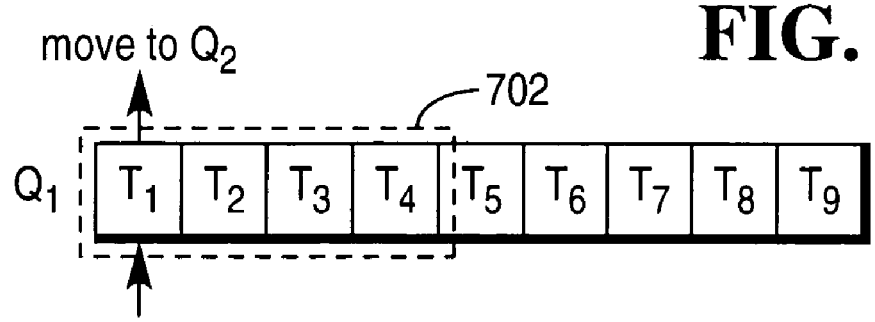
FIGS. 24A–24D illustrate an example of rescheduling received transactions.
Figure 24B:
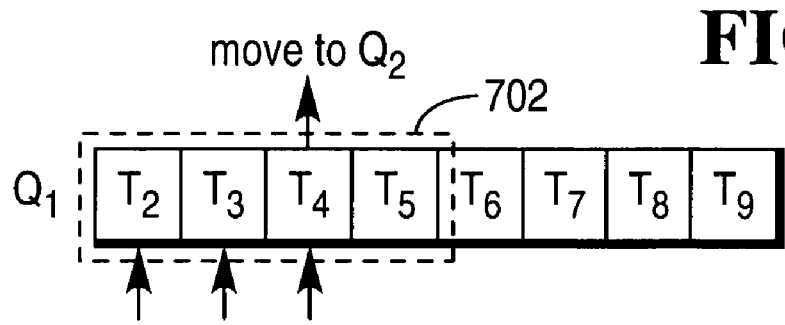
Figure 24C:
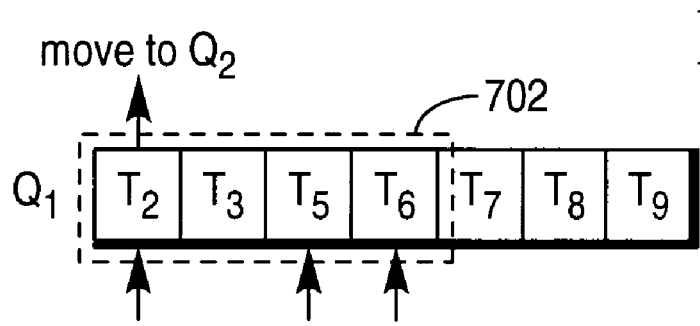
Figure 24D:
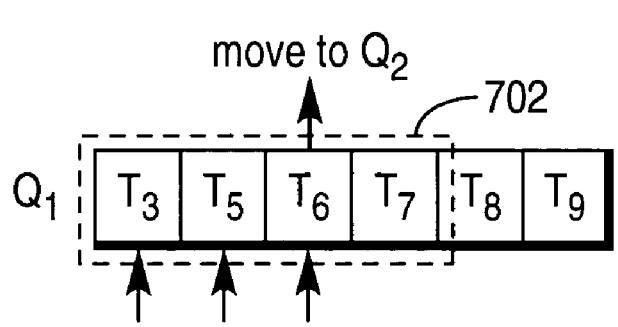

In the example shown in FIG. 24A, transaction $T_1$ is moved from $Q_1$ to $Q_2$. Note that, before transaction $T_1$ is moved, the round-robin queue 702 includes transactions $T_1$, $T_2$, $T_3$, and $T_4$. Once transaction $T_1$ is moved out of $Q_1$, the (N+1)-the element of $Q_1$ (in this example $T_5$) is now the last element of the round-robin queue 702, as shown in FIG. 24B. Next, as a result of a scan of transactions $T_2$, $T_3$, and $T_4$, transaction $T_4$ is identified as the desirable transaction and moved from $Q_1$ to $Q_2$. As a result of the move, transaction $T_6$ is moved to the end of the round-robin queue 702, as shown in FIG. 24C. Since the transaction previously moved out of the round-robin queue 702 was transaction $T_4$, the next scan starts from transaction $T_5$, as shown in FIG. 24C. In this example, the transactions scanned are transactions $T_5$, $T_6$, and $T_2$ (which is the first element of the round-robin queue 702). In this case, transaction $T_2$ is identified as the desirable transaction that is moved out of $Q_1$ to $Q_2$. As a result, transaction $T_7$ is added to the end of the round-robin queue 702, as shown in FIG. 24D. Since the transaction previously moved out of $Q_1$ was transaction $T_2$, the next scan starts from transaction $T_3$, as shown in FIG. 24D. The transactions scanned include $T_3$, $T_5$, and $T_6$, with transaction $T_6$ identified as the desirable transaction to be moved from $Q_1$ to $Q_2$.

To prevent starvation of a transaction, another number M is defined. Suppose that $Q_1$ has been scanned M times since a given transaction T became the first element in $Q_1$ and, in each of those M scans, transaction T was not identified as a desirable transaction. If this condition is present, then each time that $Q_1$ is subsequently scanned to find a desirable transaction T', the desirable transaction T' must either (i) be transaction T itself or (ii) do not conflict with transaction T. There are three possible cases:

(1) If T'=T, T' is moved from $Q_1$ to $Q_2$ for execution.
(2) If T' ≠T and T' does not conflict with T, T' is moved from $Q_1$ to $Q_2$ for execution.
(3) If no desirable transaction can be found that does not conflict with T, no transaction is moved from $Q_1$ to $Q_2$. $Q_1$ is not scanned again until either (a) some transaction leaves $Q_2$ or (b) the number of elements in $Q_1$ is less than N (N being the length of the round-robin queue 702 in $Q_1$) and some new transaction enters $Q_1$. In case (b), the re-scheduler only needs to check whether the new transaction is a desirable transaction or not.

According to one embodiment, to find the desirable transaction T quickly, the re-scheduler 600 stores an array that contains n elements (n being the number of base relations of the join view JV). The i-th ($1 \leq i \leq n$) element of the array is a 4-tuple ($E_i$, $F_i$, $G_i$, $H_i$), where $E_i$ denotes the number of transactions in $Q_2$ that update base relation $R_i$ by an X value lock; $F_i$ denotes the number of transactions in $Q_2$ that update base relation $R_i$ by a table-level X lock; $G_i$ denotes the number of transactions in $Q_2$ that read base relation $R_1$ by an S value lock; and $H_i$ denotes the number of transactions in $Q_2$ that read base relation $R_1$ by a table-level S lock.

Each $E_i$, $F_i$, $G_i$, and $H_i$ ($1 \leq i \leq n$) is initialized to the value zero. An example is the array 620 for base relations A, B, C, D, E, and F shown in FIG. 22. For relation A, the 4-tuple is ($E_A$, $F_A$, $G_A$, $H_A$); for relation B, the 4-tuple is ($E_B$, $F_B$, $G_B$, $H_B$); and so forth.

Once a transaction T is moved from $Q_1$ to $Q_2$, the corresponding 4-tuple is updated as follows:

Action 1: This action is performed if transaction T updates base relation $R_i$ ($1 \leq i \leq n$). For each base relation $R_j$ ($1 \leq j \leq n$, j≠i) that conflicts with $R_i$ (that is, an edge between $R_j$ and $R_i$ exists in the conflict graph), $H_j$ is incremented by one. If this update to $R_i$ by transaction T can be done by X value lock, $E_i$ is incremented by one. Otherwise if this update to $R_i$ can only be done by table-level X lock, $F_i$ is incremented by one.

Action 2: This action is performed if transaction T reads base relation $R_i$ ($1 \leq i \leq n$). If this read operation to $R_i$ can be done by S value lock, $G_i$ is incremented by one. Otherwise if this read operation to $R_i$ can only be done by table-level S lock, $H_i$ is incremented by one.

Action 3: This operation is performed if one transaction T reads join view $JV_j$ ($1 \leq j \leq m$). For each base relation $R_S$ ($1 \leq s \leq n$) of the join view, $H_S$ is incremented by one (to prevent other transactions from updating $R_S$).

Once transaction T leaves $Q_2$, the reverse action is performed (that is, the corresponding elements are decremented by one).

The following describes how the array of 4-tuples ($E_i$, $F_i$, $G_i$, $H_i$) is used to identify a "desirable" transaction to be moved from $Q_1$ to $Q_2$. Three cases are considered, with the first case involving a transaction that updates a base relation, the second case involving a transaction that reads a base relation, and the third case involving a transaction that reads a join view.

Case 1: Transaction T updates base relation $R_i$ ($1 \leq i \leq n$): If this update to $R_i$ can be done by X value lock, check whether $F_i$=0 and $H_i$=0 or not. $F_i$=0 and $H_1$=0 indicates that there is no table-level X or S lock on $R_i$, and as a result, the X value lock request for transaction T does not conflict with any existing lock on $R_i$ (unless in a highly unlikely case where there already exists an X value lock on $R_1$ on the same value locking attribute value) and thus transaction T can be moved from $Q_1$ to $Q_2$. If the update to $R_i$ can only be done by table-level X lock, check whether $E_1$=0, $F_1$=0, $G_1$=0, and $H_1$=0 or not. $E_i$=0, $F_i$=0, $G_i$=0, and $H_i$=0 indicates that there is no (X or S) lock on $R_i$, and as a result, transaction T can be moved from $Q_1$ to $Q_2$.

Case 2: Transaction T reads base relation $R_i$ ($1 \leq i \leq n$): If this read operation to $R_i$ can be done by S value lock, check whether $F_i$=0 or not. $F_i$=0 indicates that there is no table-level X lock on $R_i$, and as a result, the S value lock for T does not conflict with any existing lock on $R_i$ (unless in a highly unlikely case where there already exists an X value lock on $R_i$ on the same value locking attribute value) and thus transaction T can be moved from $Q_1$ to $Q_2$. If this read operation to $R_1$ can only be done by table-level S lock, check whether $E_i$=0 and $F_i$=0 or not. $E_i$=0 and $F_i$=0 indicates that there is no X lock (value or table-level) on $R_i$, and as a result, the table-level S lock for T does not conflict with any lock on $R_i$.

Case 3: Transaction T reads join view $JV_j$ ($1 \leq j \leq m$): For each base relation $R_s$ ($1 \leq s \leq n$) of the join view, check whether $E_s=0$ and $F_s=0$ or not. $E_s=0$ and $F_s=0$ indicates that no transaction is updating the join view $JV_j$ by updating the base relations of $JV_j$.

In the discussion above, it is assumed that each operation reads or updates one base relation or reads one join view. However, if some transaction T contains several operations, to move transaction T from $Q_1$ to $Q_2$, the re-scheduler 600 checks whether each of the operations in transaction T conflicts with any of the transactions in $Q_2$. Once transaction T is moved from $Q_1$ to $Q_2$, the corresponding Action 1, 2, or 3 (discussed above) is performed for each of the operations in transaction T. There are two cases that are handled specially:

(1) Transaction T tries to update several base relations of join view $JV_j$ ($1 \leq j \leq m$) simultaneously. The locks that transaction T puts on $JV_j$ and its base relations will prevent other transactions from either reading or updating $JV_j$. Thus, for each such base relation $R_i$ ($1 \leq i \leq n$) of join view $JV_j$ that is to be updated, $F_i$ is always incremented by one in Action 1, no matter whether this update to $R_i$ can be done by X value lock or table-level X lock. Also, when determining whether transaction T is a desirable transaction or not, the parsing engine also checks if $E_i=0$, $F_i=0$, $G_{i=0}$, and $H_i=0$, regardless of whether this update to $R_i$ can be done by X value lock or table-level X lock. In other words, transaction T (which updates multiple base relations) is identified as a desirable transaction only if there are no locks on each base relation $R_1$ of join view $JV_j$.

(2) Transaction T tries to both read ($1 \leq j \leq m$) and updates one or several base relations of $JV_j$. This is similar to case (1) above.

If some materialized view is defined on other materialized view(s), such a materialized view is rewritten using only base relations. For example, if join view $JV_1 = A \bowtie B$ and join view $JV_2 = JV_1 \bowtie C$, $JV_2$ is rewritten as $A \bowtie B \bowtie C$. Thus there is an edge between any two of the three base relations A, B, and C in the conflict graph of the database.

As an example, consider the database shown in FIG. 21. Suppose that N=2 and transactions enter the database system in the following order: transaction $T_1$ updates base relation C, transaction $T_2$ updates base relation A, and transaction $T_3$ updates base relation E. At this point, $Q_1$ contains three elements: $T_1$, $T_2$, and $T_3$. In the example, if $T_1$ is first moved from $Q_1$ to $Q_2$, followed by moving $T_3$ from $Q_1$ to $Q_2$, the parsing engine has to wait until $T_1$ leaves $Q_2$ before $T_2$ can be moved from $Q_1$ to $Q_2$. This is because $T_2$ requires a lock (X lock) on A that conflicts with the S lock placed on A by $T_1$.

Figure 25:
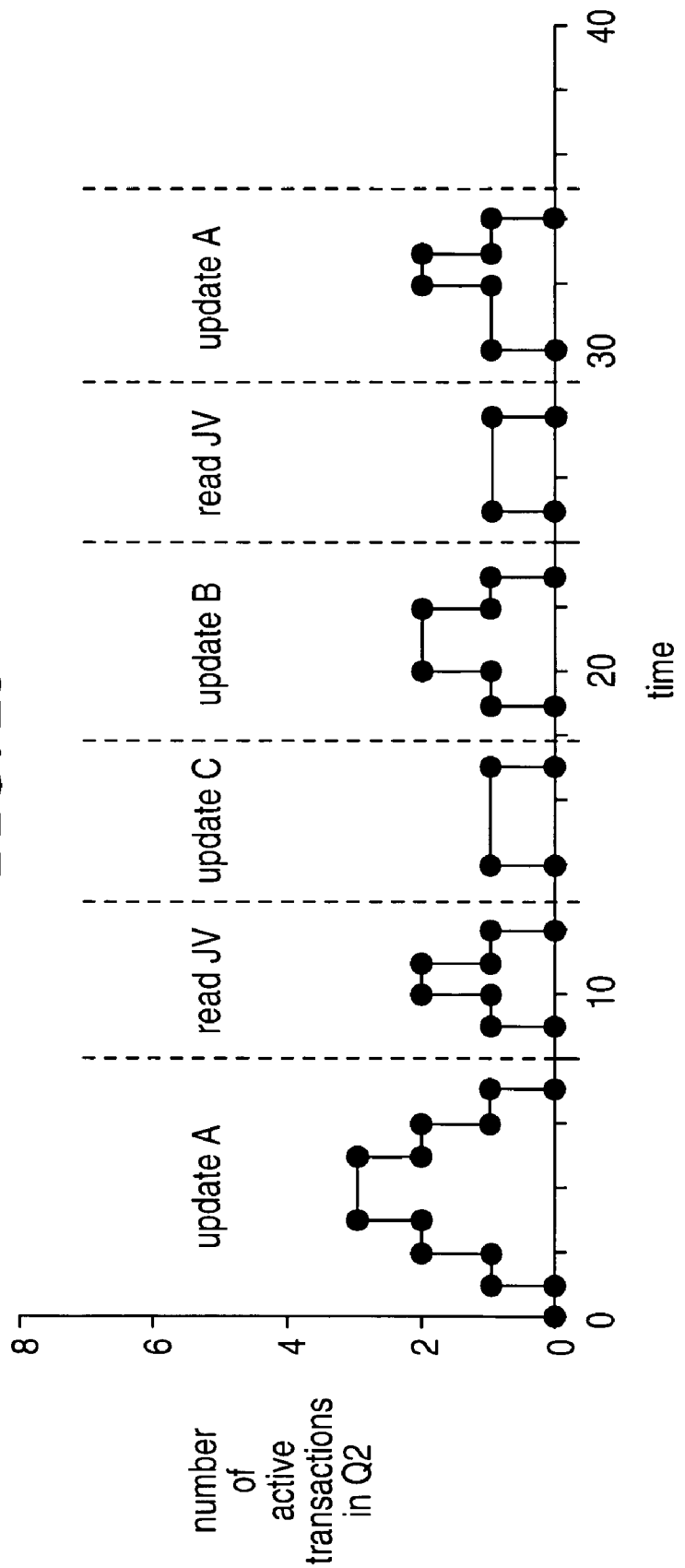
FIG. 25 is a timing chart illustrating the number of transactions in a queue over time.

As a second example, shown in FIG. 25, consider a join view $JV = A \bowtie B \bowtie C$. Four types of transactions are used in the example: transaction updating A; transaction updating B; transaction updating C; and transaction reading JV. Assume each transaction that updates one base relation does the update by using value locking on that base relation. The different types of transactions in this example conflict with each other, so different types of transactions cannot be executed together. To enhance database system performance, the transactions are rescheduled so that transactions of the same type are executed together. Thus, as shown in FIG. 25, the rescheduling causes transactions updating A to be performed first (3 transactions are shown to be moved into $Q_2$). After the transactions updating A have been completed (moved out of $Q_2$), transactions reading JV are rescheduled and moved into $Q_2$ for execution. The same rescheduling is applied to further transactions that update C, update B, read JV, and update A.

The transaction rescheduling mechanism can also be generalized to handle some special cases. The transaction rescheduling mechanism is able to handle transactions that update multiple base relations where the join condition among the base relations involves value locking attributes of the base relations. Consider a join view $JV_j$ ($1 \leq j \leq m$) defined on base relations $R_{q_1}, R_{q_2}, \ldots$, and $R_{q_w}$ ($\{q_1, q_2, \ldots, q_w\}\{1, 2, \ldots, n\}$). Suppose that the join condition among base relations $R_{t_1}, R_{t_2}, \ldots$, and $R_{t_h}$ ($\{t, t_2, \ldots, t_h\}\{q_1, q_2, \ldots, q_w\}$) is $R_{t_1}.a_1 = R_{t_2}.a_2 = \ldots = R_{t_h}.a_h$ ($h \geq 2$), where $R_{t_i}.a_i$ ($1 \leq i \leq h$) is the value locking attribute of base relation $R_{t_i}$. Consider a transaction T updating base relations $R_{S_1}, R_{S_2}, \ldots$, and $R_{S_v}$ ($v \geq 1$) simultaneously. Further, suppose that the following conditions are satisfied: (1) $\{S_1, S_2, \ldots, S_v\}\{t_1, t_2, \ldots, t_h\}$, (2) base relations $R_{S_1}, R_{S_2}, \ldots$, and $R_{S_v}$ only conflict with each other on join view $JV_j$ (i.e., for each pair of nodes $s_x$ and $S_y$ ($1 \leq x \leq v$, $1 \leq y \leq v$, $x \neq y$), the weight of the edge between them is one), and (3) the update to any base relation $R_{S_i}$ ($1 \leq i \leq v$) can be done by value locking on $R_{s_i}$. Then once transaction T is moved from $Q_1$ to $Q_2$, Action 1 is as follows: (1) for each $R_{s_i}$ ($1 \leq i \leq V$), $E_{s_i}$ is incremented by one; (2) for each base relation $R_k$ ($1 \leq k \leq n$, $k \notin \{S_1, S_2, \ldots, s_v\}$) that conflicts with any $R_{s_i}$ ($1 \leq i \leq v$), $H_k$ is incremented by one. Also, to determine whether transaction T is a desirable transaction or not, for each $R_{s_i}$ ($1 \leq i \leq v$), the parsing engine checks whether $F_{s_i}=0$ and $H_{s_i}=0$ or not.

The transaction rescheduling mechanism is also able to exploit key-foreign key constraints. Consider a join view $JV_j$ ($1 \leq j \leq m$) defined on base relations $R_{q_1}, R_{q_2}, \ldots$, and $R_{q_w}$ ($\{q_1, q_2, \ldots, q_w\}\{1, 2, \ldots, n\}$). Suppose that the join condition between base relations $R_{q_x}$ ($1 \leq x \leq w$) and $R_{q_y}$ ($y \neq x$, $1 \leq y \leq w$) is $R_{q_x}.a_x = R_{q_y}.a_y$, where $R_{q_x}.a_x$ is a key of $R_{q_x}$ and $R_{q_y}.a_y$ is a foreign key of $R_{q_y}$ that references $R_{q_x}.a_x$. Also suppose that base relation $R_{q_x}$ only appears in the definition of join view $JV_j$. Then if transaction T inserts a tuple $T_x$ into base relation $R_{q_x}$, no join view maintenance is necessary, as there is no matching tuple in base relation $R_{q_y}$. Thus, (1) to check whether transaction T is a desirable transaction or not, the re-scheduler 600 only needs to check whether $F_{q_x}=0$ and $H_{q_x}=0$ or not; and (2) once transaction T is moved from $Q_1$ to $Q_2$, the re-scheduler only needs to increment $E_{q_x}$ by one in Action 1.

The transaction rescheduling mechanism is also able to handle a locking mechanism that uses value locking. Consider a join view $JV_j$ ($1 \leq j \leq m$) defined on base relations $R_{q_1}, R_{q_2}, \ldots$, and $R_{q_w}$ ($\{q_1, q_2, \ldots, q_w\}\{1, 2, \ldots, n\}$). For a fixed i ($1 \leq i \leq w$), suppose that $R_{q_i}.a_i$ is the value locking attribute of base relation $R_{q_i}$ that also appears in $JV_j$ so that (X and S) value locking on $R_{q_i}.a_i$ for $JV_j$ is allowed. Consider a transaction T that only reads join view $JV_j$. Suppose that this read operation can be done by S value locking. To check whether transaction T is a desirable transaction or not, the re-scheduler checks (1) for each k ($1 \leq k \leq w$, $k \neq i$), whether $E_{q_k}=0$ and $F_{q_k}=0$ or not, and (2) whether $F_{q_i}=0$ or not. Once transaction T is moved from $Q_1$ to $Q_2$, Action 3 is performed as follows: (1) for each k ($1 \leq k \leq w$, $k \neq i$), the parsing engine increments $H_{q_k}$ by one (to prevent other transactions from updating $R_{q_k}$); and (2) $G_{q_i}$ is incremented by one.

Note that the transaction rescheduling mechanism uses a heuristic algorithm and is unable to completely avoid lock conflicts. For example, suppose that two transactions try to update the same tuple in the same base relation. These two transactions may coexist in $Q_2$ after they are rescheduled to $Q_2$ for execution. In this case, these two transactions will block each other due to lock conflicts.

To fully utilize the parallelism of a parallel database system, such as that shown in FIG. 19, locks for tables (base relations, join views) are partitioned on all the database system nodes so different nodes manage different locks. If the same node manages all the locks, that node will become a bottleneck. Also, the query parsing, optimization, and rescheduling work needs to be done at all nodes in parallel to prevent any one node from becoming a bottleneck.

One way to enhance parallelism of the transaction rescheduling mechanism is to partition the conflict graph of the database into groups of connected components. For each connected component group, one node is in charge of rescheduling those transactions that are related to the base relations in the connected component group. For example, the conflict graph of FIG. 21 has two connected components groups: a first connected component group containing nodes A, B, C, D; and a second connected component group containing nodes E, F. A first database system node is in charge of rescheduling those transactions related to base relations A, B, C, and D, while a second system node is in charge of rescheduling those transactions related to base relations E and F. In other words, the re-scheduler in the first database system node handles the rescheduling of transactions involving base relations A, B, C, or D, and the re-scheduler in the second database system node handles the rescheduling of transactions involving base relations E or F.

If one transaction is related to several base relations that are in different connected component groups, this transaction can be rescheduled at any node that is in charge of one of these connected components. For example, if transaction T updates both base relations A and F, T can be rescheduled at either the first database system node or the second database system node. If transaction T is rescheduled at the first node, it may conflict with those transactions updating base relation F that are rescheduled at the second node. However, this will not happen frequently in an actual database. This is because in a typical database, if several base relations are frequently updated within the same transaction, there must be some relationship among these several base relations and usually a materialized view is defined on them. In this case, all these several base relations will be within the same connected component group of the conflict graph. At the database system node in charge of that connected component group, the transaction rescheduling algorithm will reschedule the transactions (including those where several base relations are updated within the same transaction) properly to maximize the throughput of transactions in the parallel database system.

X. Parallel Transaction Rescheduling

In some cases, in a parallel database system having L system nodes, one or a few of the nodes may be more heavily loaded than other system nodes in performing transaction rescheduling. As a result, this subset of the L nodes may become a bottleneck during database system execution.

Consider a join view JV=A⋈B, where the join condition is A.c=B.d. Suppose that A.c (B.d) is not the value locking attribute of base relation A (B). Consider two kinds of transactions: transaction $T_1$ inserts a tuple into base relation A, transaction $T_2$ inserts a tuple into base relation B. Assume also that 40% of all the transactions in the database are $T_1$ and another 40% of all the transactions are $T_2$. Transaction $T_1$ requires the following locks: an IX lock on A and an X value lock on some attribute value of A, a table-level S lock on B, and a table-level Y lock on JV. Transaction $T_2$ requires the following locks: an IX lock on B and an X value lock on some attribute value of B, a table-level S lock on A, and a table-level Y lock on JV. The lock manager that manages the table-level locks on B resides at a single node k. As each transaction $T_1$ requires a table-level S lock on B, and 40% of all the transactions are $T_1$, node k will become a bottleneck to handle all the table-level S lock requests on B. Also, as each transaction $T_2$ requires a table-level IX lock on B, and 40% of all the transactions are $T_2$, node k will become a bottleneck to handle all the table-level IX lock requests on B. Note that the value locks for B are partitioned on all the nodes. Thus, the lock managers that manage the value locks for B will not become a bottleneck.

To address the bottleneck problem, a group query mechanism, also implemented in the parsing engine, is provided in a parallel database system, according to some embodiments. A group query is a collection of queries with redundant table-level lock requests removed. The group query mechanism is able to substantially reduce the number of table-level lock requests, which enhances database system performance.

In accordance with some embodiments, one of four choices is selected by a parsing engine based on certain criteria: (1) no transaction rescheduling is performed; (2) transaction rescheduling (as discussed in Section IX) is performed without query grouping; (3) query grouping is performed without transaction rescheduling; and (4) both transaction rescheduling and query grouping are performed. An indicator is associated with each relation upon creation of the relation, with the indicator indicating one of the four choices above.

For a given relation, no transaction rescheduling is indicated if a user or database administrator expects that transactions operating on the given relation make up only a small portion of all the transactions in the database system (e.g., less than 5%); and the transactions on the given relation are of the same type so that use of a proper locking mechanism (such as a Y-lock locking mechanism, no-lock locking mechanism, or name-lock locking mechanism for materialized views) will enable the transactions to not conflict with each other. If transactions on the given relation make up only a small portion of all transactions in the database system, then that indicates that the relation is not a "hot" relation (i.e., a relation on which a large percentage of transactions operate). Transactions are of the "same type" if the transactions perform the same operations (update or read) on the relation and the same type of lock is used by each of the relations.

For example, for a join view based on relations A and B, a transaction updating base relation A by specifying a value lock of A and another transaction updating base relation A by specifying a value lock of A can be regarded as being the same type, as they usually do not conflict with each other. On the other hand, if one transaction updates a table using a value lock, while another transaction updates the table by using a table-level lock, then such transactions may be regarded as being of different types because of conflicting locks. Similarly, if one transaction updates one base relation, while another transaction reads this base relation by using a table-level lock, then such transactions can also be considered to be of different types.

For the given base relation, transaction rescheduling (described in Section IX above) is performed (without performing query grouping) if the user or database administrator expects that most transactions of the relation will be of different types that conflict with each other and the transactions on this relation make up only a small portion of all the transactions in the database system (e.g., less than about 5%). As discussed above, parallel transaction rescheduling can be achieved by partitioning the conflict graph of the database into connected component groups to enhance rescheduling performance.

For the given relation, query grouping is performed (without performing transaction rescheduling) if the user expects that the transactions on the given relation make up a large portion (e.g., greater than 5%) of all the transactions in the database system, and most transactions on this relation are of the same type so using a proper locking mechanism (e.g., Y-lock, no-lock, or name lock) will cause them not to conflict with each other. Query grouping eliminates duplicate table-level lock requests to enhance database system performance.

As an example, consider a join view JV=A⋈B, where the join condition is A.c=B.d and A.c (B.d) is the value locking attribute of base relation A (B). Using the Y-lock locking mechanism for join views, transactions updating base relation A by specifying the value locking attribute value of A and transactions updating base relation B by specifying the value locking attribute value of B can be regarded as of the same type. By specifying query grouping when relations A and B are created, queries updating base relation A and queries updating base relation B are combined into group queries.

For the given relation, both query grouping and transaction rescheduling are indicated if the user or database administrator expects that transactions on this relation make up a large portion of all transactions in the database system, and the transactions on this relation will be of different types that conflict with each other. In this case, query grouping is used to reduce the number of table-level lock requests so that the lock manager will not be a bottleneck. Also, the group queries are rescheduled to further decrease the likelihood of lock conflicts and/or deadlocks.

As an example, consider a join view JV that is based on relations A and B, where the join condition is A.c=B.d and A.c (B.d) is not the value locking attribute of base relation A (B). Using the Y-lock locking mechanism for join views, transactions updating base relation A by specifying the value locking attribute value of A are of the same type since they usually do not conflict with each other. Transactions updating base relation B by specifying the value locking attribute value of B are of the same type since they usually do not conflict with each other. However, transactions updating base relation A and transactions updating base relation B are of different types since they conflict with each other due to the locks they place on base relations A and B. As a result, the user may specify query grouping and transaction rescheduling when relations A and B are created. In this way, queries updating base relation A may be combined into group queries, and queries updating base relation B may be combined into group queries. These two kinds of group queries are then rescheduled using the transaction rescheduling mechanism to reduce the number of lock conflicts and/or deadlocks.

In some embodiments, transaction rescheduling does not apply to the following type of transaction: (1) this transaction contains multiple SQL statements; (2) the user first specifies begin transaction, then submits the first SQL statement; and (3) the user does not submit the second SQL statement of the transaction until the first SQL statement of the transaction finishes execution (in general, the user does not submit the next SQL statement of the transaction until the previous SQL statement finishes execution). Thus, for a given base relation on which the majority of transactions are of the type above, no transaction rescheduling is indicated.

Figure 26:
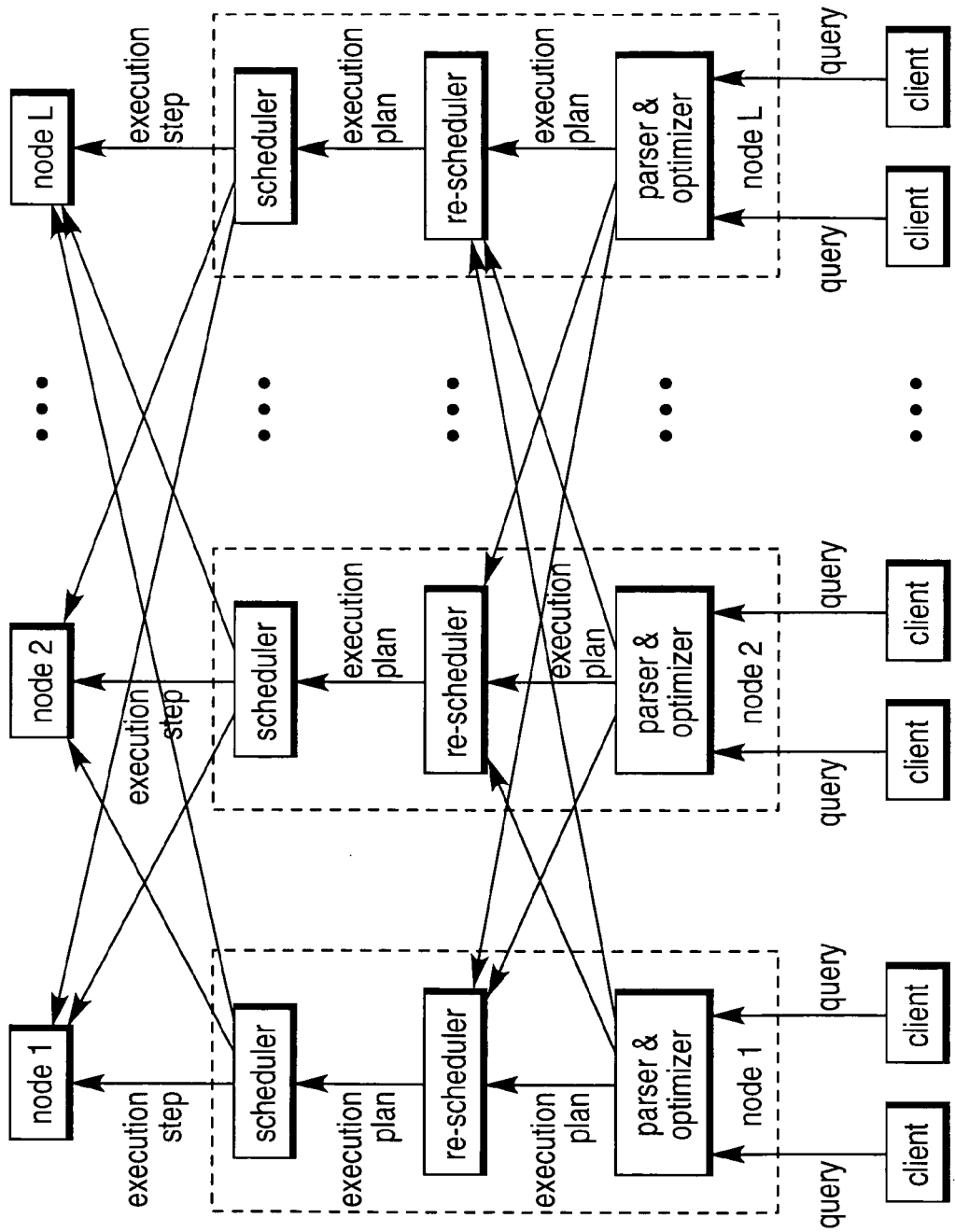
FIG. 26 illustrates an arrangement of the database system in which transaction rescheduling is performed.

In the ensuing discussion, the following assumptions are made. A conflict graph is defined on all the base relations in the database. The conflict graph is partitioned into connected component groups. For each connected component group, one database system node is in charge of rescheduling those transactions that are related to the base relations in the connected component group. Each database system node includes a query parser, an optimizer, a scheduler, and a re-scheduler, as shown in FIG. 26. FIG. 26 shows clients (which may be software applications) submitting queries to the L nodes. The parsing engine (including the parser, optimizer, scheduler, and re-scheduler) at each database system node processes a query and generates execution steps communicated to itself or to other nodes.

Figure 27:
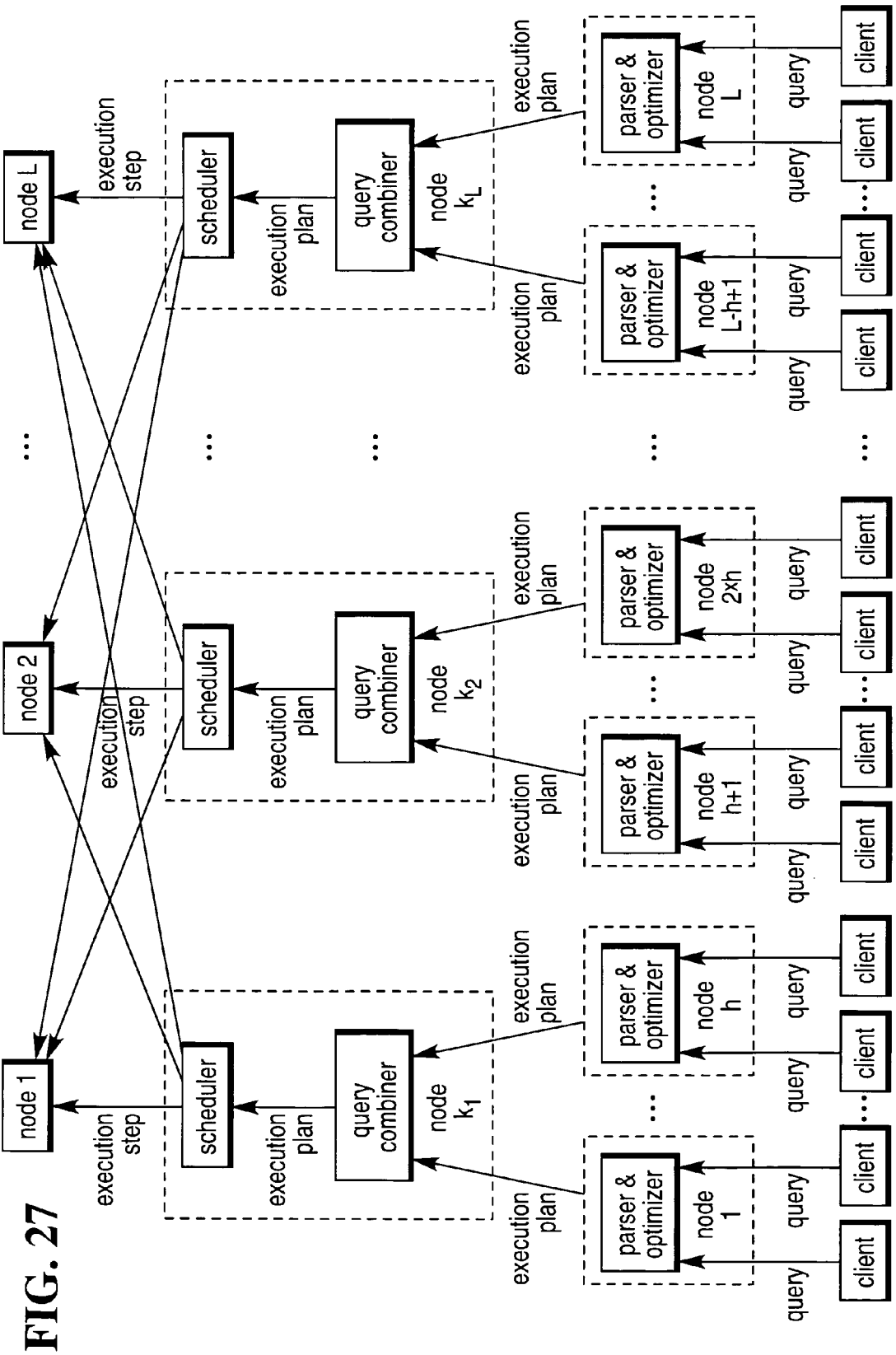
FIG. 27 illustrates another arrangement of the database system in which query combiners are used to perform query grouping, according to some embodiments.

Also assume that L=g×h. As shown in FIG. 27, there are g nodes $k_1, k_2, \ldots,$ and $k_g$ ($\{k_1, k_2, \ldots, k_g\}\{1, 2, \ldots, L\}$), where each node $k_j$ ($1 \leq j \leq g$) has a query combiner. The query combiner at node $k_j$ is in charge of combining queries from nodes (j−1)×h+1,(j−1)×h+2, . . . , and j×h into group queries. The query combiners of FIG. 27 perform query grouping for those transactions in which query grouping is performed without transaction rescheduling.

Figure 28:
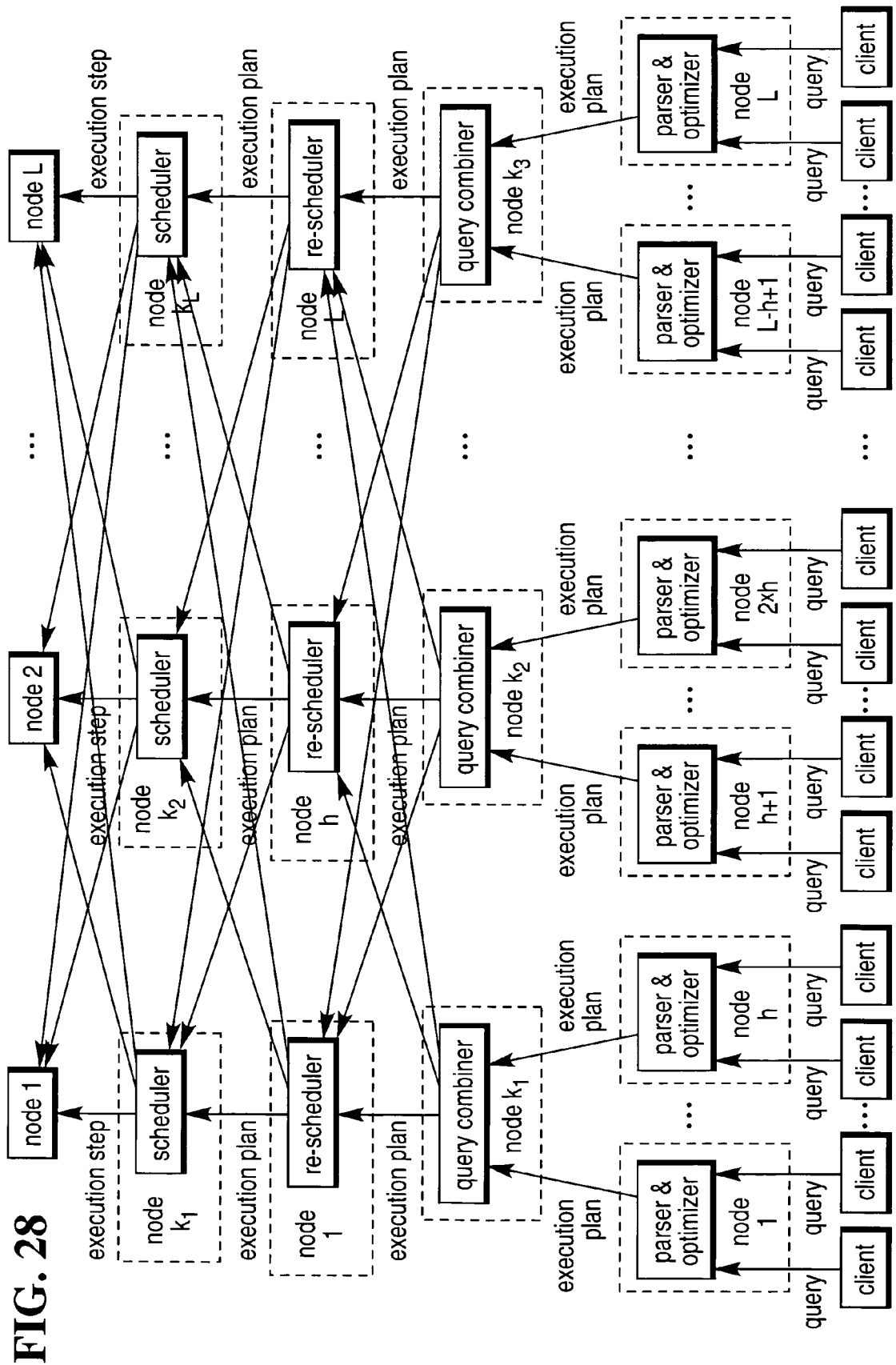
FIG. 28 illustrates yet a further arrangement of the database system in which both query grouping and transaction rescheduling are performed.

As shown in FIG. 28, there are another g nodes $k_1', k_2', \ldots,$ and $k_g'$ ($\{k_1', k_2', \ldots, k_g'\}\{1,2, \ldots, L\}$), where each node $k_j'$ ($1 \leq j \leq g$) has a query combiner that is in charge of combining queries from nodes (j−1)×h+1,(j−1)×h+2, . . . , and j×h into group queries. The query combiners of FIG. 28 are used to combine queries for those transactions in which both query grouping and transaction rescheduling are performed.

Figure 29A:
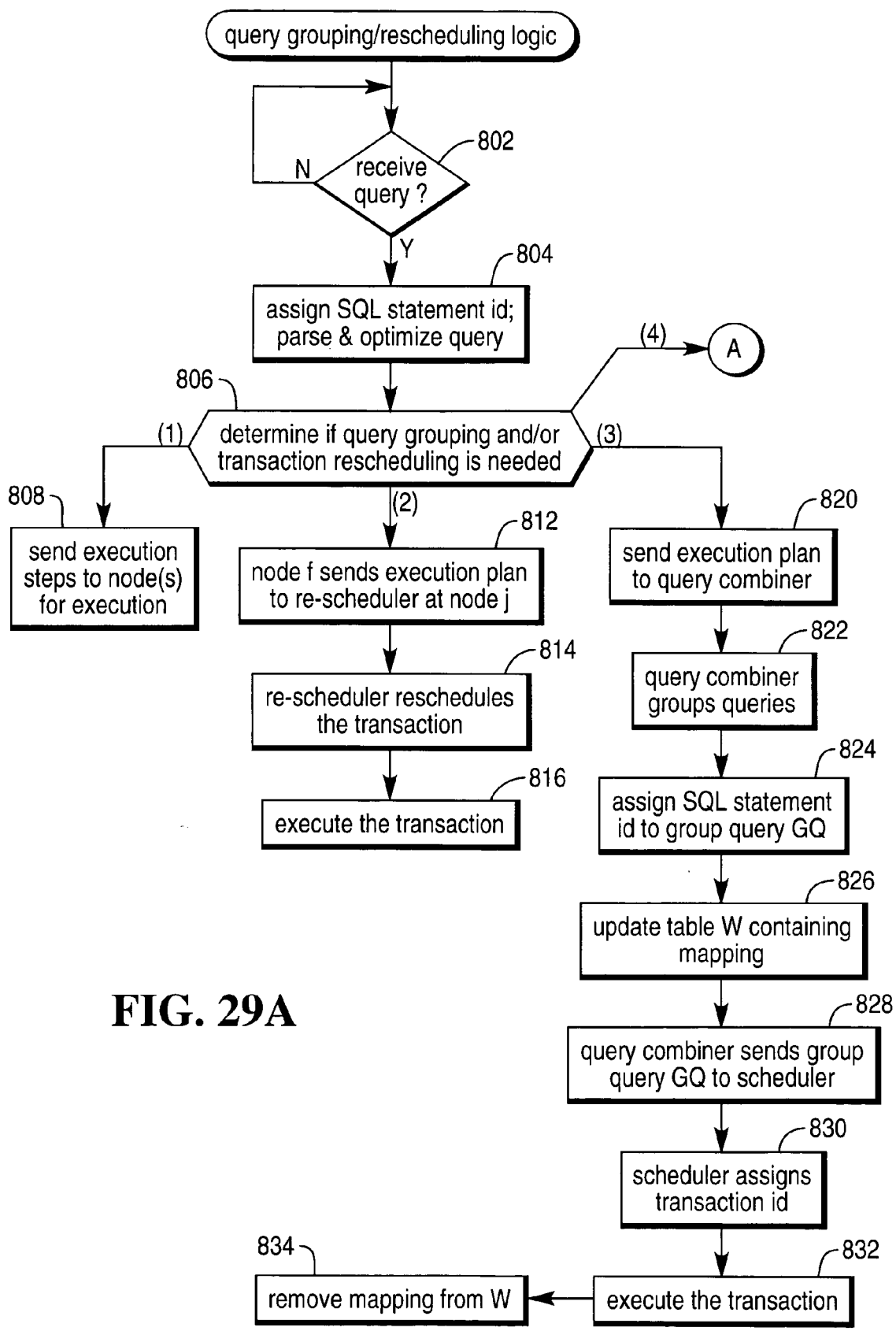
FIGS. 29A–29B are a flow diagram of logic performed in the database system to perform execution of transactions.
Figure 29B:
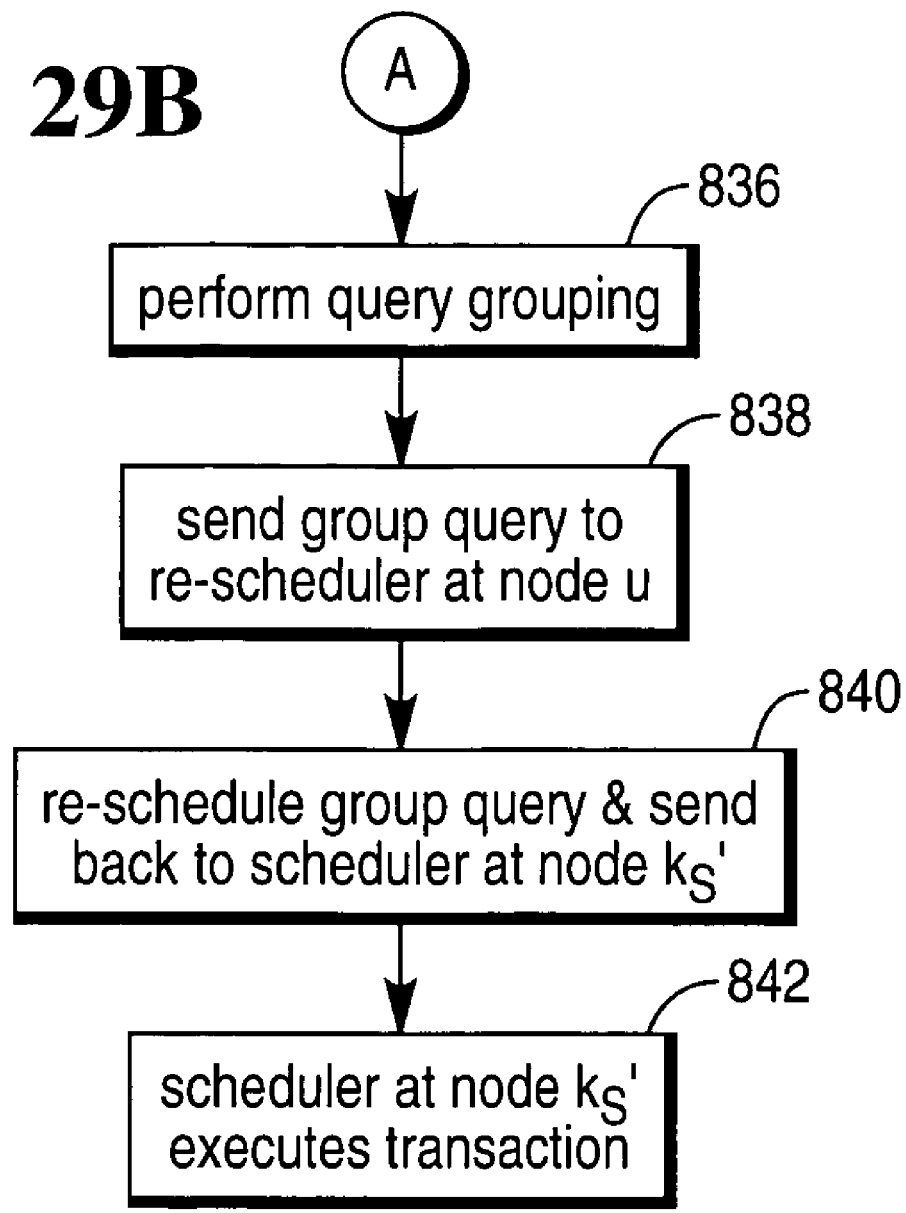
Figure 33:
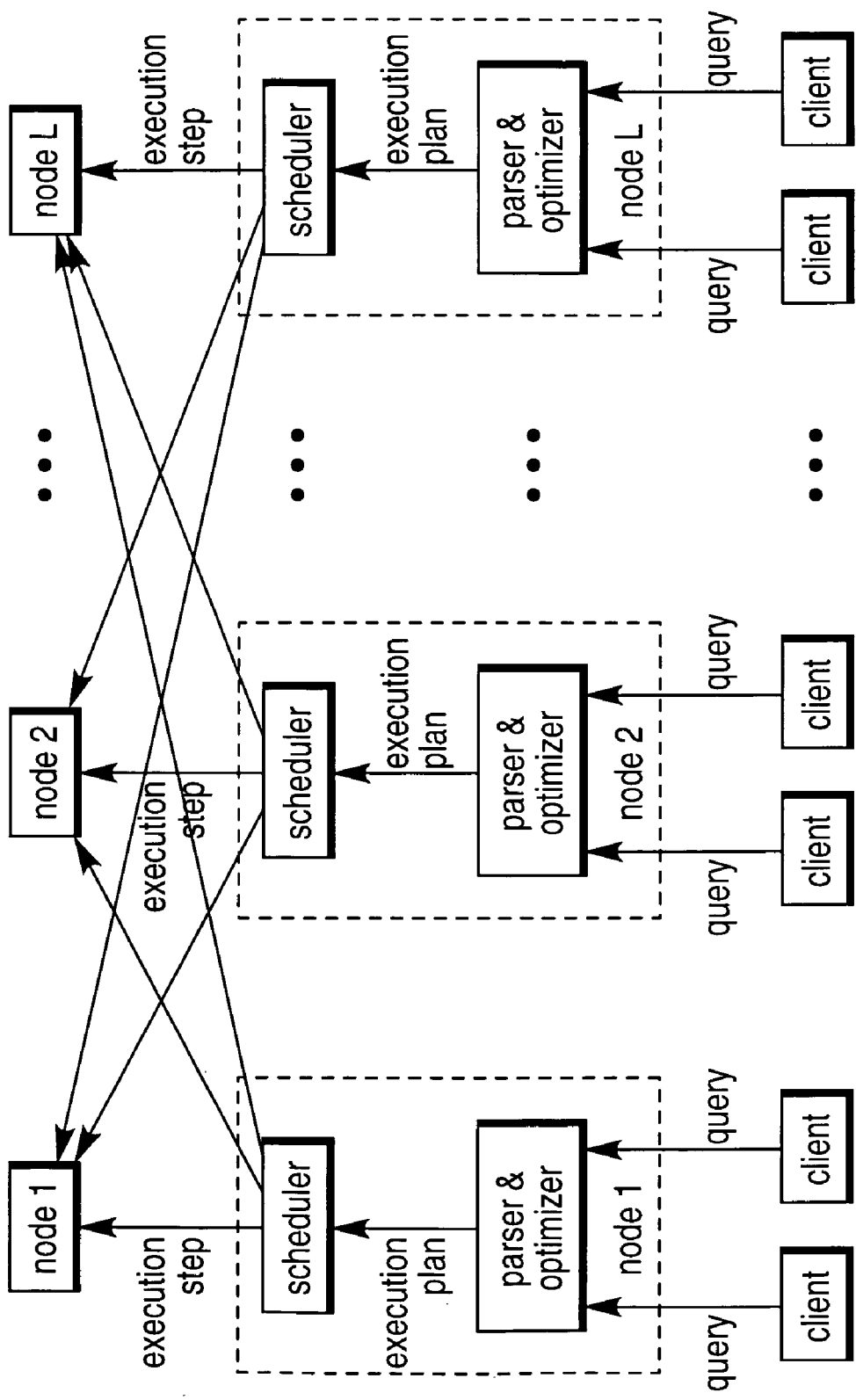
FIG. 33 illustrates an arrangement of the database system in which query grouping and transaction rescheduling is not performed.

As shown in FIGS. 29A–29B, when a given query is received (at 802), the parsing engine (at 804) assigns the query an SQL statement identifier, parses and optimizes the query into an execution plan. SQL statement identifiers are used to differentiate between SQL statements. Conceptually, an SQL statement identifier can be regarded as (session identifier, SQL statement sequence number within the session). The parsing engine then determines (at 806) which of the four choices to use for the transaction associated with the query. This determination can be made by the parser or optimizer. If no transaction rescheduling and no query grouping is to be performed, i.e., choice (1), then the parser and optimizer at node f ($1 \leq f \leq L$) that the client is coupled to gives the execution plan to the scheduler at node f. The scheduler at node f sends (at 808) the execution steps in the execution plan to the appropriate node(s), which can include node f itself, for execution. This is illustrated in FIG. 33 for a parallel database system having plural nodes.

If choice (2) is selected (at 806), then transaction rescheduling but no query grouping is selected as the course of action for the received query, and the parsing engine at node f ($1 \leq f \leq L$) that the requesting client is coupled to sends (at 812) the execution plan of the query to the re-scheduler at node j (node j may be the same as or different from node f) based on which connected component group of the conflict graph the query is related to. This is illustrated in FIG. 26.

In response to receiving the execution plan of the transaction from the parsing engine at node f, the re-scheduler at node j reschedules (at 814) the transaction and sends the transaction to the scheduler at node j (see FIG. 26). Sending the execution plan to the scheduler refers to moving the transaction from $Q_1$ to $Q_2$. Once the scheduler receives the execution plan of the transaction, the scheduler assigns a transaction identifier to the execution plan and processes (at 816) the transaction for execution (by sending execution steps of the execution plan to one or more data server modules).

If choice (3) is selected (at 806), the parsing engine at node f ($1 \leq f \leq L$) that the client is coupled to sends (at 820) the execution plan of the query to the query combiner (see FIG. 27) at node $k_{\lceil f/h \rceil}$ ($\lceil x \rceil$ is the ceiling function). At each node $k_S$ ($1 \leq s \leq g$), the query combiner groups (at 822) several queries $p_1, p_2, \ldots$, and $p_t$ that are of the same type into a group query GQ. Conceptually, two queries are of the same type if they require the same table-level locks. The group query is assigned (at 824) a new SQL statement identifier.

Figure 30:
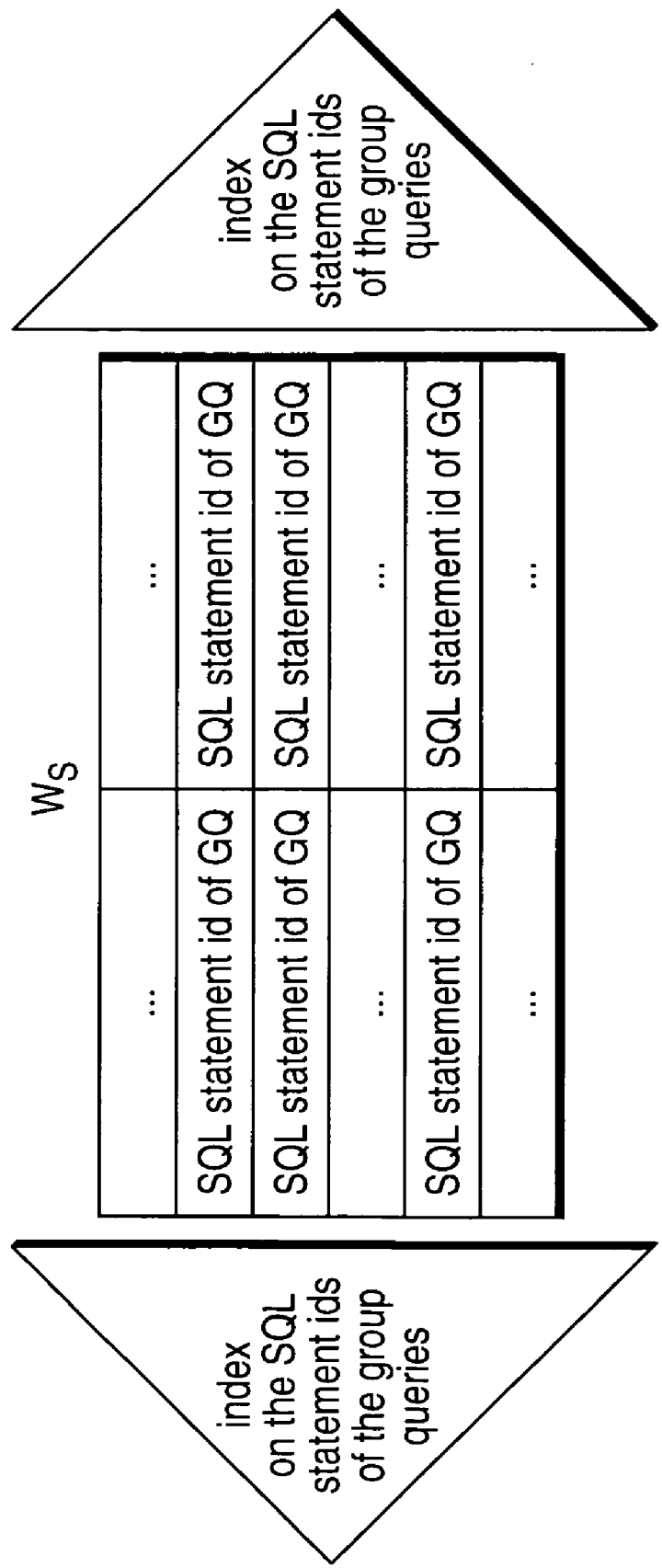
FIG. 30 illustrates a data structure to map SQL statement identifiers of group queries to SQL statement identifiers of individual queries.

Also, the mapping between the SQL statement identifier of the group query GQ and the SQL statement identifiers of the individual queries $p_1, p_2, \ldots$, and $p_t$ is stored (at 826) in a table $W_S$ at node $k_S$. FIG. 30 shows an example table $W_S$ containing mapping information between group query SQL statement identifiers and individual query SQL statement identifiers. To facilitate search on the SQL statement identifiers, two indices are built on the table $W_s$, one on the SQL statement identifiers of the group queries (GQ), and another on the SQL statement identifiers of the individual queries that the group queries are composed of ($p_1, p_2, \ldots$, and $p_t$).

The query combiner at node $k_s$ then sends (at 828) the group query to the scheduler at node $k_s$. When the scheduler receives the execution plan of the group query, the scheduler assigns (at 830) a transaction identifier to the execution plan and executes the group query transaction (at 832). After the group query transaction finishes execution, the mapping between the SQL statement identifier of the group query GQ and the SQL statement identifiers of the individual queries $p_1, p_2, \ldots$, and $p_t$ is removed (at 834) from the table $W_s$. Also, each client that submits the query $p_j$ ($1 \leq j \leq t$) will receive a message saying that query $p_j$ is complete (the query can be either committed or aborted).

During execution of the group query GQ transaction, if the client submitting query $p_j$ ($1 \leq j \leq t$) aborts query $p_j$, then the group query GQ transaction is aborted. This means that all the queries $p_1, p_2, \ldots$, and $p_t$ are aborted. In a typical parallel database system, the abort rate of individual queries is low, so aborting the group query will not happen frequently. If the group query GQ is committed, then all the individual queries $p_1, p_2, \ldots$, and $p_t$ in the group query are committed.

Read queries are handled specifically when query grouping is performed. Assume that when a read query transaction is executed, the query results are first written to a temporary result space whose name is specified in the execution plan of the transaction. Then the content in the temporary result space is returned to the user session (client). At each node $k_S$ ($1 \leq s \leq g$), the query combiner keeps another table $V_s$ with three columns (SQL statement identifier of the group query, user session, temporary result space). Note that the user session field and the temporary result space field are not needed for update transactions. Thus, if a large percentage of transactions are update transactions, using the data structure $W_s$ (which does not contain the session and temporary result space fields) helps to conserve storage space. However, in a different implementation, the $W_s$ and $V_s$ structures can be combined so that the same structure is used for both update and read transactions.

An index on the table $V_s$ is built for the SQL statement identifiers of the group queries. When several read queries are grouped into a group query at node $k_s$, for each individual read query, the mapping between the user session and the temporary result space is stored in the table $V_s$. After the group query finishes execution, the mapping between the user sessions and the temporary result spaces are removed from table $V_s$.

Figure 31:
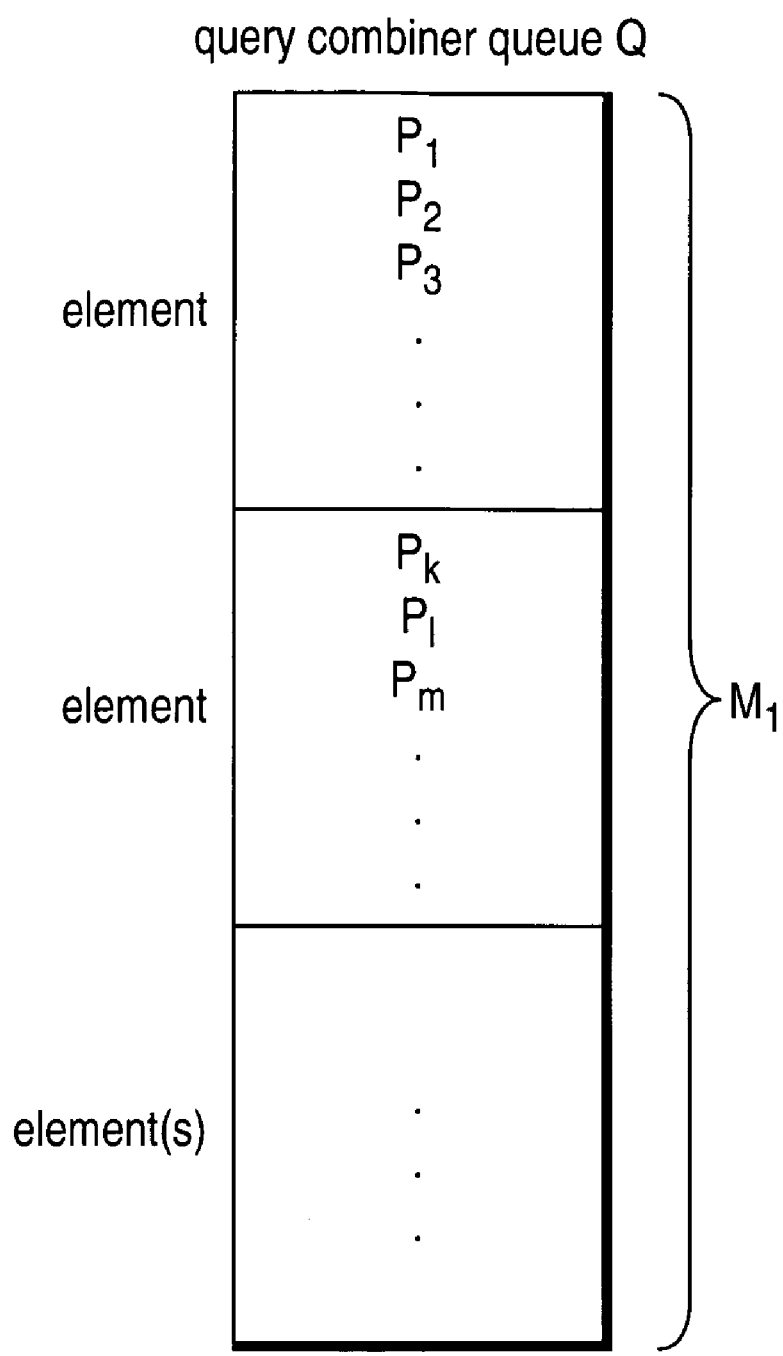
FIG. 31 illustrates a queue used for query grouping.

The query combiner works in the following way. The query combiner keeps a query combiner queue Q, shown in FIG. 31, whose maximum size is $M_1$ (a predefined number) elements. Each element in Q contains queries that are of the same type. The maximum number of queries that can be contained within each element of Q is $M_2$ (a predefined number). Each time the query combiner receives a query p, the query combiner searches Q (some index may be kept on Q to facilitate the search). If there is an element in Q that is of the same type as query p, query p is added into that element. Otherwise query p is inserted at the end of Q in a new element. There is a predefined timestamp TS. Whenever one of the following conditions is satisfied, the j-th element of Q is removed out of Q: (1) the first element (j=1) of Q has stayed in Q longer than TS; (2) a query p is added to the i-th element of Q (j=1) so that there are $M_2$ queries within that element; or (3) a query p is added at the end of Q in a new element so that there are more than $M_1$ elements in Q (in which case, the first element in Q is removed, i.e., j=1).

Queries in the j-th element are combined into a group query. The execution plan of the group query is sent to the scheduler for execution.

Two queries $p_1$ and $p_2$ are of the same type if the following conditions are satisfied:

(1) Both queries are "small" queries; and
(2) One of the following conditions are satisfied:
 (a) Both queries update the same base relation R by specifying the value locking attribute value of R.
 (b) Both queries read the same base relation R.
 (c) Both queries read the same join view JV.

An element of Q is of the same type as query p if each query in that element is of the same type as query p. A small query is a query that affects a relatively small number of tuples in a relation or view. A relatively small number of tuples means one or a few tuples. Large queries that affect a relatively large number of tuples are not grouped.

Figure 32A:
FIGS. 32A–32F illustrate an example grouping of queries.
Figure 32B:
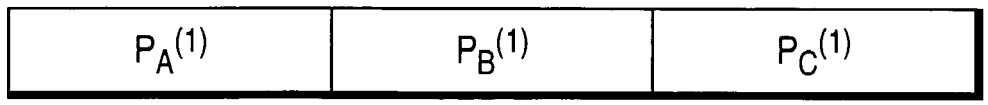

For example, let $p_R^{(i)}$ denote a query that updates base relation R by specifying a value of the value locking attribute. If $M_2=3$ (maximum size of each element of Q), the query combiner may work as follows. Originally, as shown in FIG. 32A, two elements each containing a query $p_A^{(1)}$ and $p_B^{(1)}$ are in Q. Subsequently, a query $p_c^{(1)}$ different in type from either $p_A^{(1)}$ or $p_B^{(1)}$ is inserted into Q as a new element, as shown in FIG. 32B.

Figure 32C:
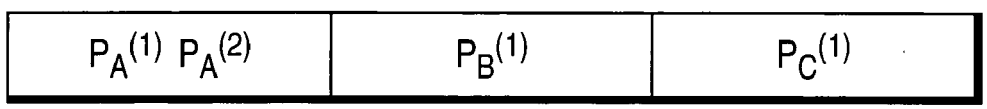
Figure 32D:
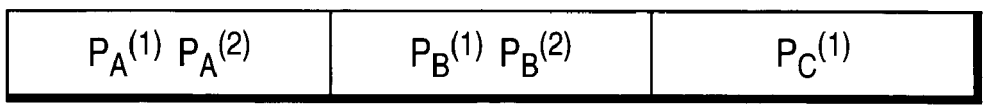

Next, a query $p_A^{(2)}$ is inserted into the first element of Q, as shown in FIG. 32C. Following that, a query $P_B^{(2)}$ is inserted into the second element of Q, as shown in FIG. 32D.

Figure 32E:
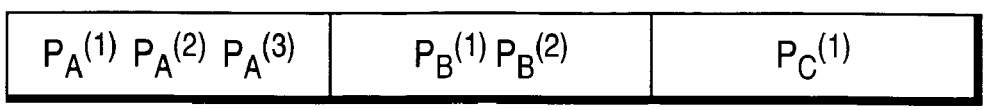
Figure 32F:
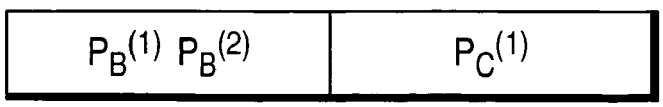

Next, another query $P_A^{(3)}$ is inserted into the first element of Q, as shown in FIG. 32E. As there are $M_2=3$ queries in the first element of Q, the first element is removed from Q, as shown in FIG. 32F. Queries $P_A^{(1)}$, $P_A^{(2)}$, and $P_A^{(3)}$ are combined into a group query and sent to the scheduler for execution.

Referring again to FIGS. 29A–29B, if choice (4) is selected (at 806), both query grouping and transaction rescheduling are performed. Choice (4) is effectively a combination of choices (2) and (3). The parsing engine at node f ($1 \leq f \leq L$) that the requesting client is coupled to sends (at 836) the execution plan of the query to the query combiner at node $k'_{\lceil f/h \rceil}$ to perform query grouping. At each node $k_s'$ (see FIG. 28) ($1 \leq s \leq g$), the query combiner groups several queries $p_1, p_2, \ldots$, and $p_t$ that are of the same type into a group query GQ with a new SQL statement identifier.

The mapping between the SQL statement identifier of the group query GQ and the SQL statement identifiers of the individual queries $p_1, p_2, \ldots,$ and $p_t$ is stored in a table $W_s'$ at node $k_s'$. The query combiner at node $k_s'$ then sends (at 838) the group query to the re-scheduler at node u ($1 \leq u \leq L$), where node u may be the same as node $k_s'$, based on which connected component group of the conflict graph the group query is related to. The re-scheduler at node u reschedules (at 840) the group query and sends it back to the scheduler at node $k_s'$. In this way, the scheduler at node u will not become a bottleneck, as the workload is distributed to the schedulers at nodes $k_1', k_2', \ldots,$ and $k_g'$. When the scheduler at node $k_s'$ receives the execution plan of the group query, the scheduler executes (at 842) the execution plan just as described above.

As an optimization, the query combiner at node $k_s'$ only needs to send the SQL statement identifier and the information about table-level lock requests (instead of the entire execution plan) of the group query GQ to the re-scheduler at node u. Note that the information about value X (S) locks is implied by the information about table-level IX (IS) locks. This is due to the fact that to put an X (S) value lock on an attribute value of relation R, a table-level IX (IS) lock has to be placed on R first. The execution plan of GQ is kept at node $k_s'$. After rescheduling, the re-scheduler at node u only needs to send the SQL statement identifier (instead of the entire execution plan) of the group query GQ back to the scheduler at node $k_s'$.

As noted above, a group query is a collection of queries where the redundant table-level lock requests are removed. Consider n queries $p_1, p_2, \ldots,$ and $p_n$. Assume that the execution plan of each query $p_i$ ($1 \leq i \leq n$) contains the following $m_i$ execution steps:

Execution step 1: Acquire all the necessary table-level locks.

Execution step 2

. . .

Execution step $m_i-1$

Execution step $m_i$: Release all the (table-level and value) locks and commit.

All the necessary table-level locks are acquired at the first execution step. In the following execution steps ($2 \sim m_i - 1$), proper value locks may be acquired. At the last execution step, all the previously acquired table-level locks and value locks are released.

After performing query grouping, the execution plan of the group query GQ for the n queries $p_1, p_2, \ldots,$ and $p_n$ contains the following m execution steps:

Execution step 1: Acquire all the table-level locks that are required by the n queries $p_1, p_2, \ldots,$ and $p_n$. If a same table-level lock is required by at least two of the n queries, only one such table-level lock is required. If several table-level locks on the same relation are required by several queries, the strongest table-level lock of the several table-level locks is required. For example, for an S lock request and an X lock request, only an X lock request is issued; for an S lock request and an IX lock request, only an SIX lock request is issued.

Execution step 2

. . .

Execution step m−1

Execution step m: Release all the (table-level and value) locks and commit.

Execution steps 2~m−1 of the group query GQ contain the execution steps $2 \sim m_i - 1$ of each query $p_i$ ($1 \leq i \leq n$) sequentially. Several execution steps of different queries can be combined into one execution step of GQ if this does not change serializability. In this way, these n queries are either all committed or all aborted. Using group query, the number of table-level lock requests can be substantially reduced.

As an example, consider a join view $JV = A \bowtie B$. Query $p_i$ inserts a tuple $T_{A1}$ into base relation A, query $p_2$ inserts a tuple $T_{A2}$ into base relation A. Suppose that tuple $T_{A1}$ and tuple $T_{A2}$ have different value locking attribute values. The execution plan of query $p_i$ contains the following five execution steps:

Execution step 1: Acquire an IX lock on A, a table-level S lock on B, and a table-level Y lock on JV.

Execution step 2: Acquire an X value lock on some value locking attribute value of A for $T_{A1}$. Insert $T_{A1}$ into base relation A.

Execution step 3: Compute $T_{A1} \bowtie B$.

Execution step 4: Insert $T_{A1} \bowtie B$ into JV.

Execution step 5: Release all the (table-level and value) locks and commit.

The execution plan of query $p_2$ contains the following five execution steps:

Execution step 1: Acquire an IX lock on A, a table-level S lock on B, and a table-level Y lock on JV.

Execution step 2: Acquire an X value lock on some value locking attribute value of A for $T_{A2}$. Insert $T_{A2}$ into base relation A.

Execution step 3: Compute $T_{A2} \bowtie B$.

Execution step 4: Insert $T_{A2} \bowtie B$ into JV.

Execution step 5: Release all the (table-level and value) locks and commit.

Then the execution plan of the group query GQ for $p_1$ and $P_2$ may contain the following five execution steps:

Execution step 1: Acquire an IX lock on A, a table-level S lock on B, and a table-level Y lock on JV.

Execution step 2: Acquire two X value locks on some value locking attribute values of A for $T_{A1}$, and $T_{A2}$, respectively. Insert $T_{A1}$, and $T_{A2}$ into base relation A.

Execution step 3: Compute $T_{A1} \bowtie B$ and $T_{A2} \bowtie B$.

Execution step 4: Insert $T_{A1} \bowtie B$ and $T_{A2} \bowtie B$ into JV.

Execution step 5: Release all the (table-level and value) locks and commit.

XI. System Environment

Instructions of the various software routines or modules discussed herein (such as the parser, optimizer, lock manager, transaction re-scheduler, query combiner, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. An article comprising at least one storage medium containing instructions that when executed cause a computer-implemented database system to:
   receive a plurality of pending transactions; and
   reorder the received pending transactions based on determining conflicts between the received pending transactions and other transactions scheduled for execution.

2. The article of claim 1, wherein the instructions when executed cause the database system to:
   store the other transactions scheduled for execution in a first queue; and
   move the received pending transactions to the first queue in an order according to the reordering.

3. The article of claim 2, wherein the instructions when executed cause the database system to store the received pending transactions in a second queue,
   wherein moving the received pending transactions comprises moving the pending transactions from the second queue to the first queue.

4. The article of claim 1, wherein the instructions when executed cause the database system to determine conflicts between the received pending transactions and other transactions based on checking locks requested by the received pending transactions and by the other transactions.

5. The article of claim 4, wherein the instructions when executed cause the database system to receive the plurality of pending transactions by receiving execution plans from an optimizer in the database system, the execution plans generated by the optimizer in response to received queries.

6. The article of claim 5, wherein the instructions when executed cause the database system to invoke a re-scheduler to reorder the received pending transactions,
the re-scheduler sending the reordered transactions to a scheduler in the database system.

7. The article of claim 4, wherein the instructions when executed cause the database system to:
   store a view that is based on plural base relations;
   define a relationship between the base relations, the relationship indicating conflicts between base relations due to their association with the view;
   wherein determining conflicts between the received pending transactions and other transactions is based on the defined relationship of base relations.

8. The article of claim 7, wherein the instructions when executed cause the database system to define the relationship by defining a conflict graph, the conflict graph having plural components representing respective plural base relations,
   wherein an edge is defined between every pair of components representing the base relations of the view.

9. The article of claim 8, wherein the instructions when executed cause the database system to:
   store other base relations,
   wherein each of the components of the conflict graph representing the other base relations are not connected by an edge to the components representing the base relations of the view.

10. The article of claim 9, wherein the instructions when executed cause the database system to:
    for a first received pending transaction that updates a first base relation, identify the first transaction as a transaction that can be scheduled for execution if the first transaction does not conflict with the other transactions scheduled for execution.

11. The article of claim 10, wherein the instructions when executed cause the database system to identify the first transaction as not conflicting if the following is satisfied:
    for certain of the other transactions that update a first set of one or more base relations, there is no edge in the conflict graph between the first base relation and any of the first set of one or more base relations; and
    none of the other transactions read any view defined on the first base relation.

12. The article of claim 11, wherein the instructions when executed cause the database system to:
    for a second received pending transaction that reads the first base relation, identify the second transaction as a transaction that can be scheduled for execution if the following condition is satisfied:
    either (a) the second transaction reads the first base relation using a table-level shared lock on the first base relation and none of the other transactions updates the first base relation, or (b) the second transaction reads the first base relation using a shared value lock on the first base relation and none of the other transactions updates the first base relation by a table-level exclusive lock.

13. The article of claim 12, wherein the instructions when executed cause the database system to:
    for a third received pending transaction that reads the view, identify the third transaction as a transaction that can be scheduled for execution if none of the other transactions update any base relation of the view.

14. The article of claim 1, wherein the instructions when executed cause the database system to:
    store a data structure to indicate the types of locks placed on each of plural base relations; and
    access the data structure to determine conflict.

15. The article of claim 14, wherein the instructions when executed cause the database system to:
    store the data structure containing indicators to indicate placement of a table-level exclusive lock, an exclusive value lock, a table-level shared lock, and a shared value lock.

16. The article of claim 15, wherein the instructions when executed cause the database system to increment the indicators depending on a number of locks placed by transactions on each base relation.

17. The article of claim 1, wherein the database system includes plural nodes, each node having a re-scheduler, and wherein reordering the received pending transactions is performed by one or more of the re-schedulers.

18. The article of claim 17, wherein the instructions when executed cause the database system to:
assign a first node to perform reordering of transactions on a first set of base relations, and assign a second node to perform reordering of transactions on a second set of base relations.

19. A method of scheduling transactions in a computer-implemented database system, comprising:
receiving pending transactions in a first order;
determining any conflicts between the received pending transactions and transactions scheduled for execution; and
in response to determining conflicts, reordering the received pending transactions so that the received pending transactions are provided for execution scheduling in a second order different from the first order.

20. The method of claim 19, further comprising storing transactions scheduled for execution in a queue,
the method further comprising moving the received pending transactions into the queue in the second order.

21. The method of claim 19, wherein the database system has plural nodes, each node having a re-scheduler,
wherein the reordering is performed by the plural re-schedulers.

22. The method of claim 21, further comprising:
determining that a first received pending transaction operates on a first base relation; and
sending the first received pending transaction to a first re-scheduler to reorder based on the determining.

23. The method of claim 22, further comprising:
determining that a second received pending transaction operates on a second base relation; and
sending the second received pending transaction to a second re-scheduler different from the first re-scheduler to reorder based on determining that the second received pending transaction operates on the second base relation.

24. The method of claim 19, further comprising:
defining a relationship having plural components, each component representing a corresponding base relation, wherein the relationship indicates conflicts between base relations due to their associations with views;
defining one or more conflicts between or among a first set of base relations of a first view; and
defining one or more conflicts between or among a second set of base relations of a second view.

25. The method of claim 24, further comprising sending a given received pending transaction to a selected one of the re-schedulers based on whether a first base relation operated on by the given received pending transaction belongs to the first set or second set.

26. The method of claim 25, further comprising sending a second received pending transaction that operates on a second base relation to another selected re-scheduler based on determining that the second base relation belongs to a different set than the first base relation.

27. The method of claim 24, further comprising defining conflicts between or among base relations of one or more further sets.

28. A database system, comprising:
one or more processors, the one or more processors to execute a re-scheduler to receive pending transactions; and
the one or more processors to execute a scheduler to process a set of transactions,
the re-scheduler to reorder the pending transactions based on whether the pending transactions request locks that conflict with locks of the set of transactions processed by the scheduler.

29. The database system of claim 28, further comprising a storage to store a first queue and a second queue, the first queue to store the pending transactions, and the second queue to store the set of transactions processed by the scheduler.

30. The database system of claim 29, the re-scheduler to select one of the received pending transactions from the first queue to move to the second queue in performing the reordering.

31. The database system of claim 30, the re-scheduler to receive the pending transactions in a first order, and the re-scheduler to move the pending transactions from the first queue to the second queue in a second, different order.

32. The database system of claim 31, wherein the first queue includes a first segment implemented as a round-robin queue, the re-scheduler to scan through the round-robin queue to find a pending transaction that does not conflict with any transaction in the set.

33. The database system of claim 32, wherein the first queue has a length, the first segment having a length shorter than the length of the first queue.

34. The database system of claim 33, the re-scheduler to scan the first segment at an element that follows the last element scanned in a prior scan.

35. The database system of claim 31, the re-scheduler to modify its processing in response to detecting that a given pending transaction has remained in the first queue for more than a predefined number of scan cycles.

36. The database system of claim 28, further comprising plural nodes, each node having a re-scheduler, different re-schedulers to perform reordering of different groups of transactions.

37. An article comprising at least one storage medium containing instructions that when executed cause a computer-implemented database system to:
receive, in a first order, pending transactions in a first queue;
store transactions to be scheduled for execution in a second queue;
scan the pending transactions in the first queue to determine any lock conflicts between the pending transactions in the first queue and the transactions in the second queue;
move pending transactions from the first queue to the second queue if the pending transactions do not have a lock conflict with the transactions in the second queue, wherein the pending transactions are moved to the second queue in an order different than the first order;
remove transactions from the second queue as they are completed; and
move further pending transactions to the second queue as transactions are removed from the first queue.

* * * * *